US012503911B2

(12) United States Patent
Anderson et al.

(10) Patent No.: US 12,503,911 B2
(45) Date of Patent: *Dec. 23, 2025

(54) SKEW ADJUSTMENT MECHANISM FOR A WINDOW COVERING

(71) Applicant: HUNTER DOUGLAS INC., New York, NY (US)

(72) Inventors: Richard N. Anderson, Whitesville, KY (US); Steven R. Haarer, Maceo, KY (US)

(73) Assignee: Hunter Douglas Inc., New York, NY (US)

( * ) Notice: Subject to any disclaimer, the term of this patent is extended or adjusted under 35 U.S.C. 154(b) by 806 days.

This patent is subject to a terminal disclaimer.

(21) Appl. No.: 17/530,767

(22) Filed: Nov. 19, 2021

(65) Prior Publication Data

US 2022/0074265 A1 Mar. 10, 2022

Related U.S. Application Data

(60) Continuation of application No. 16/021,158, filed on Jun. 28, 2018, now Pat. No. 11,225,831, which is a (Continued)

(51) Int. Cl.
*E06B 9/322* (2006.01)
*E06B 9/262* (2006.01)
(Continued)

(52) U.S. Cl.
CPC .............. *E06B 9/322* (2013.01); *E06B 9/262* (2013.01); *E06B 9/388* (2013.01); (Continued)

(58) Field of Classification Search
CPC .... E06B 9/32; E06B 9/322; E06B 2009/3225; E06B 2009/3227; E06B 2009/2441; (Continued)

(56) References Cited

U.S. PATENT DOCUMENTS 2,618,329 A 11/1952 Nelson
2,623,581 A 12/1952 Nelson
(Continued)

FOREIGN PATENT DOCUMENTS

EP 0192867 9/1986

*Primary Examiner* — Johnnie A. Shablack
*Assistant Examiner* — Jeremy C Ramsey
(74) *Attorney, Agent, or Firm* — Dority & Manning, P.A.

(57) ABSTRACT

A system for adjusting a skewed rail in a window covering includes first and second spools to allow first and second lift cords, respectively, to be wound around and unwound from the respective spools. The system also includes a lift rod coupled between the first and second spools and a skew adjustment assembly configured to adjust the first spool between an engaged state, in which the first spool is rotationally engaged with the lift rod such that the first and second spools rotate together, and a disengaged state, in which the first spool is rotationally disengaged from the lift rod to allow the first spool to be rotated relative to the second spool. When in the disengaged state, rotation of the first spool relative to the second spool adjusts an effective length of the first lift cord relative to the second lift cord.

19 Claims, 42 Drawing Sheets

Related U.S. Application Data division of application No. 15/151,554, filed on May 11, 2016, now Pat. No. 10,036,200, which is a continuation of application No. 14/089,861, filed on Nov. 26, 2013, now Pat. No. 9,357,868.

(60) Provisional application No. 61/873,055, filed on Sep. 3, 2013, provisional application No. 61/734,048, filed on Dec. 6, 2012.

(51) Int. Cl.
*E06B 9/388* (2006.01)
*E06B 9/24* (2006.01)

(52) U.S. Cl.
CPC ................. *E06B 2009/2441* (2013.01); *E06B 2009/2625* (2013.01); *E06B 2009/2627* (2013.01); *E06B 2009/3222* (2013.01); *E06B 2009/3225* (2013.01)

(58) Field of Classification Search
CPC ..... E06B 2009/2625; E06B 2009/2627; E06B 2009/3222; E06B 9/388; E06B 9/262
See application file for complete search history.

(56) References Cited

U.S. PATENT DOCUMENTS

| | | | | |
|---|---|---|---|---|
| 2,637,382 | A | 5/1953 | Nelson | |
| 2,860,699 | A | 11/1958 | Braun | |
| 3,903,573 | A | 9/1975 | Wilson | |
| 3,928,897 | A | 12/1975 | Tombu | |
| 4,101,226 | A | 7/1978 | Parisien | |
| 4,177,853 | A | 12/1979 | Anderson et al. | |
| 4,638,532 | A | 1/1987 | Yang et al. | |
| 4,647,488 | A | 3/1987 | Schnebly et al. | |
| 4,662,596 | A | 5/1987 | Haarer | |
| 5,127,458 | A | 7/1992 | Schaefer et al. | |
| D333,936 | S | 3/1993 | Van Der Zanden | |
| 5,655,590 | A | 8/1997 | Bryant | |
| 5,765,621 | A | 6/1998 | Bryant | |
| 5,788,224 | A | 8/1998 | Platt | |
| 6,059,004 | A * | 5/2000 | Oskam | E06B 9/262 160/84.01 |
| 6,062,292 | A | 5/2000 | Bryant | |
| 6,095,222 | A | 8/2000 | Voss | |
| 6,148,894 | A | 11/2000 | Judkins | |
| D440,448 | S | 4/2001 | Horsten | |
| 6,483,027 | B1 | 11/2002 | Howard et al. | |
| 6,550,522 | B1 * | 4/2003 | Lennon | E06B 9/367 160/173 R |
| 6,691,760 | B1 | 2/2004 | Randall, Jr. | |
| 6,817,402 | B1 | 11/2004 | Fraczek et al. | |
| 6,899,156 | B2 | 5/2005 | Tyner | |
| 6,948,216 | B2 | 9/2005 | Gaudyn | |
| 6,981,539 | B2 | 1/2006 | Fraczek | |
| 7,143,802 | B2 | 12/2006 | Strand et al. | |
| D543,404 | S | 5/2007 | Watkins et al. | |
| 7,360,573 | B2 | 4/2008 | Yu et al. | |
| 7,546,866 | B2 | 6/2009 | Strand et al. | |
| 7,766,068 | B2 | 8/2010 | Andersen | |
| 7,832,450 | B2 | 11/2010 | Brace et al. | |
| 8,584,728 | B2 | 11/2013 | Truett et al. | |
| 8,857,494 | B2 | 10/2014 | Kirby et al. | |
| 8,931,540 | B2 | 1/2015 | Filko | |
| 9,357,868 | B2 | 6/2016 | Anderson et al. | |
| D762,462 | S | 8/2016 | Anderson | |
| 9,695,632 | B2 | 7/2017 | Anderson et al. | |
| 9,759,008 | B2 | 9/2017 | Anderson | |
| 11,891,855 | B2 * | 2/2024 | Stout | E06B 9/388 |
| 2003/0010174 | A1 | 1/2003 | Biro | |
| 2003/0090123 | A1 | 5/2003 | Sturt | |
| 2005/0103451 | A1 | 5/2005 | Nien | |
| 2005/0211394 | A1 | 9/2005 | Fraczek | |
| 2006/0048904 | A1 | 3/2006 | Gruner | |
| 2006/0196615 | A1 | 9/2006 | Yu et al. | |
| 2006/0278349 | A1 | 12/2006 | Lee | |
| 2006/0289126 | A1 | 12/2006 | Kollman et al. | |
| 2007/0039696 | A1 | 2/2007 | Strand et al. | |
| 2008/0000592 | A1 | 1/2008 | Huang | |
| 2008/0099159 | A1 | 5/2008 | Nien | |
| 2008/0121350 | A1 | 5/2008 | Cheng | |
| 2008/0169068 | A1 | 7/2008 | Liang | |
| 2008/0265232 | A1 | 10/2008 | Terrels et al. | |
| 2008/0289774 | A1 | 11/2008 | Ying | |
| 2009/0120592 | A1 | 5/2009 | Lesperance | |
| 2011/0209836 | A1 * | 9/2011 | Yu | E06B 9/322 160/291 |
| 2011/0315329 | A1 | 12/2011 | Hong et al. | |
| 2012/0103537 | A1 | 5/2012 | Dogger | |
| 2012/0227912 | A1 | 9/2012 | Anderson et al. | |
| 2012/0312486 | A1 | 12/2012 | Spray | |
| 2013/0333849 | A1 | 12/2013 | Kirby | |
| 2013/0340949 | A1 | 12/2013 | Anderson et al. | |
| 2014/0096921 | A1 | 4/2014 | Kawai | |
| 2014/0158314 | A1 | 6/2014 | Anderson et al. | |
| 2015/0020980 | A1 | 1/2015 | Franssen | |
| 2015/0020982 | A1 | 1/2015 | Anderson et al. | |
| 2015/0218879 | A1 | 8/2015 | Anderson | |
| 2016/0251896 | A1 | 9/2016 | Anderson et al. | |
| 2017/0241196 | A1 * | 8/2017 | Church | E06B 9/38 |
| 2017/0362886 | A1 | 12/2017 | Anderson | |

* cited by examiner

SKEW ADJUSTMENT MECHANISM FOR A WINDOW COVERING

BACKGROUND

The present invention relates to a skew adjustment mechanism for a window covering. More specifically, it relates to a skew adjustment mechanism to level the movable rail of a shade or blind.

In typical prior art arrangements, in order to straighten out a movable rail of a window covering such as a shade or blind that is crooked (skewed) after installation, the operator may have to disengage at least one of the lift cords from the skewed rail (typically a bottom rail or a movable, intermediate rail), adjust the length of the lift cord and reattach the lift cord to the rail. This is generally not something the end user is capable of doing, and it may even present a challenge to a seasoned installer.

SUMMARY

In one embodiment of the present invention, first and second rotatable spools are interconnected by a drive train on one rail of the shade or blind, and a disconnect mechanism is provided which allows the user to apply an outside force to disconnect the drive train between the first and second rotatable spools and to rotate one of the spools relative to the other in order to increase or decrease the effective length of one of the lift cords relative to the other to correct the skewed condition. When the outside force is released, the disconnect mechanism automatically reconnects the first and second rotatable spools so they again rotate together for normal operation.

DESCRIPTION

Figure 1:
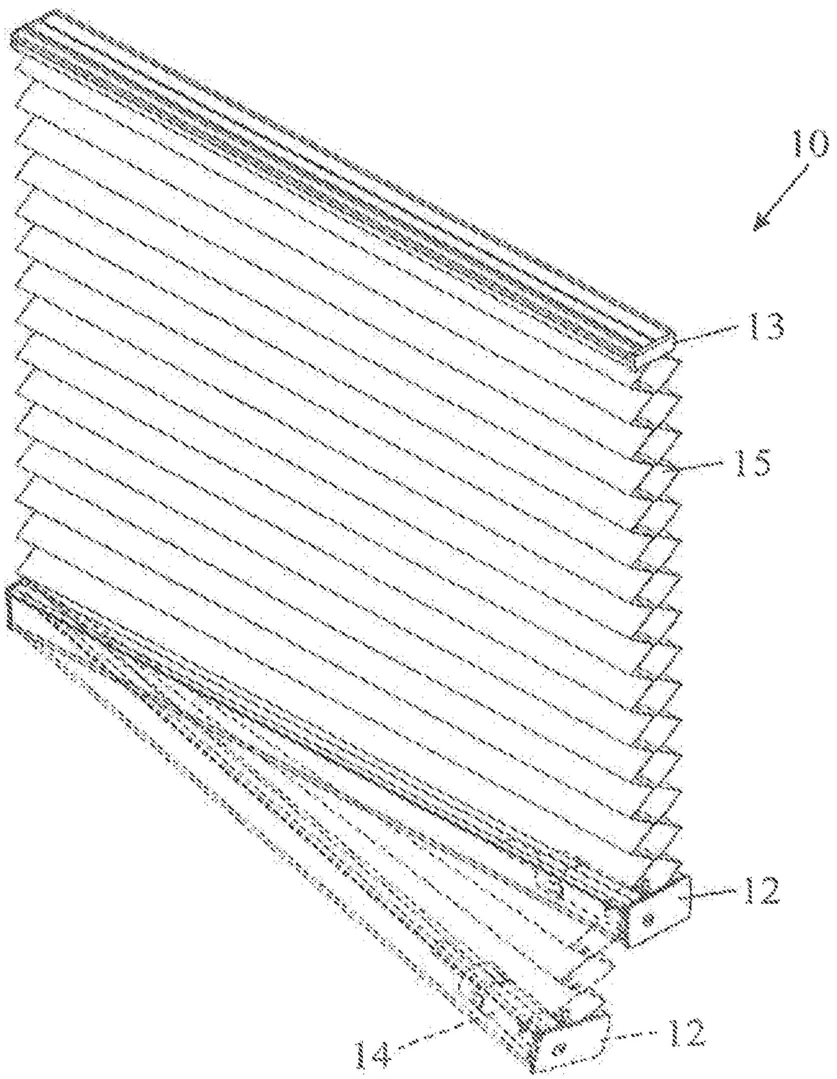
FIG. 1 is a perspective view of a shade with the bottom rail shown both in a horizontal orientation (in solid lines) and in a skewed orientation (in phantom), and with part of the internal mechanism inside the bottom rail shown in phantom.

FIG. 1 shows a shade 10 with a bottom rail 12 in a skewed orientation (in phantom) and the same bottom rail 12 (in solid lines) after it has been brought back to a horizontal orientation using a lift station 14 with a skew adjustment mechanism.

Figure 2:
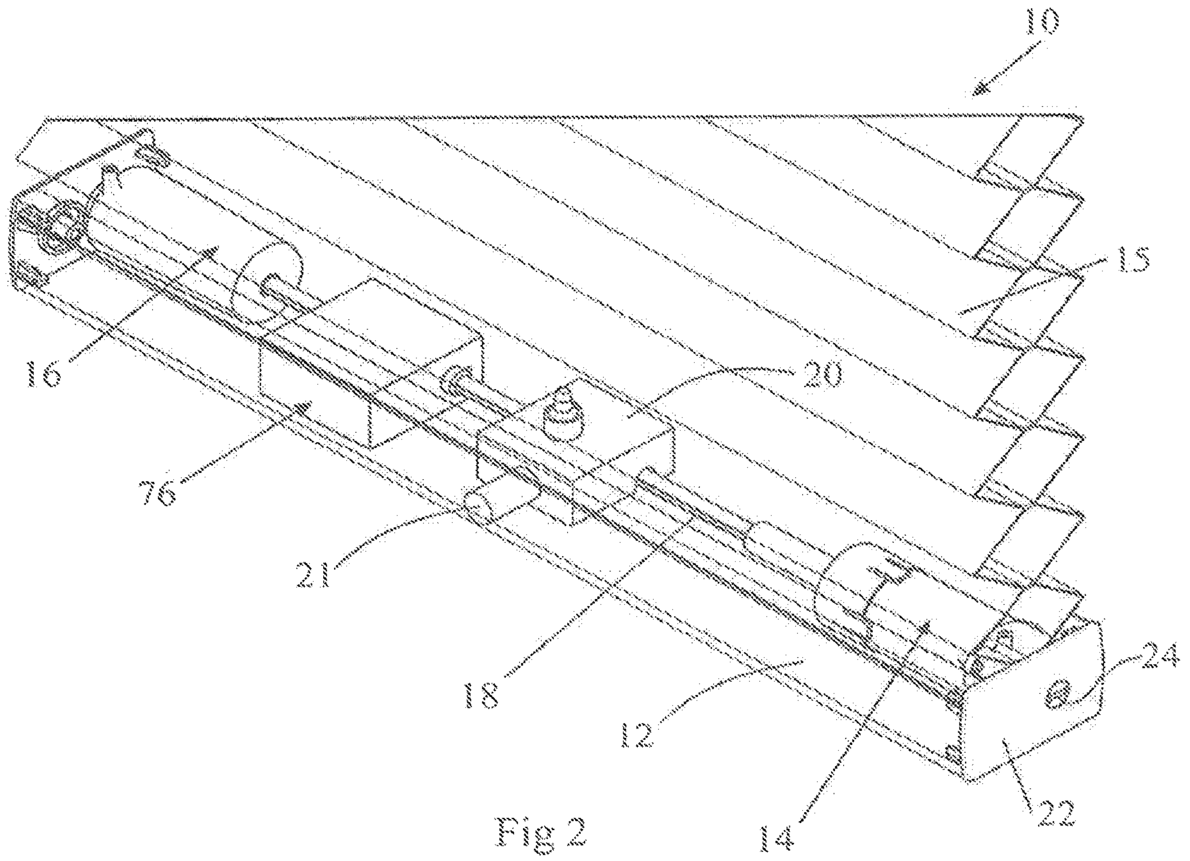
FIG. 2 is an enlarged, perspective view of the bottom rail of FIG. 1, showing the internal mechanisms in the bottom rail, including a lift station with a skew adjustment mechanism on the right and a lift station without a skew adjustment mechanism on the left.
Figures 3, 4:
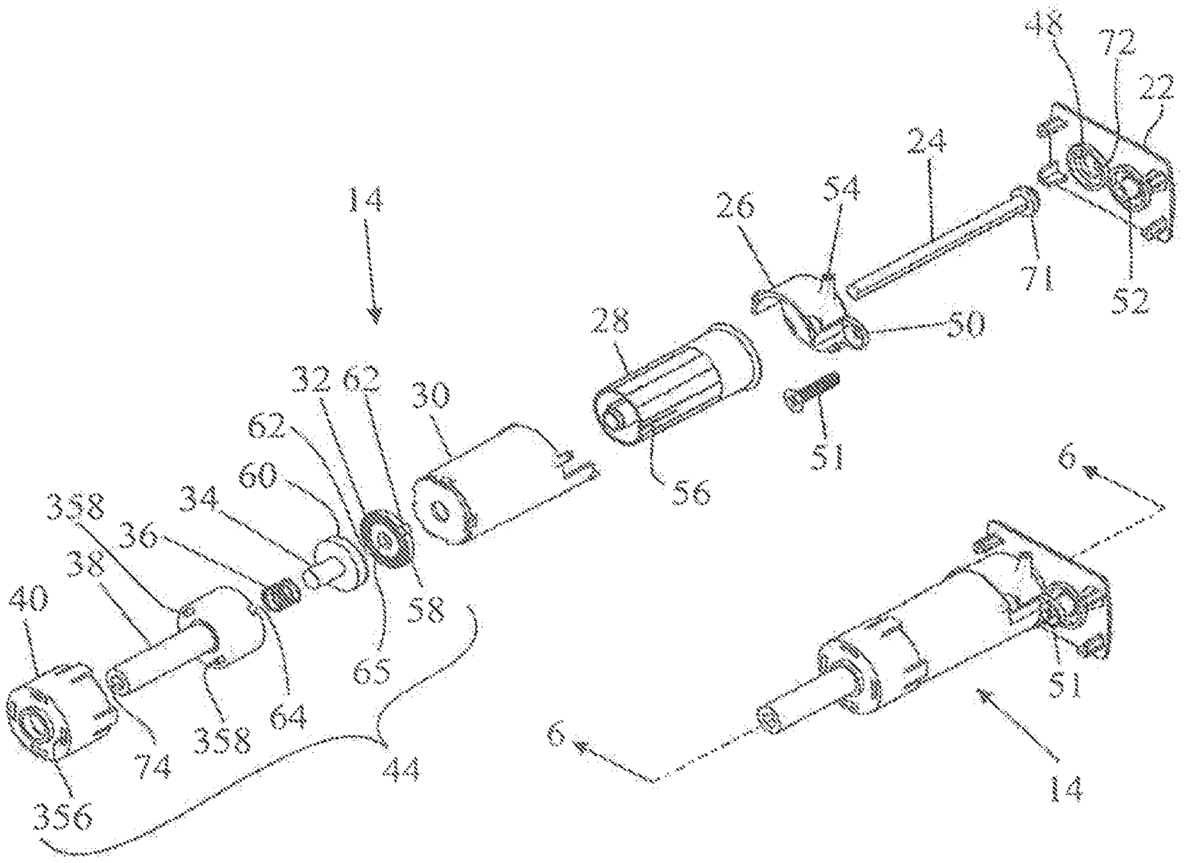
FIG. 3 is a perspective view of the rightmost lift station of FIG. 2, including the skew adjustment mechanism.
FIG. 4 is an exploded perspective view of the lift station and skew adjustment mechanism of FIG. 3.
Figure 31:
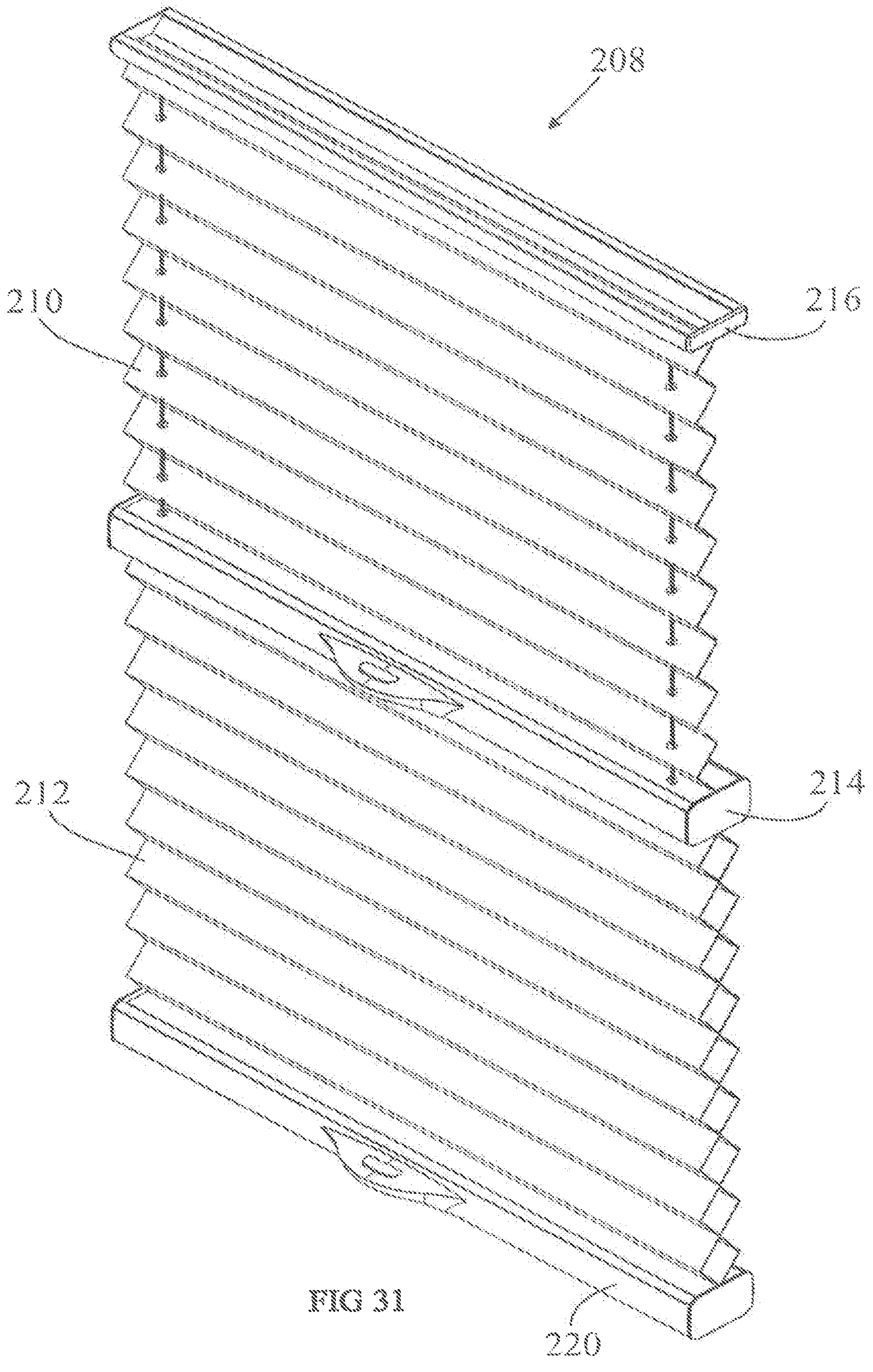
FIG. 31 is a perspective view of a window covering similar to that of FIG. 11, but with a pleated shade and intermediate movable rail added above the cellular shade portion.
Figure 32:
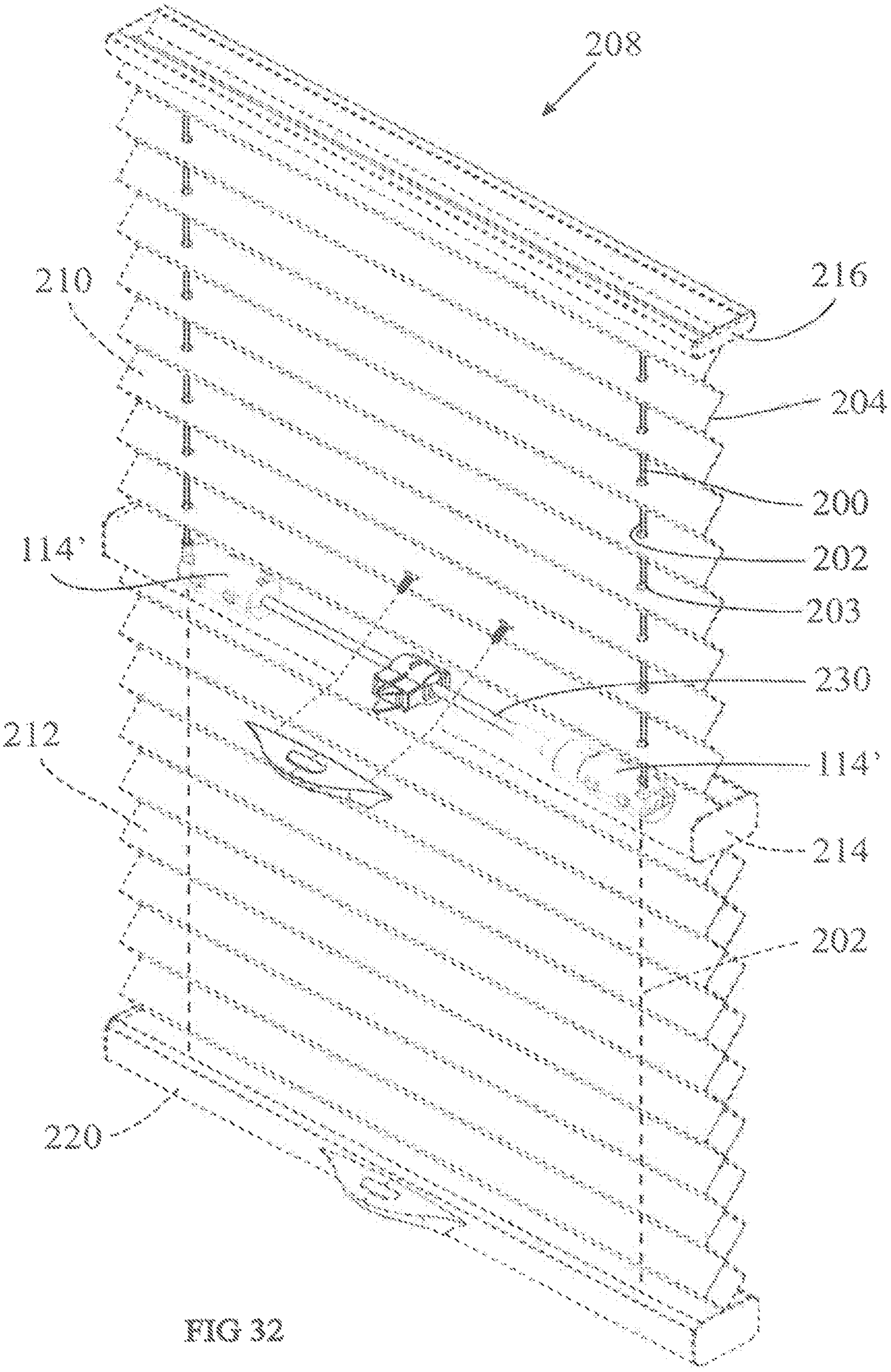
FIG. 32 is a perspective view of the window covering of FIG. 31 with the shades and rails shown in phantom, showing the cord drive of the intermediate rail with the rail handle broken-away.

Referring to FIGS. 2 and 4, the bottom rail 12 is supported by lift cords (not shown) that are secured at a top rail (or head rail) 13 and extend downwardly through holes in the pleated shade material 15, to the left and right lift stations 16, 14 housed in the bottom rail 12. (Cords are shown in FIGS. 31 and 32.) The lift stations 16, 14 include lift spools 28, which are functionally connected to each other through a drive train that includes a lift rod 18, which has a longitudinal axis and is mounted in the bottom rail 12 for rotation about the longitudinal axis. A lock mechanism 20 is provided to lock the lift rod 18 and prevent the lift rod 18 from rotating until a button or lever 21 is pushed. One type of lock mechanism that may be used is described in detail in US Publication 2012-0227912, published Sep. 13, 2012, corresponding to U.S. patent application Ser. No. 13/404,874, "Control for Movable Rail", which is hereby incorporated herein by reference. (See, for instance, the lock mechanism 12 in FIGS. 1-5 of the referenced application.)

In this embodiment, the lock mechanism 20 is normally engaged (locked), and prevents the lift rod from rotating in either direction, unless the lock mechanism is released by the user. A spring motor 76, which is connected to the lift rod 18, assists the user in winding the lift cords (not shown) onto their respective lift spools 28 in the lift stations 14, 16 (See FIGS. 3 and 6) when raising the shade 10.

FIGS. 3-7 show the rightmost lift station 14 of FIG. 2 with a skew adjustment. The lift station 14 includes a lift portion 42 (See FIG. 6) and a skew adjustment mechanism portion 44 as described in more detail later. The leftmost lift station 16 (See FIGS. 2 and 8) is a mirror image of the lift portion 42 of the rightmost lift station 14, except that it does not include the skew adjustment shaft 24. Instead, in the leftmost lift station 16, the lift rod 18 engages the spool 28 directly. The lift rod 18 may, in fact, extend completely through the leftmost lift station 16.

On the rightmost lift station 14, the skew adjustment mechanism portion 44 snaps onto the lift portion 42.

The rightmost lift station 14 with skew adjustment (See FIG. 4) includes an end cap 22, a skew adjustment shaft 24, a lift-cord-routing cap 26, a lift spool 28, a lift spool housing 30, a plunger housing cap 32, a plunger 34, a compression spring 36, a lift rod adapter 38, and a coupler 40.

Figure 5:
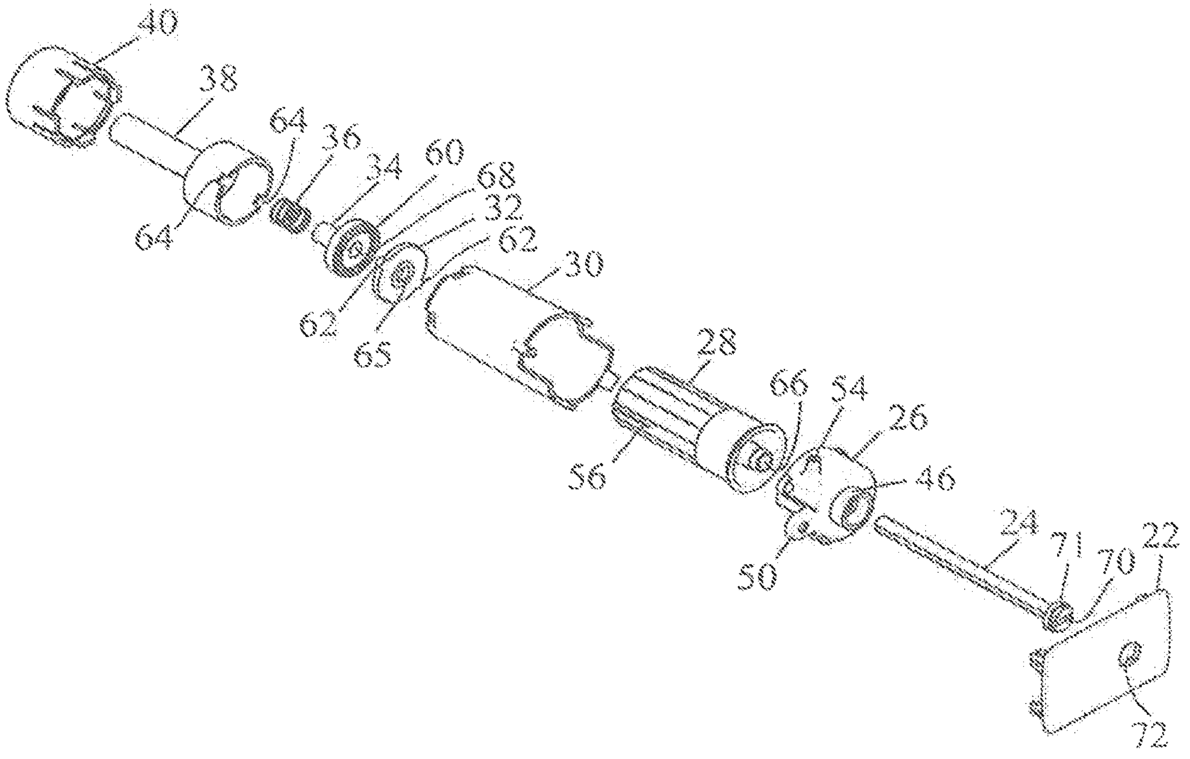
FIG. 5 is an opposite-end exploded perspective view of the lift station and skew adjustment mechanism of FIG. 4.
Figure 6:
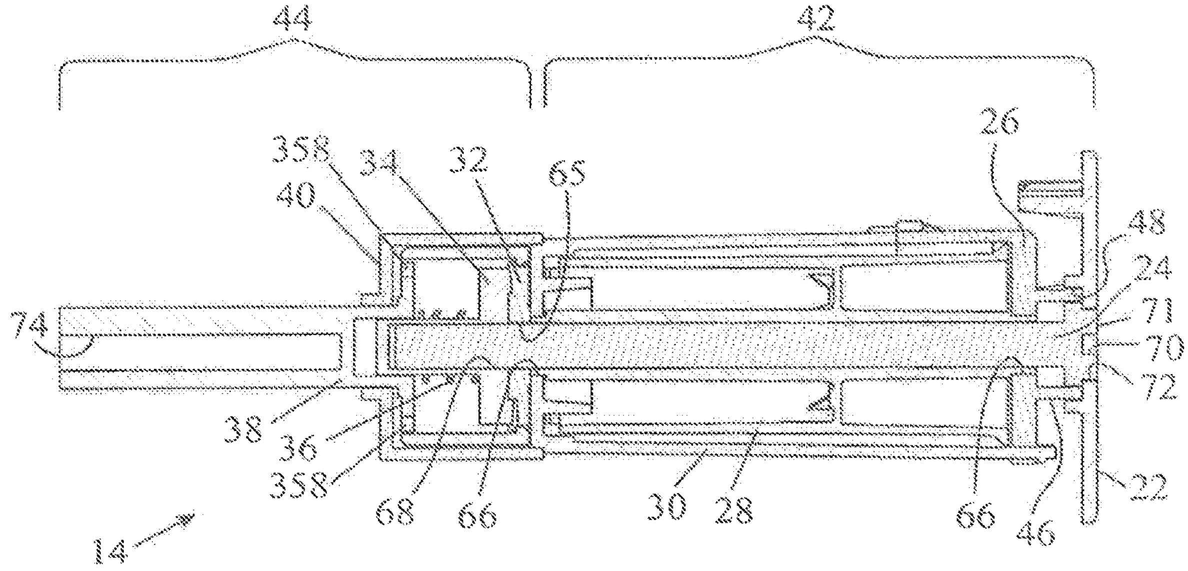
FIG. 6 is a section view along line 6-6 of FIG. 3.

Referring to FIGS. 4, 5, and especially to FIG. 6, the spool 28 is mounted for clockwise and counter-clockwise rotation within the assembly formed by snapping together the spool housing 30 and the lift-cord-routing cap 26. The right end of the lift portion 42 is supported by a cylindrical projection 46 on the lift-cord-routing cap 26, which is received in a cylindrical recess 48 on the end cap 22. The left end of the lift portion 42 is supported indirectly by the lift rod 18, via the skew adjustment shaft 24, the lift rod adapter 38 and the coupler 40.

The leftmost lift station 16, which does not include the skew adjustment mechanism 44, is supported at the left end by its respective end cap 22 and at the right end directly by the lift rod 18.

The lift-cord-routing cap 26 defines an "ear" 50 (See FIG. 4), which is secured to a projection 52 on the end cap 22 to prevent rotation and axial movement of the spool housing 30 and lift-cord-routing cap 26 assembly. In this embodiment, the ear 50 is secured by a screw 51.

The lift-cord-routing cap 26 also defines an inlet port 54 to guide the lift cord into the spool housing 30 and onto the spool 28. An enlargement on one end of the lift cord can be inserted behind a slotted opening 56 in the spool 28 to releasably secure the lift cord to the spool 28.

Referring back to FIGS. 4 and 5, the plunger housing cap 32 is a flat, disk-shaped element defining a plurality of teeth 58 on its first face. These teeth 58 mesh with a set of corresponding teeth 60 on the face of the plunger 34 such that, when the compression spring 36 biases the plunger 34 in a first axial direction, toward the plunger housing cap 32, the teeth 60 on the plunger 34 fit into the grooves between the teeth 58 on the plunger housing cap 32, and the teeth 58 on the plunger housing cap 32 fit into the grooves between the teeth 60 on the plunger, forcing both the plunger housing cap 32 and the plunger 34 to rotate together as a single piece.

The plunger housing cap 32 also defines two radially-projecting tabs 62 which are received in corresponding slots 64 on the lift rod adapter 38 such that the plunger housing cap 32 and the lift rod adapter 38 are keyed together, so they are always engaged and rotate together. The lift rod adapter 38 has an inner bore 74 (See FIG. 4), which defines a non-circular cross-sectional profile that matches the profile of the lift rod 18. The lift rod 18 is received in that inner bore 74, thereby keying the lift rod adapter 38 and the lift rod 18 together.

The coupler 40 is mounted onto the spool housing 30, provides rotational support for the lift rod adapter 38 and serves to secure the skew adjustment mechanism portion 44 to the lift portion 42.

As best shown in FIG. 5, both the inner bore 66 of the spool 28 and the inner bore 68 of the plunger 34 define a non-circular cross-sectional profile, which closely matches the non-circular cross-sectional profile of the skew adjustment shaft 24 (which is also identical to the non-circular cross-sectional profile of the lift rod 18).

As shown in FIG. 6, the skew adjustment shaft 24 extends through the inner bore 66 of the spool 28, through the inner bore 68 of the plunger 34, and through the inner bore 65 of the plunger housing cap 32. Due to matching non-circular cross-sectional profiles, the skew adjustment shaft 24, the spool 28, and the plunger 34 are all keyed together for rotation in unison. The inner bore 65 of the plunger housing cap 32 has a circular profile, which allows relative rotation between the skew adjustment shaft 24 and the plunger housing cap 32.

The head 71 of the skew adjustment shaft 24 defines a slotted recess 70 which may be accessed by the user via a conventional flat screwdriver extending through the opening 72 in the end cap 22. Of course, the slotted recess 70 could be shaped differently so as to be engaged by a different shape of driver, such as an Allen wrench, for example.

Referring now to FIG. 6, as the shade 10 is lowered (while the user is depressing the lever 21 to unlock the lock 20 and is pulling down on the bottom rail 12), the spools 28 (See FIG. 5) rotate in a clockwise direction as the lift cord (not shown) unwinds from the spools 28. The rotation of the spool 28 on the rightmost lift station 14 with skew adjustment mechanism 44 causes the skew adjustment shaft 24 to rotate, which causes the plunger 34 to rotate as well. Since the compression spring 36 biases the plunger 34 against the plunger housing cap 32, the teeth 60 on the plunger 34 engage the teeth 58 on the plunger housing cap 32 such that both the plunger 34 and the plunger housing cap 32 rotate in unison. Finally, since the plunger housing cap 32 is keyed to the lift rod adapter 38 via the tabs 62 which engage the slots 64, and the lift rod adapter 38 is keyed to the lift rod 18, as the shade is lowered the entire drive train connecting the two lift spools 28 (i.e. the skew adjustment shaft 24, both the left and right spools 28, the plunger housing cap 32, the plunger 34, the lift rod adapter 38, and the lift rod 18 also rotate in unison. The spring (not shown) on the spring motor 76 winds up as the shade is lowered, increasing the potential energy of the spring motor 76 in preparation to assist in the raising of the shade, as described later.

To raise the shade 10, the user grasps the lock mechanism 20 and presses the button 21 to disengage the lock, then lifts up on the bottom rail 12. The spring motor 76 rotates the lift rod 18 in a counter-clockwise direction, which rotates the entire drive train described above so as to wind any slack lift cord onto the left and right spools 28 of the left and right lift stations 16, 14, respectively.

Figure 7:
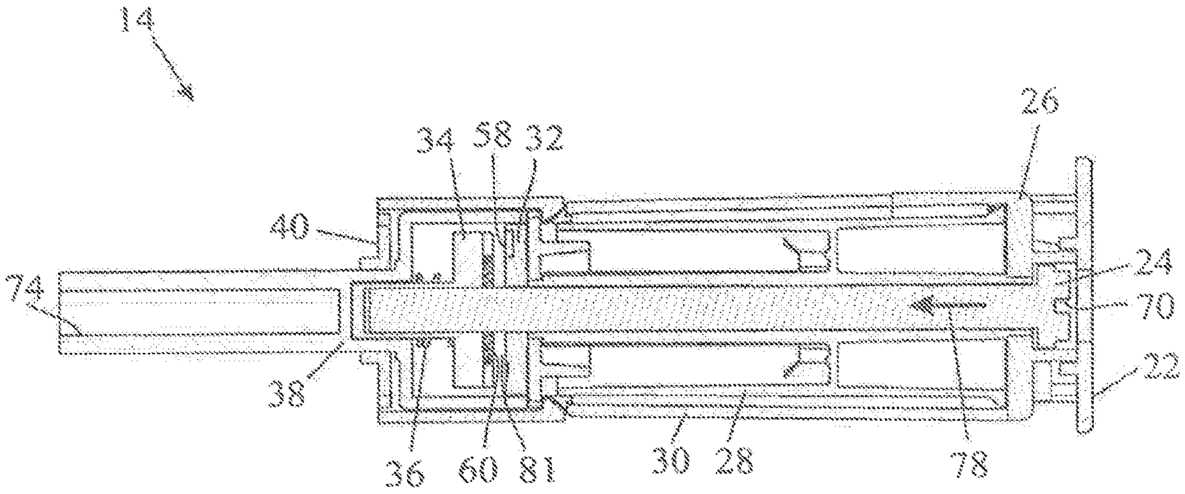
FIG. 7 is the same view as FIG. 6, but with the plunger in the disengaged position.
Figure 8:
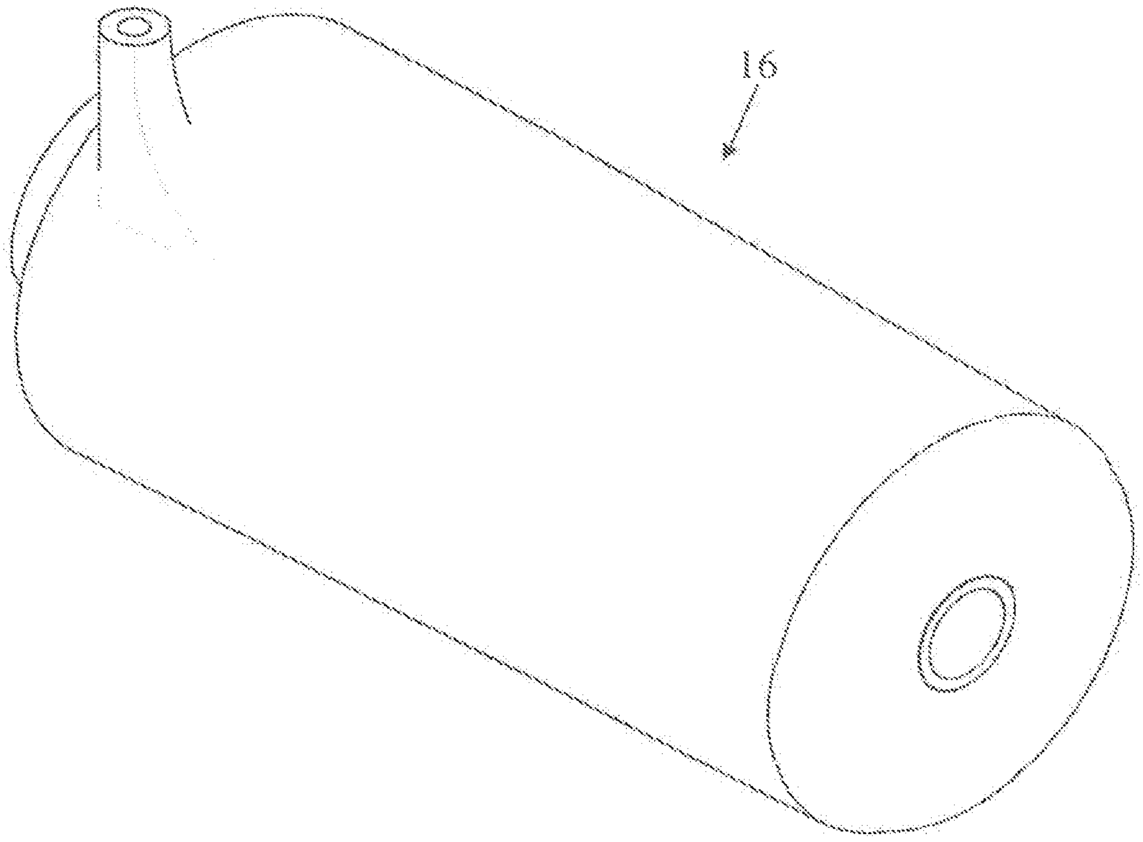
FIG. 8 is a perspective view of the leftmost lift station of FIG. 2.

Referring now to FIG. 7, to adjust a skewed rail condition, the user inserts the end of a flat screwdriver into the slotted recess 70 of the skew adjustment shaft 24 to both push it inwardly (in the direction of the arrow 78 and against the biasing force of the spring 36) and to rotate it (in a clockwise direction to lower this end of the shade or in a counter-clockwise direction to raise this end of the shade).

As the user pushes the skew adjustment shaft 24 in the direction of the arrow 78, he moves the plunger 34 axially to the left against the biasing spring 36, compressing the biasing spring 36 and creating a gap 81 between the teeth 58 of the plunger housing cap 32 and the teeth 60 of the plunger 34 so they are no longer engaged, thereby disconnecting the drive train between the lift spools 28 of the leftmost 16 and rightmost 14 lift mechanisms. Since the plunger 34 and the plunger housing cap 32 are no longer engaged, the plunger 34 is free to rotate without driving the plunger housing cap 32 (or any other part of the drive downstream of the plunger housing cap 32, such as the lift rod adapter 38 and the lift rod 18). The user can then rotate the skew adjustment shaft 24, which also rotates the spool 28 to which it is keyed, either winding up the lift cord onto the spool 28 or unwinding the lift cord from the spool 28 to adjust the effective length of one lift cord relative to the other until the skewed condition of the rail has been corrected.

As soon as the user releases the skew adjustment shaft 24, the compression spring 36 pushes the plunger 34 back against the plunger housing cap 32 such that their corresponding teeth 60, 58 engage each other to automatically reconnect the drive train between the left and right spools 28 so the left and right spools 28 again rotate together.

To summarize, the axial displacement of the plunger 34 engages and disengages the plunger 34 from the plunger housing cap 32 which is keyed to the lift rod adapter 38 and to the lift rod 18, thereby connecting and disconnecting the drive train between the left and right lift spools 28.

If the right side of the movable rail 12 is too high relative to the left side, the user pushes in on the skew adjustment shaft 24 to disengage the teeth 58, 60. The user then rotates the skew adjustment shaft 24 in the direction to unwind the rightmost lift cord from the rightmost spool 28, thereby lowering the right end of the movable rail 12 relative to the left end until the movable rail 12 is horizontal or has the desired amount of skew.

It should be noted that, in this particular mechanism, it is not strictly necessary to push in on the skew adjustment shaft 24 in order to correct a skewed rail condition, because the mechanism includes a sort of one-way brake or one-way drive, in that the teeth 58, 60 are tapered to permit the teeth 60 of the plunger 34 to slip past the teeth 58 of the plunger housing cap 32 in one direction but not in the other, forming a ratchet type of mechanism, which allows the user to rotate the lift spool 28 in the rightmost lift station 14 to roll up the lift cord without pushing in on the skew adjustment shaft 24. So, if the right side of the movable rail 12 is too low, the skew adjustment shaft 24 need only be rotated in a direction to wind the right lift cord onto the lift spool 28 of the rightmost lift station 14. The teeth, 58, 60 act as a ratcheting mechanism, making a distinct audible "click" as the skew adjustment shaft 24 ratchets to wind the lift cord onto the rightmost spool 28, shortening the effective length of the rightmost lift cord and raising the right end of the movable rail 12 relative to the left end. Note that the plunger 34 is still displaced axially a short distance during each of these discreet minute ratcheting adjustments, just far enough for the teeth 60 of the plunger 34 to skip past the teeth 58 of the plunger housing cap 32.

Figure 9:
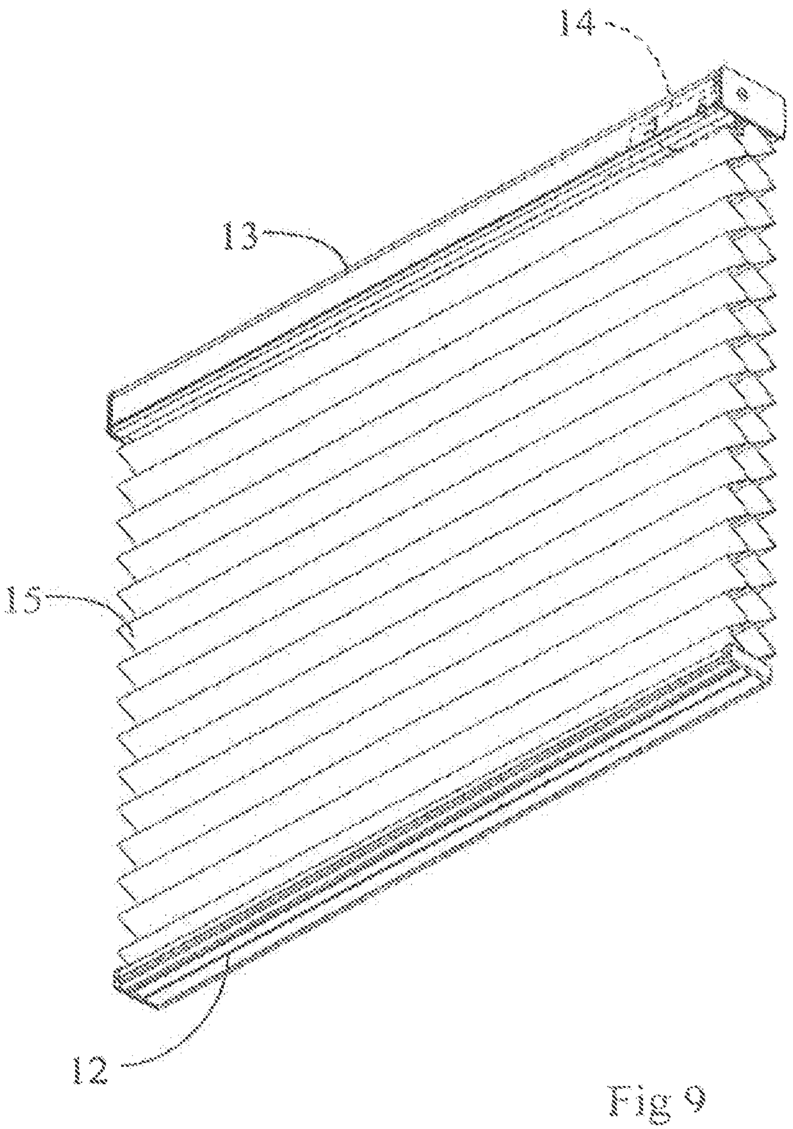
FIG. 9 is a perspective view of an alternative embodiment in which the lift stations are located in the head rail.

While the embodiment described above has the lift stations 14, 16 and lift spools 28 and the skew adjustment mechanism located on the movable rail, they alternatively could be located in the head rail 13, with the lift cords extending down from the lift spools 28 in the head rail 13, through the covering material 15, and secured at the bottom rail 12, as shown in FIG. 9. In that case, if the movable rail 12 becomes skewed, the adjustments described with respect to the first embodiment would instead be made in the head rail to bring the bottom rail 12 back into horizontal alignment.

Also, the window covering could include a head rail which supports an intermediate movable rail and a bottom movable rail. In that case, the skew adjustment for the bottom movable rail could be located in the intermediate movable rail from which the bottom rail is suspended, or the skew adjustment mechanism could be located in the bottom movable rail.

In this first embodiment, the connecting member which connects the spools together through the drive train is the plunger 34, and the mechanism for engaging and disengaging the plunger 34 with the drive train is ratchet teeth and a biasing spring. Of course, other engaging/disengaging mechanisms could be used and other mechanisms for maintaining the engagement when no outside force is applied could be used as an alternative to the arrangement described with respect to the first embodiment.

Alternate Embodiment Using Spring Brake and Including Combination of End Cap and End Lock FIGS. 10-30 disclose an alternative cellular shade 100.

It should be noted that, in order to adjust the skew angle of the bottom rail 12 in the first embodiment of FIG. 1 using the skew adjustment mechanism 44 (shown in FIG. 6), there is a small opening in the end cap 22 (See FIG. 2) in order to access the skew adjustment shaft 24. This may be aesthetically undesirable. The alternative is to eliminate the small opening and just remove the end cap 22 in order to gain access to the skew adjustment shaft 24. In prior art rails, the end cap has an interference fit with the rail, utilizing crush ribs on the end cap to secure the end cap to the end of the rail. Unfortunately, after disassembling the end cap only a very few times, the crush ribs are worn to the point that they no longer secure the end cap to the end of the rail. This makes it impractical to repeatedly remove and reattach the end cap.

The end cap 102 and end lock 118 of this embodiment (See FIG. 11) as described below, solve that issue, allowing multiple assembly/disassembly procedures of the end cap 102 with no loss in gripping power between the end cap 102 and the rail 106.

Figure 10:
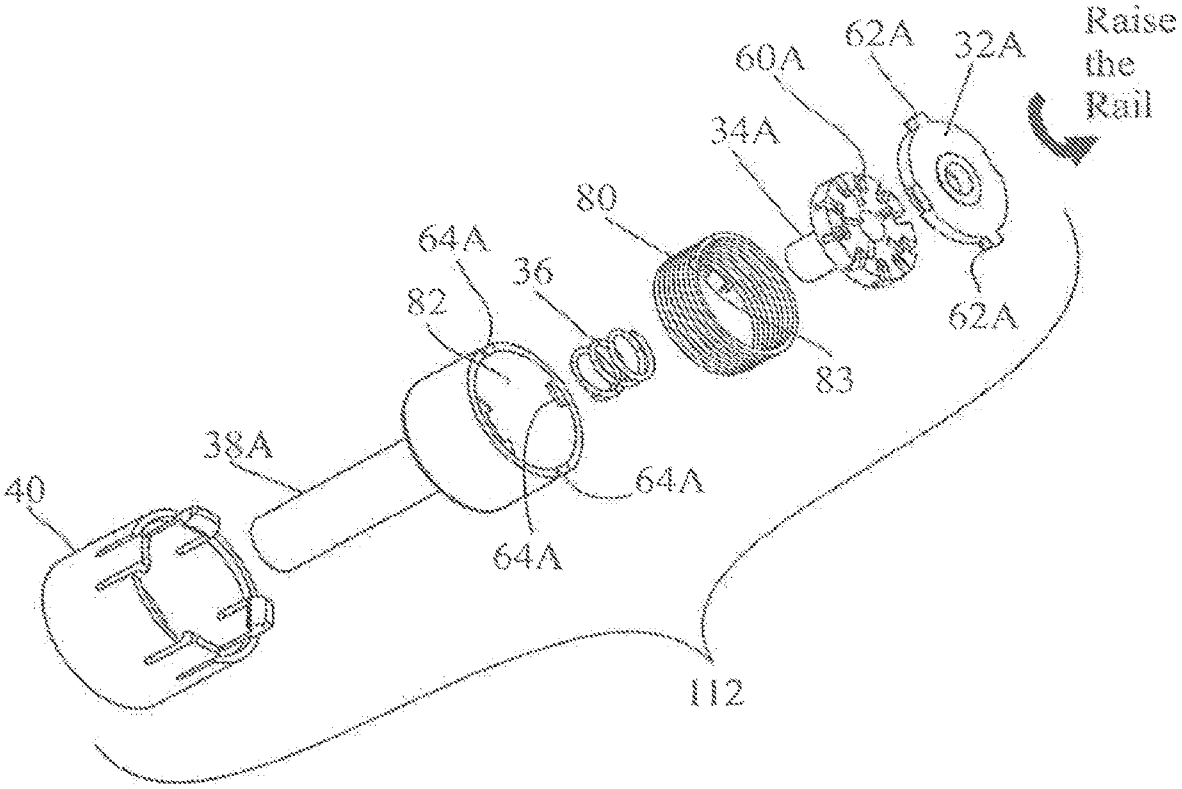
FIG. 10 is an exploded perspective view of an alternative embodiment of a skew adjustment mechanism, using a one-way wrap spring in the disconnect mechanism.
Figure 11:
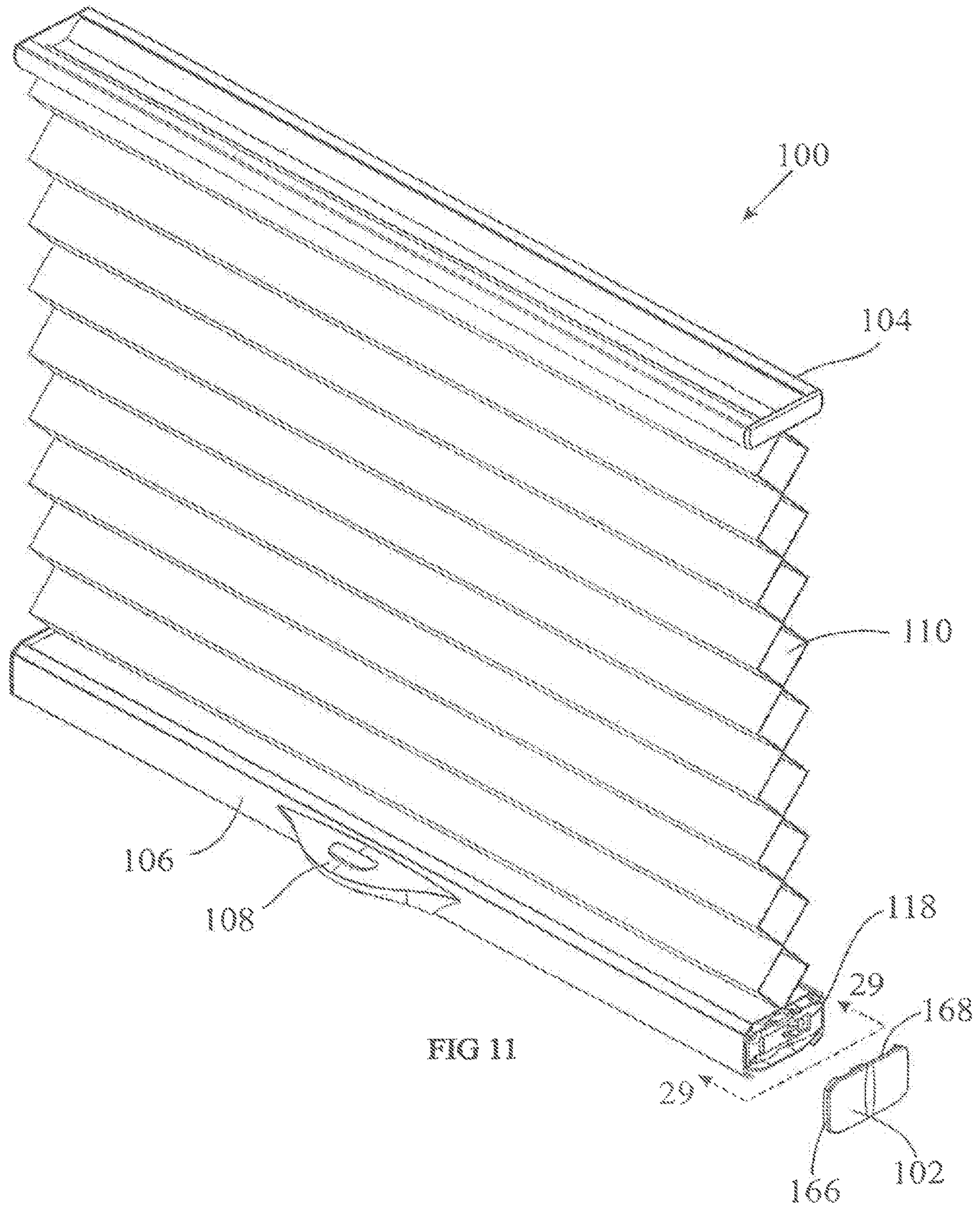
FIG. 11 is a partially exploded, perspective view of a cellular shade, similar to that of FIG. 1, but with a snap-on end cap on the bottom rail.
Figures 12, 13:
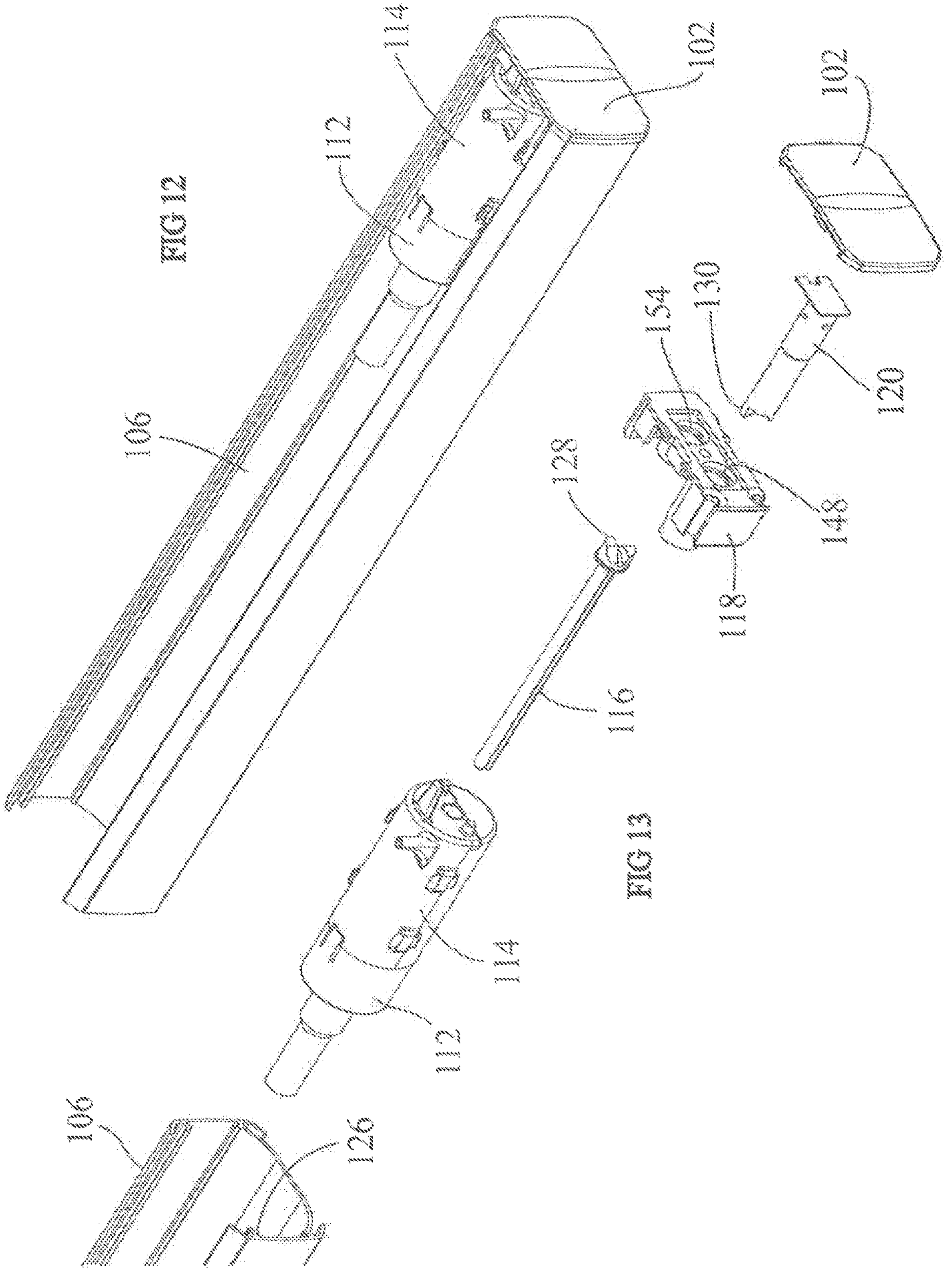
FIG. 12 is a perspective view of a portion of the bottom rail of FIG. 11, with the lift rod and left end cap omitted for clarity.
FIG. 13 is a broken away, exploded, perspective view of the portion of the bottom rail shown in FIG. 12.

Referring to FIG. 11, the cellular shade 100 includes a top rail 104 and a movable rail 106 including a handle 108 for raising (retracting) and lowering (extending) the cellular shade covering 110. Referring to FIGS. 12 and 13, the movable rail 106 houses a skew adjustment mechanism 112 (as shown in FIG. 10) and a lift station 114 (similar to the lift station 42 of FIG. 6). The skew adjustment mechanism 112 snaps onto the lift station 114, which significantly increases the mechanical integrity of the assembly and reduces the mechanical backlash between the components 112, 114.

Referring to FIG. 13, the components in this embodiment which are different from those shown in FIG. 2 include the skew adjustment shaft 116, an end lock 118, a skew adjustment tool 120, and the end cap 102, all described in more detail below. Also, the skew adjustment mechanism 112, shown in FIG. 10, differs from the skew adjustment mechanism 44, shown in FIG. 6, as described in more detail below.

Very briefly, the end lock 118 (See also FIGS. 29 and 30) is attached to the rail 106 via a screw 122 which is directed by the walls of the cylindrical opening 124 in a direction so it cuts its own threads in the metal rail 106 as the screw 122 is threaded between the semi-cylindrical opening 124 and the longitudinal ridge 126 of the rail 106. The end cap 102 snaps onto the end lock 118, as described in more detail later. The skew adjustment tool 120 is stowed in the end lock 118 when not in use. When the skew adjustment tool 120 is in use, its head 130 (See FIG. 19) matches up with the corresponding head 128 (See FIG. 20) of the skew adjustment shaft 116, as described in more detail later.

The skew adjustment shaft 116 engages the spool 28 in the lift station 114 and engages the plunger 34A of the skew adjustment mechanism 112.

Figure 19:
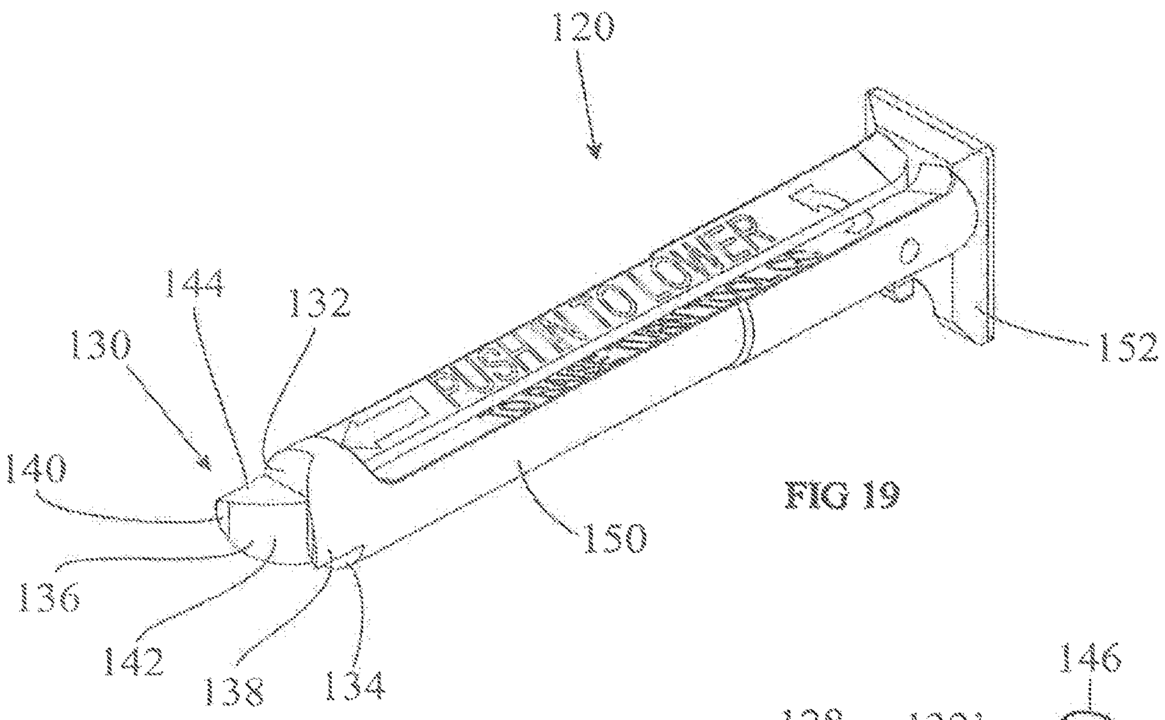
FIG. 19 is a perspective view of the skew adjustment tool of FIG. 16-18.
Figure 20:
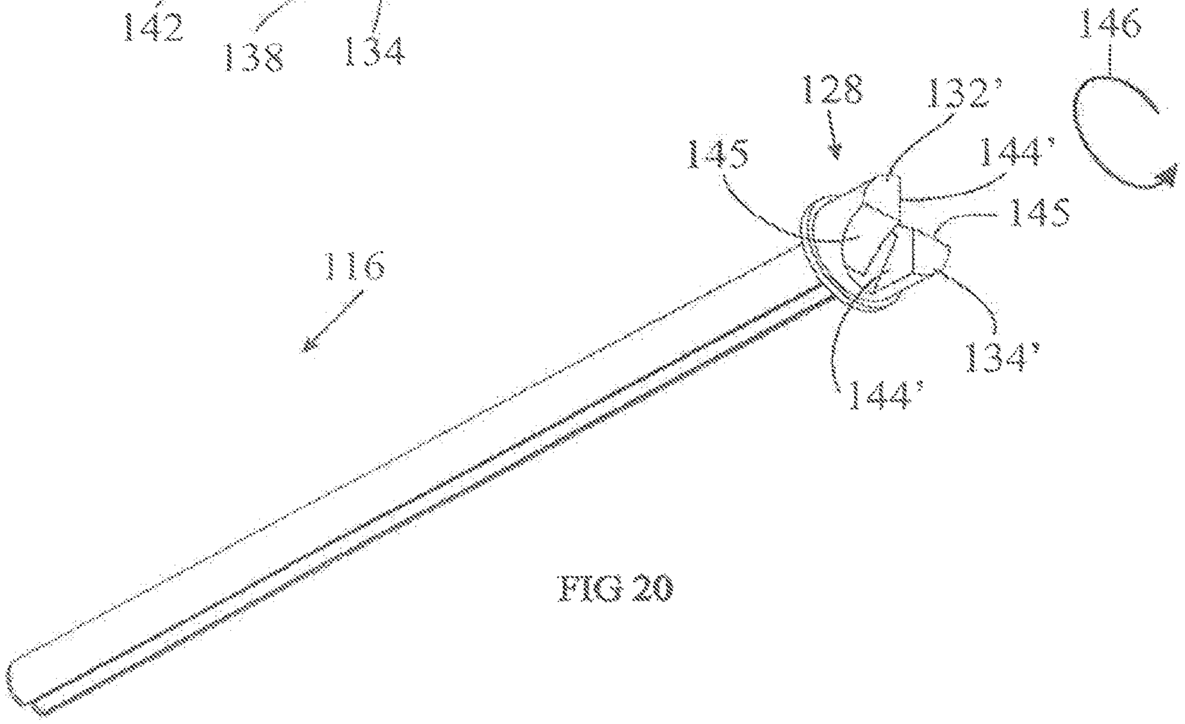
FIG. 20 is a perspective view of the skew adjustment shaft that mates up with the skew adjustment tool of FIG. 19 to adjust the skew on the shade of FIG. 11.

Referring now to FIGS. 19 and 20, the skew adjustment tool 120 is an "L"-shaped element with a head 130 which drives the matching head 128 on the skew adjustment shaft 116 in one direction only (which is the direction in which the plunger 34, see FIG. 4, and the spool 28 need to rotate to shorten the lift cord in order to correct any skew of the rail 12). The head 130 of this one-way tool 120 may be described by considering it in quadrants (See also FIG. 17). Two of the opposing quadrants 132, 134 are made up of a flat, planar wall which is perpendicular to the longitudinal or axial direction of the skew adjustment tool 120). Each of the other two opposing quadrants 136, 138 defines first and second surfaces 142, 144 extending in the longitudinal or axial direction of the skew adjustment tool 120. The first, arcuate, convex surface 142 terminates in a small flat, "truncated" point 140 that is parallel to the surfaces of the first and second quadrants 132, 134. The second surface 144 defines a flat wall which is perpendicular to the surfaces of the first and second quadrants 132, 134.

As shown in FIG. 20, the skew adjustment shaft 116 includes a head 128 which mates up with the head 130 of the skew adjustment tool 120. The main difference between the head 128 of the skew adjustment shaft and the head 130 of the skew adjustment tool is that the surface 145 (See FIG.

20) on the head 128 of the skew adjustment shaft 116 defines a concave, arcuate surface 145 which matches and receives the convex profile of the surface 142 of the skew adjustment tool 120, and the flat surfaces 132', 134' on the head 128 which are perpendicular to the axis of the shaft 116 are at the very tip or end of the head 128, lying at the end of a projection having a flat wall 144' and an arcuate wall 145 instead of being recessed up into the head as are the flat surfaces 132, 134 on the tool 120. In other words, the head 128 of the shaft 116 is complementary in shape to the head 130 of the tool 120 so the two heads 128, 130 mate up completely with each other.

The skew adjustment tool 120 can drive the skew adjustment shaft 116 only in the direction of the arrow 146 (in the counterclockwise direction as seen from the vantage point of FIG. 20), when the flat walls 144 of the head 130 of the tool 120 abut against and drive the flat walls 144' of the head 128 of the shaft 116. When attempting to drive the skew adjustment shaft 116 in the clockwise direction, the convex, arcuate surfaces 142 of the skew adjustment tool 120 will slide up along the concave arcuate surfaces 144 of the skew adjustment shaft 116, and will be unable to drive the skew adjustment shaft 116 in that direction.

In a preferred embodiment, the skew adjustment tool 120 is made from a softer material than the skew adjustment shaft 116 (out of a non-aggressive plastic, for instance) which will provide ample useful life for the skew adjustment tool 120 without any damage to the skew adjustment shaft 116.

Figure 23:
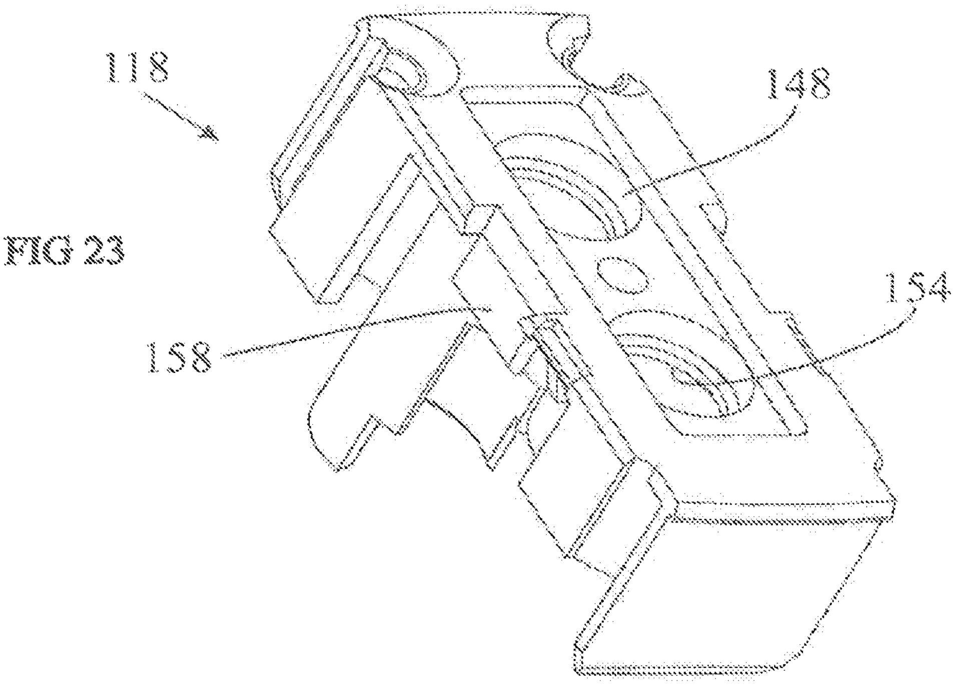
FIG. 23 is a perspective view of the outer side of the end lock of FIG. 13.
Figure 24:
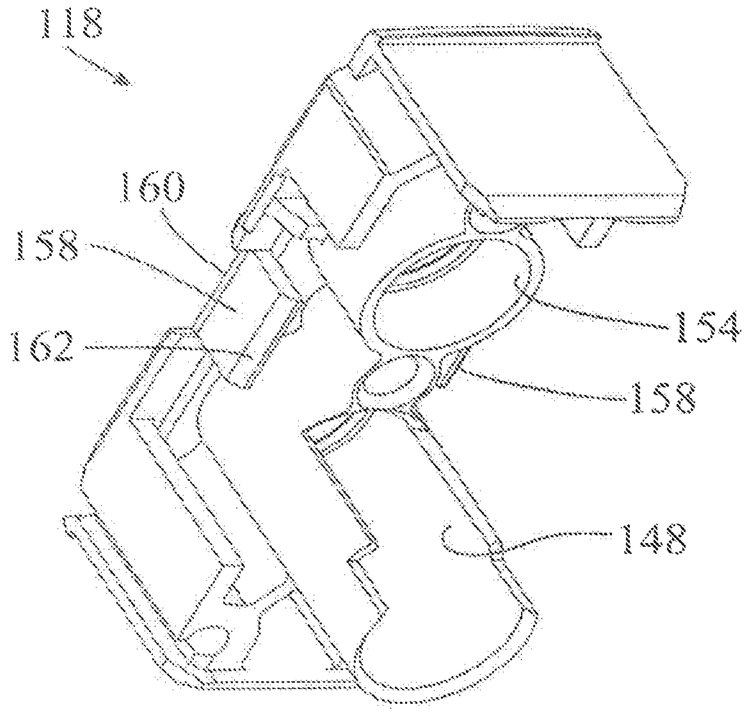
FIG. 24 is a perspective view of the inner side of the end lock of FIG. 23.

When the skew adjustment tool 120 is not in use, the leg 150 of the skew adjustment tool 120 is stowed in a hollow cylindrical cavity 148 in the end lock 118 (See FIGS. 23 and 24). In this embodiment, the leg 150 is stamped or inscribed with simple instructions for its use.

FIG. 10 shows the skew adjustment mechanism 112, which has a different type of disengaging mechanism than in the previous embodiment. In this skew adjustment mechanism 112, the disengaging mechanism includes a one-way drive or one-way brake that uses a wrap spring 80 to provide the braking force instead of using interlocking teeth and a ratchet mechanism as shown in the first embodiment.

In this embodiment, the plunger housing cap 32A has tabs 62A, which engage recesses 64A in the lift rod adapter 38A, so the plunger housing cap 32A rotates with the lift rod adapter 38A and serves as a cover to enclose the internal parts. It does not have teeth as in the cap 32 of the previous embodiment. The biasing spring 36 biases the plunger 34A into engagement with the right end tab 83 of the wrap spring 80, with the right end tab 83 of the wrap spring 80 fitting into one of the radially-extending slots 60A in the plunger 34.

Under normal operating conditions, the outer surface of the wrap spring 80 engages the inner surface 82 of the lift rod adapter 38A, creating enough friction between the spring 80 and the inner surface 82 to cause the plunger 34A to rotate with the lift rod adapter 38A, which causes the left and right lift spools 28 in the left and right lift stations 16, 114 to rotate together as the user raises and lowers the covering 110 by raising and lowering the handle 108.

When the right end tab 83 of the wrap spring 80 is engaged with the plunger 34A, and the user uses the tool 120 to rotate the skew adjustment shaft 116 in a direction to wrap up the lift cord onto the lift spool 28 (counterclockwise when viewed from the right end in this embodiment), the rotation of the skew adjustment shaft 116, which is keyed to the plunger 34A and to the lift spool 28 of the lift station 114, causes rotation of the lift spool 28 of the lift station 114. It also causes rotation of the plunger 34A, which pushes the tab 83 of the wrap spring 80 in the counterclockwise direction, causing the outside diameter of the wrap spring 80 to be reduced, so the outer surface of the wrap spring 80 slips relative to the inner surface 82 of the lift rod adapter 38A, thereby disengaging the drive train between the left and right spools 28, which allows the user to rotate the plunger 34A and wrap up the cord onto the right most lift spool 28 to shorten the effective length of the rightmost lift cord relative to the leftmost lift cord, thereby raising the right end of the movable rail 106 relative to the left end.

If the user wants to unwind the lift cord from the rightmost lift spool 28 without also unwinding the lift cord from the leftmost lift spool 28, he uses the tool 120 to push in on the skew adjustment shaft 116, which pushes the plunger 34A axially against the biasing spring 36, which disengages the wrap spring 80 from the plunger 34A. This disengages the drive train between the left and right lift spools 28. Once the drive train between the left and right lift spools 28 is disengaged, the user can pull the right end of the rail 106 downwardly to rotate the rightmost lift spool 28 relative to the leftmost lift spool 28 in order to unwind the rightmost lift cord from its spool 28 to increase the effective length of the rightmost lift cord relative to the leftmost lift cord.

Once the movable rail 106 has reached a horizontal, non-skewed position, or a position with the desired amount of skew, the user can remove the tool 120 that was depressing the skew adjustment shaft 116. At that point, the biasing spring 36 pushes the plunger 34A back to the right, re-engaging the plunger 34A with the end tab 83 on the wrap spring 80 and re-connecting the drive train between the two lift spools 28 so they again rotate together.

Of course, other types of mechanisms for connecting and disconnecting the drive train could be used as alternatives as well, and there may be more than two lift spools interconnected by the drive train.

It would be possible to provide a skew adjustment mechanism on each of the lift stations, so the user could adjust the skew at either end of the rail, if desired.

The foot 152 of the "L"-shaped skew adjustment tool 120 provides an extension which may be used as a lever arm to rotate the tool 120. In this embodiment, the foot 152 is stamped or inscribed with a notice to the user to draw his attention to the fact that this tool may be used to adjust the skew adjustment mechanism 112. This notice is visible to the user when he removes the end cap 102 to adjust the skew on the rail 106 (as may also be seen in FIGS. 29 and 30 which feature a slightly different version of the notice on the tool 120').

Figure 14:
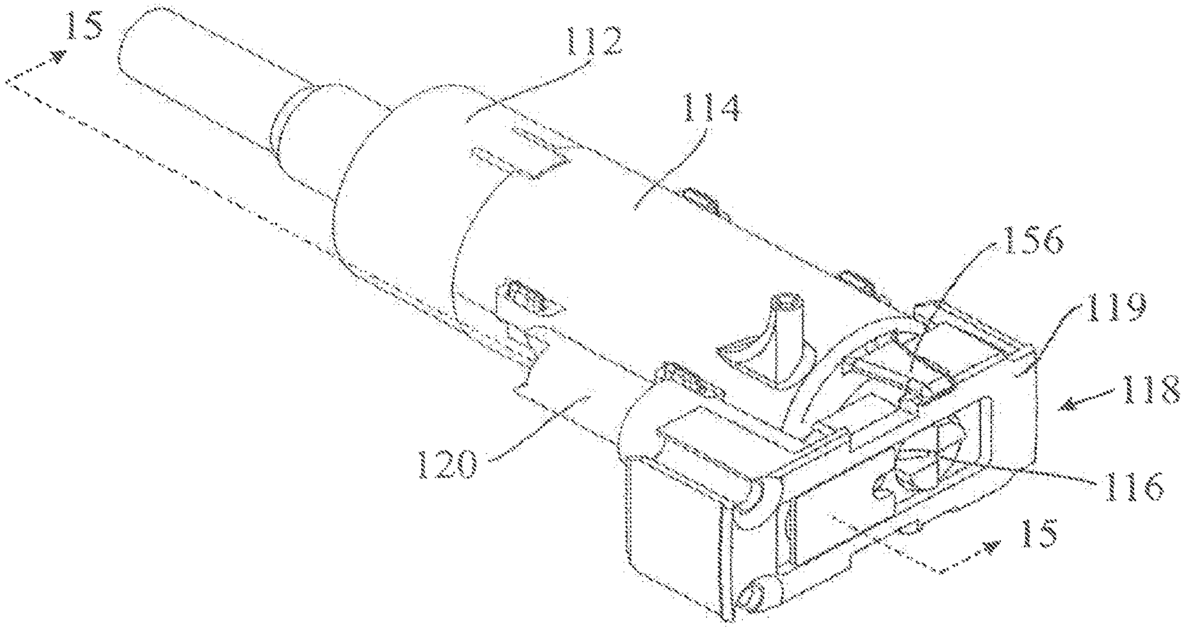
FIG. 14 is a perspective view of the end lock, lift station, and skew adjustment mechanism of FIGS. 12 and 13.
Figure 15:
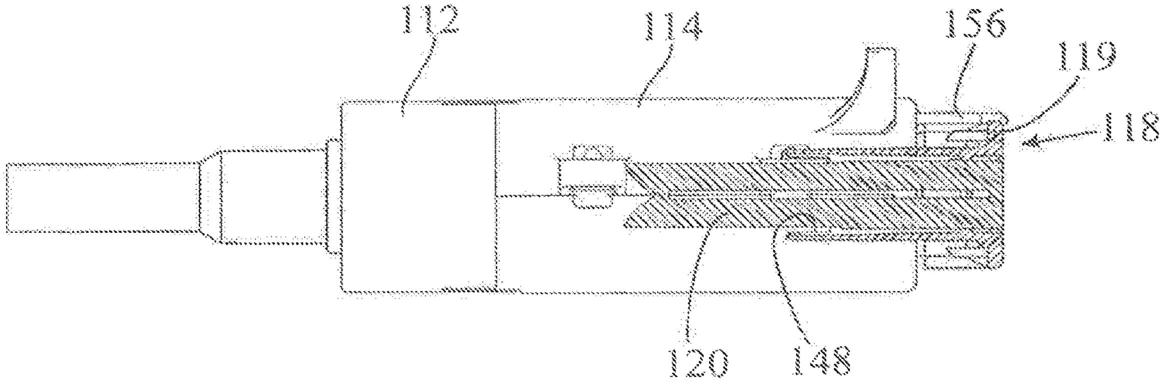
FIG. 15 is a section view along line 15-15 of FIG. 14.
Figure 18:
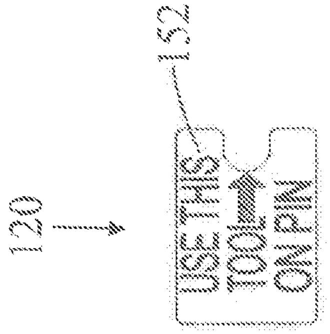
FIG. 18 is a view along line 18-18 of FIG. 16.
Figure 16:
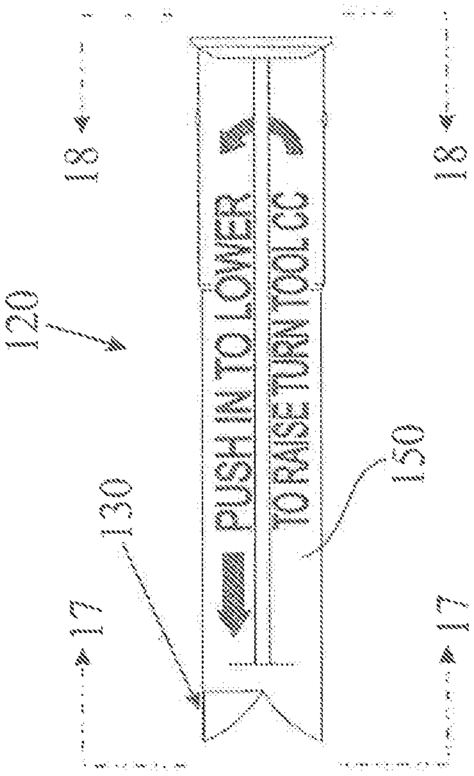
FIG. 16 is a side view of the skew adjustment tool of FIG. 13.
Figure 17:
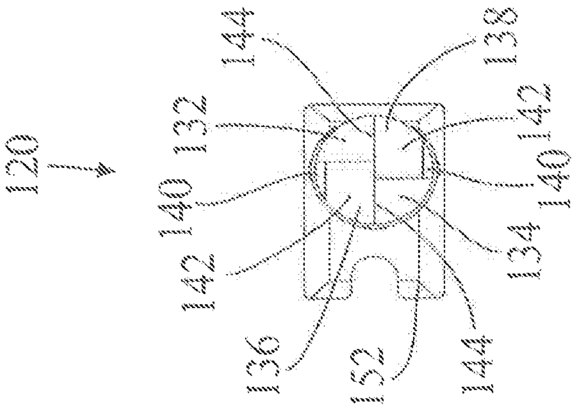
FIG. 17 is a view along line 17-17 of FIG. 16.

Referring to FIGS. 23 and 24, the end lock 118 is a substantially rectangular member defining first and second cylindrical cavities 148, 154 extending in the longitudinal direction of the rail 106. As described earlier, the cavity 148 receives the skew adjustment tool 120 (as shown also in FIGS. 14 and 15) when the tool 120 is stowed. The second cavity 154 provides access by the skew adjustment tool 120 to the head of the skew adjustment shaft 116. As shown in FIGS. 14 and 15, a finger 156 on the housing of the lift station 114 releasably engages the outer face 119 of the end lock 118 such that the end lock 118, the lift station 114, and the skew adjustment mechanism 112 all become one interlocked assembly.

Figure 21:
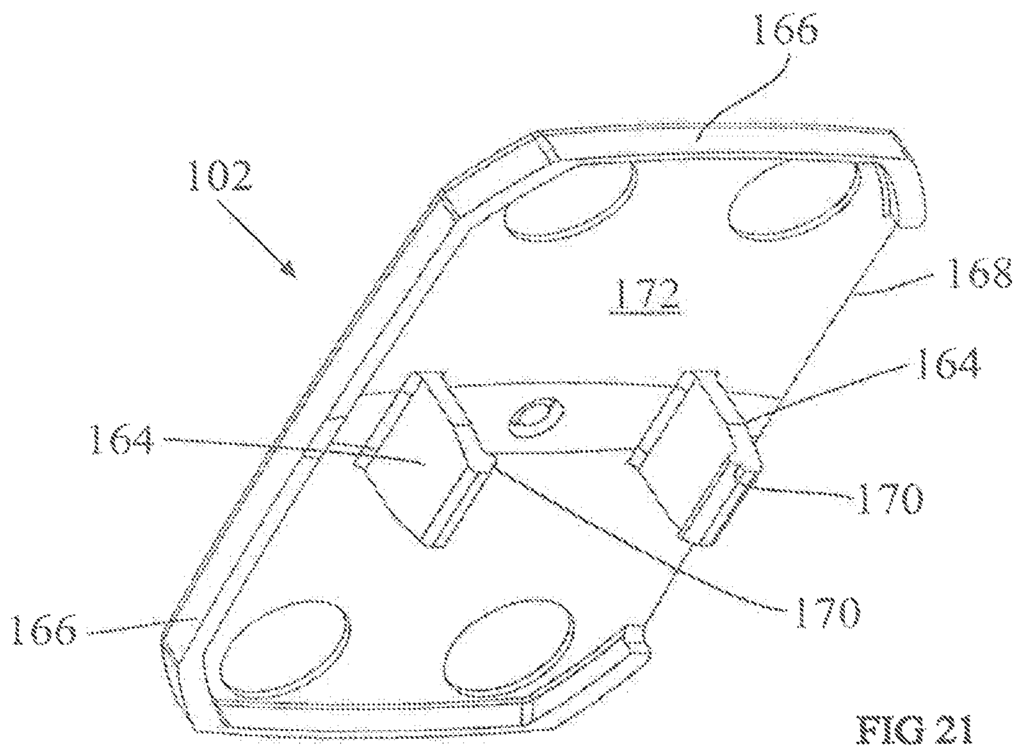
FIG. 21 is a perspective view of the inside of the end cap of FIG. 13.

As shown in FIG. 24, in order to mount the end cap 102 on the end lock 118, the end lock 118 defines upper and lower horizontal flat surfaces 158, each having a ramped surface 160 at its proximal end and a similarly ramped surface 162 at its distal end. These upper and lower horizontal flat surfaces 158 are located approximately midway along the front-to-back length of the end lock 118. As shown in FIG. 21, posts 164 projecting inwardly from the inner surface 172 of the end cap 102 have hooked ends 170 which releasably engage (snap onto) the inner ramps 162 on the end lock 118 to retain the end cap 102 on the end lock 118.

Figure 22:
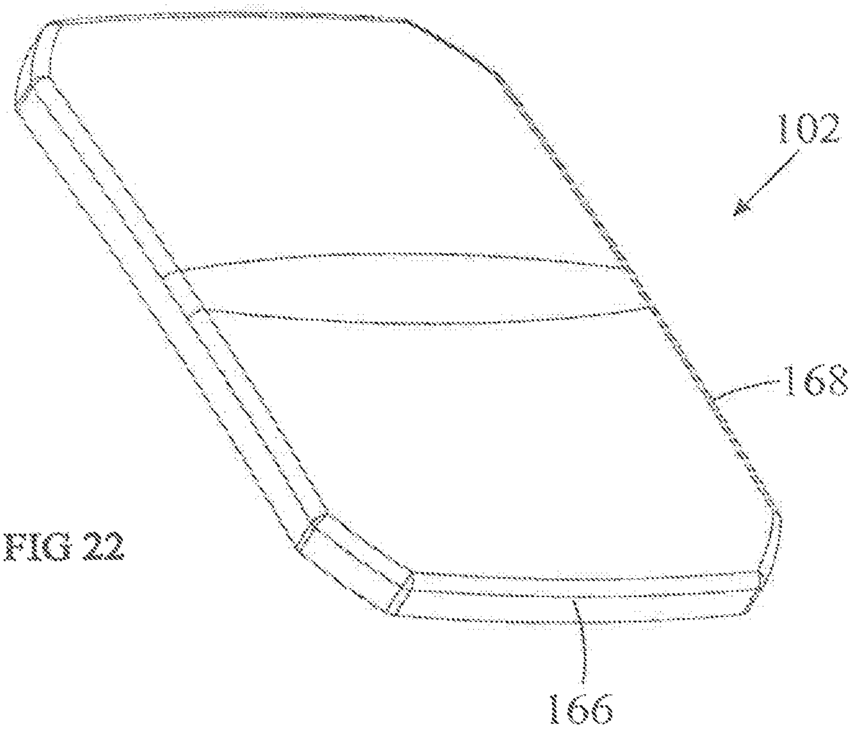
FIG. 22 is a perspective view of the outside of the end cap of FIG. 13.

Referring to FIGS. 21 and 22, the end cap 102 is a rectangular member having a slight curvature. A flange 166 surrounds the perimeter of three of the four edges of the end cap 102. The "top" edge 168 of the end cap 102 is "open" (has no flange) to allow the covering material 110 to extend to the very edge of the shade 100 without interfering with the end cap 102 (See FIG. 11).

Figure 26:
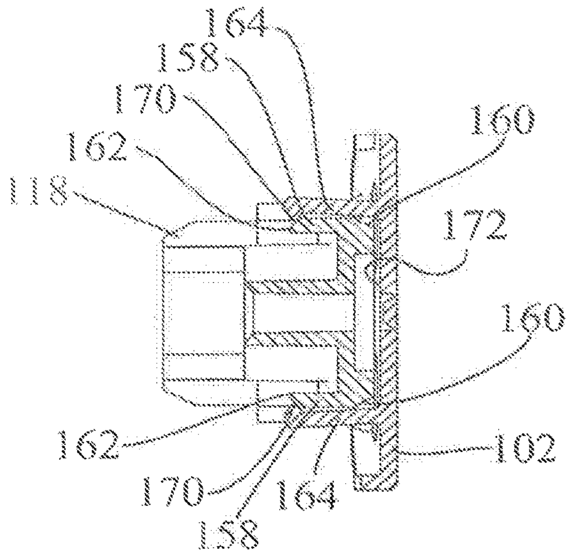
FIG. 26 is a section view along line 26-26 of FIG. 25.
Figure 28:
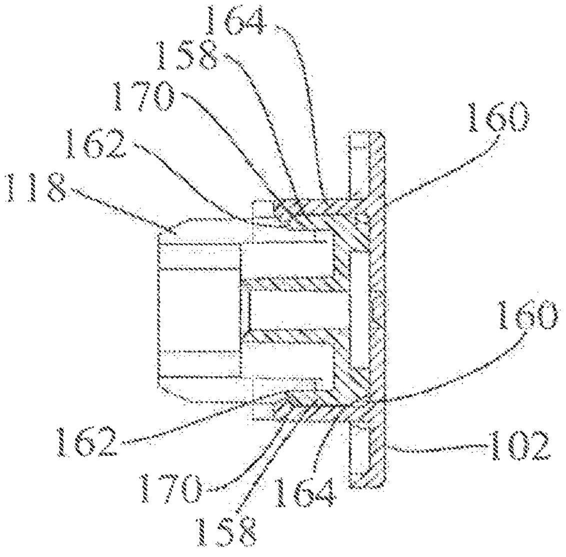
FIG. 28 is a section view along line 28-28 of FIG. 27.

Referring to FIGS. 21, 26, and 28, as the end cap 102 is pushed inwardly onto the end lock 118, the hooked ends 170 of the posts 164 of the end cap 102 are flexed outwardly by the ramped surfaces 160 on the end lock 118, slide along the flat surfaces 158, and then spring back to their original shape, where they contact the ramps 162 on the end lock 118.

Figure 25:
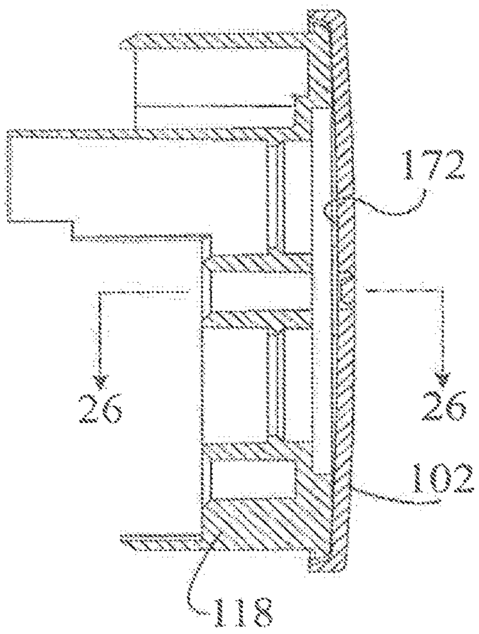
FIG. 25 is a section view of the end lock and the end cap of FIGS. 12 and 13 as these two pieces are first brought together but before they are snapped together.

FIGS. 25 and 26 show the relationship between the end cap 102 and the end lock 118 during assembly of these pieces, just before they are fully snapped together. It may be appreciated that the end cap 102 displays a slight curvature (a concavity on its inner surface 172.)

Figure 27:
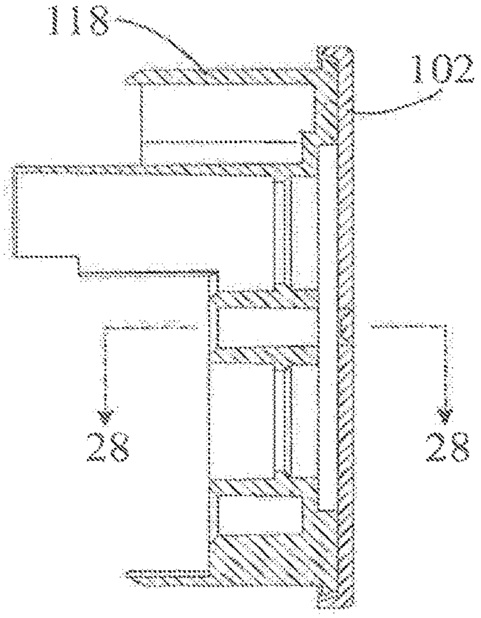
FIG. 27 is the same view as FIG. 25 but after the two pieces are snapped together.
Figure 29:
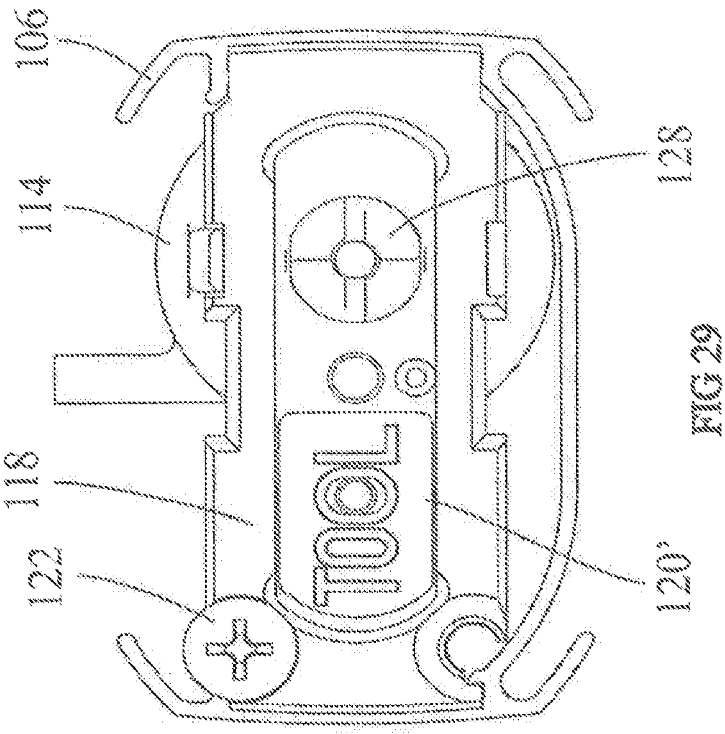
FIG. 29 is a view along line 29-29 Of FIG. 11.
Figure 30:
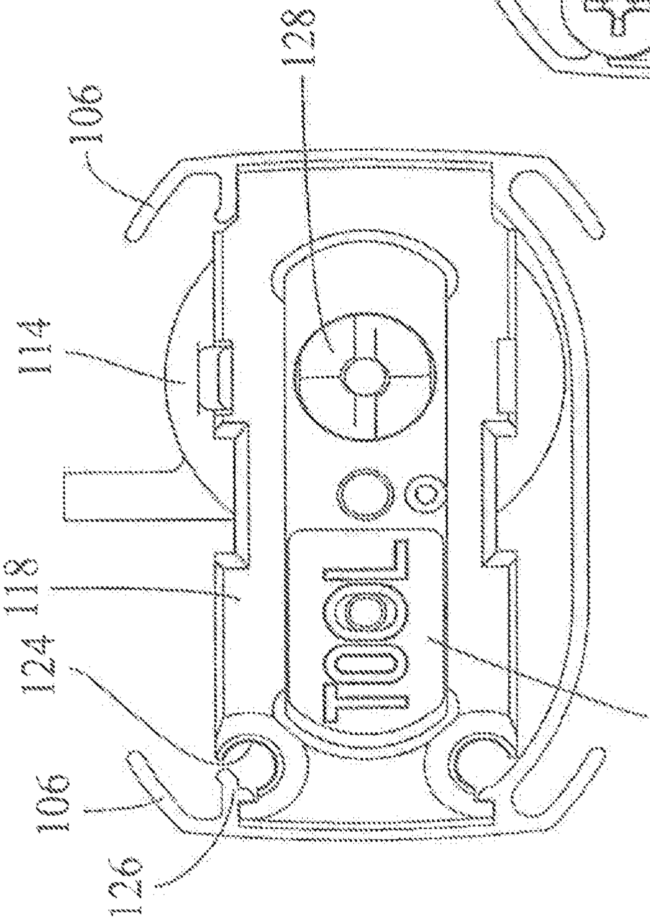
FIG. 30 is the same as FIG. 29, but with the securing screw removed.

FIGS. 27 and 28 show the relationship between the end cap 102 and the end lock 118 once the assembly of these pieces is completed, after they are fully snapped together. It may be appreciated that the end cap 102 no longer displays the slight curvature. As the fingers 170 on the posts 164 slide onto the distal ramped surfaces 162 of the end lock 118, the posts 164 snap back inwardly, pulling the end cap 102 snugly against the end lock 118, and the concavity on the inner surface 172 of the end cap 102 disappears. The end cap 102 is held tightly to the end lock 118, under tension provided by the spring action of the "straightened" concave surface 172 of the end cap 102. To remove the end cap 102 from the end lock 118, the user simply grasps the end cap 102 from the top and bottom edges near the location of the posts 164 and pulls outwardly. The fingers 170 slide up along the distal ramped surfaces 162 of the end lock 118, spreading the fingers 170 outwardly to release the end cap 102.

It should be noted that the skew adjustment tool 120 may be tethered to the end lock 118 to ensure that it is not misplaced. For instance, a small opening (not shown) anywhere along the leg 150 of the tool 120 may be used to tie a short length of cord (not shown) to the tool 120. The other end of the cord may be routed through the cavity 148 of the end lock 118 and tied to the end lock 118 itself. The length of cord would be chosen to be long enough to allow the tool 120 to be extracted from the end lock 118 and then used to push against (or rotate) the skew adjustment shaft 116 while remaining tethered to the end lock 118.

Alternate Embodiment of Lift Station

FIGS. 31-37 shown an alternate embodiment of a window covering 208, with an alternate embodiment of a lift station 114', which is similar to the lift station 114 of FIG. 12 but which allows two or more lift cords 200, 202 (See FIG. 32) to simultaneously travel through the same rout openings in the covering material 204 even though the lift cords 200, 202 each ultimately are connected to different lift stations 114', 114.

In the prior art, when there is an intermediate movable rail, each lift cord (the cord for the intermediate rail and the cord for the lower rail) has its own rout openings in the covering material, and the lift stations to which these different lift cords are attached are spaced apart horizontally so that the lift stations do not interfere with the lift cords. This is not an issue when the window covering is a cellular product (as shown in the bottom portion 212 of the shade of FIG. 31) as the cellular product hides the multiple lift cords extending vertically along the covering 212. However, if a portion of the window covering is open to expose the lift cords (such as the pleated shade portion 210 shown in the upper portion of FIG. 31), then running several lift cords which are spaced apart horizontally from each other results in an esthetically unappealing window covering.

The lift stations 114' in the intermediate rail 214 of FIG. 32 circumvent this problem by allowing two (or more) unrelated lift cords 200, 202 (See FIGS. 32, 33, and 36) to use the same set of vertically spaced-apart, aligned rout openings 203 on the covering material 204 (See FIG. 32), with a first lift cord 200 extending vertically from the head rail 216 and secured to the lift station 114' and a second, bypass lift cord 202 extending vertically from the head rail 216, going through the lift station 114' in the intermediate rail 214, and continuing vertically downwardly to a lift station 114 or 14 (not shown) in the lower rail 220 without affecting the functionality of the lift station 114' and with no frictional penalty on the second lift cord 202, as explained in more detail below. (The lift stations 114 and 14 are shown in previous embodiments.)

It should be noted that feeding the ends of the lift cords 200, 202 into the inlet nozzle 206 on the lift station 114' would be a daunting task, as there are two relatively small and independent openings 232, 234 in very close proximity to each other. However, the lift station 114' includes a collection trough 240 at the distal end of the inlet nozzle 206 that helps collect frayed ends on the lift cord and consolidates and lines up the end of the lift cord (200 or 202) with one of the openings (232, 234 respectively) to facilitate the feeding of the end of the lift cord, as explained in more detail later.

Referring now to FIGS. 31 and 32, the window covering 208 includes an upper pleated shade portion 210 and a lower cellular shade portion 212. The upper pleated shade portion 210 is suspended from the top rail 216 via a first set of lift cords 200; each of the lift cords 200 is secured to a spool 218 (shown in FIG. 36) which is mounted for rotation in one of the lift stations 114' located in the intermediate movable rail 214.

The lower cellular shade portion 212 is suspended from the top rail 216 via a second set of lift cords 202; each of the lift cords 202 being secured to a spool 28 (See FIG. 6) mounted for rotation in a lift station 114 or 14 located in a lower movable rail 220, similar to FIG. 2. It should be noted that the lift cords 202 are guided by and go through the lift stations 114' in the intermediate rail 214 without interacting with, or otherwise functionally affecting, the lift stations 114' and with no frictional penalty on the bypassed lift cords 202. The advantage, as best appreciated in FIG. 32, is that both sets of lift cords 200, 202 may use the same set of aligned rout openings 203 through the upper pleated shade portion 210 as these two sets of lift cords 200, 202 travel in very close side-by-side relationship to each other, giving the impression of a single cord.

Figure 34:
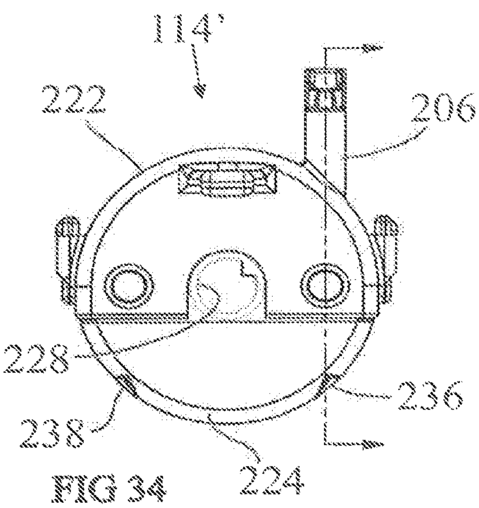
FIG. 34 is an end view of the bypass lift station of FIG. 33, with the lift cords removed for clarity.
Figure 35:
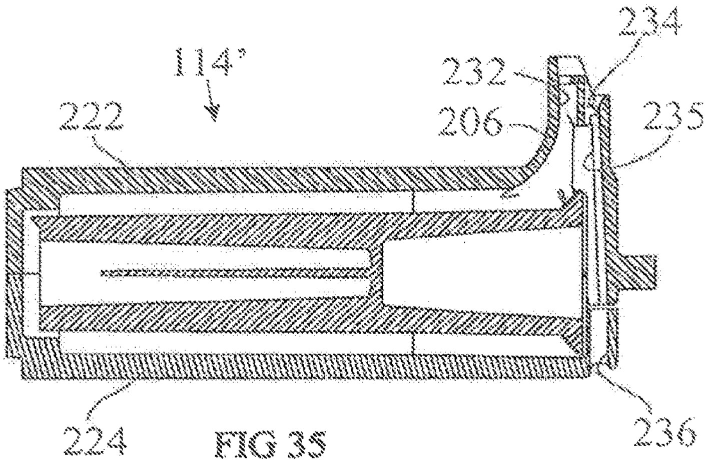
FIG. 35 is section view along line 35-35 of FIG. 34.
Figure 36:
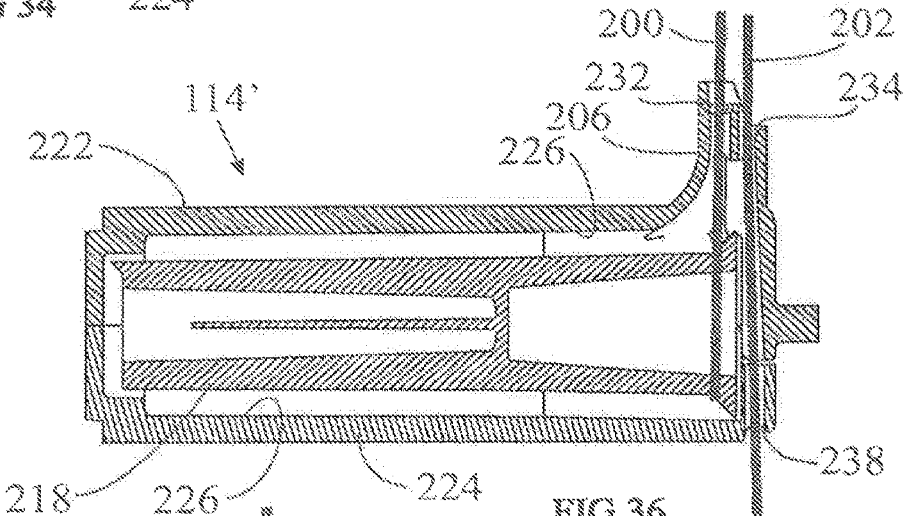
FIG. 36 is identical to FIG. 35, but showing the lift cords of FIG. 33.
Figure 38:
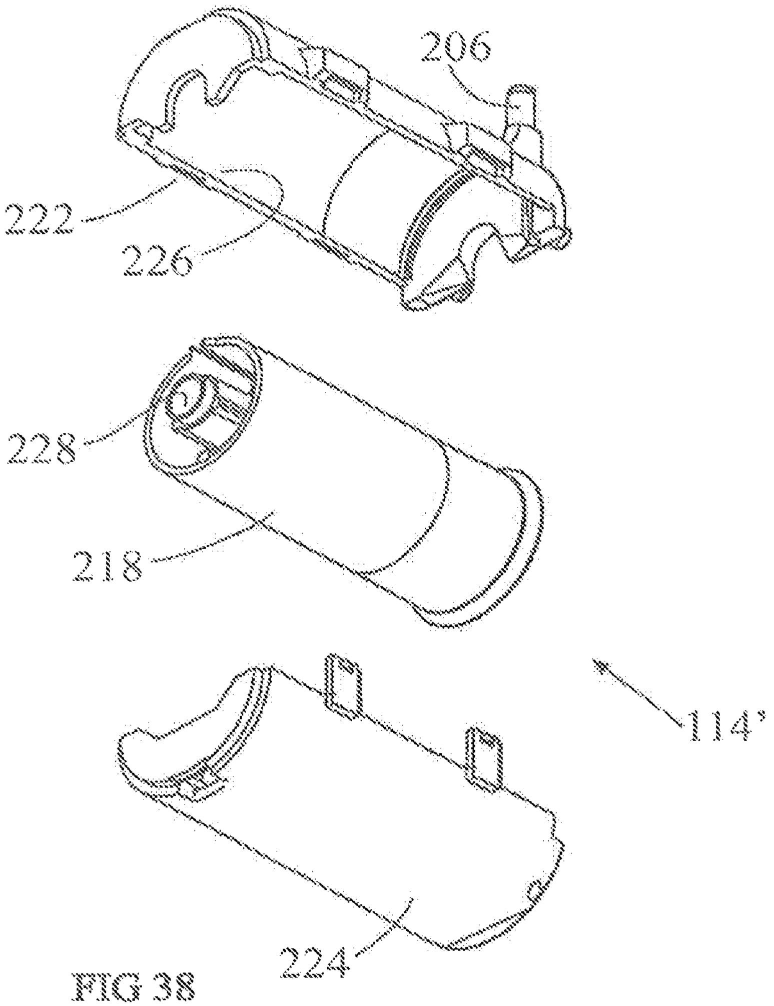
FIG. 38 is an exploded, perspective view of the lift station of FIG. 33.

Referring to FIG. 38, each of the lift stations 114' includes a base 222, a cover 224, and a spool 218 mounted for rotation inside the cavity 226 formed by the base 222 and the cover 224 as they snap together, as shown in FIGS. 35 and 36. The spool 218 is completely enclosed by the housing formed by the base 222 and the cover 224, with the end of the lift cord 200 secured to the spool 218 such that rotation of the spool 218 around its longitudinal axis results in the lift cord 200 winding up onto the spool 218 (or unwinding, depending on the direction of rotation of the spool 218). The spool 218 defines a hollow shaft 228 with a non-circular profile (See FIG. 34) to positively engage a lift rod 230 (See FIG. 32) such that rotation of the lift rod 230 results in rotation of the spools of the lift stations 114' and vice versa.

Figure 33:
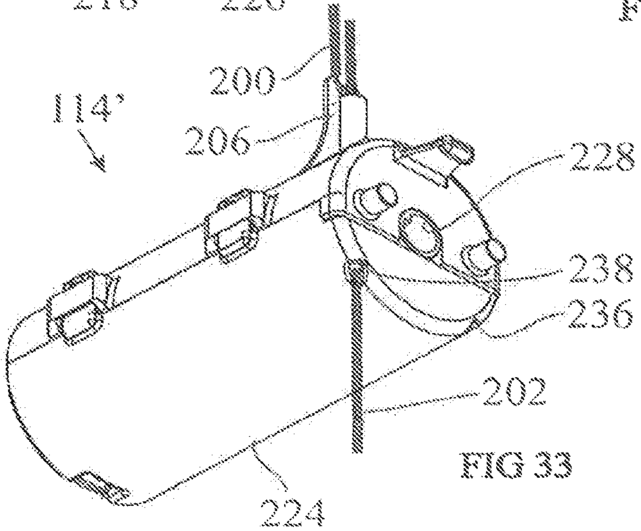
FIG. 33 is a perspective view of one of the bypass lift stations of FIG. 32.
Figure 39:
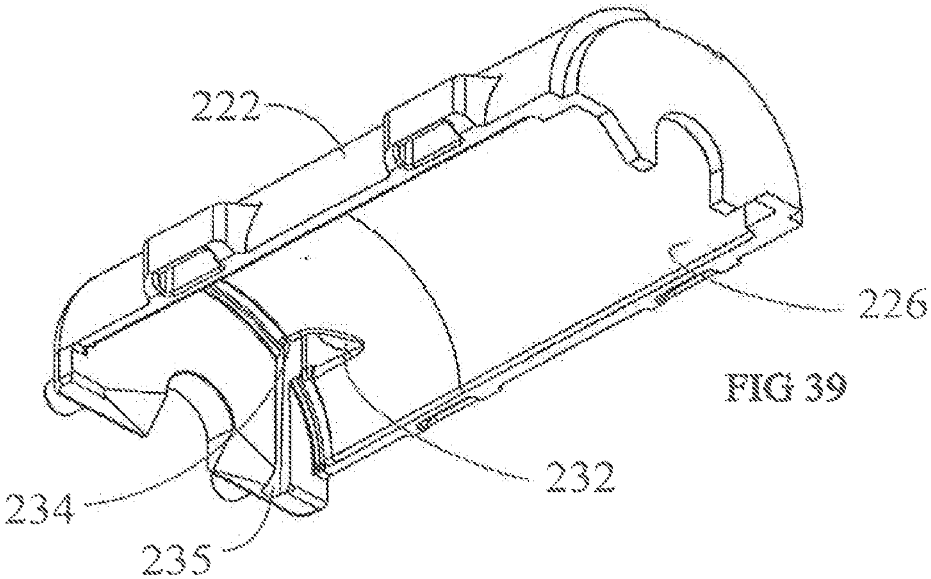
FIG. 39 is a perspective view of the base of FIG. 38.

As may be appreciated from FIGS. 33, 34, and 35, the base 222 includes an inlet nozzle 206 which defines first and second through openings 232, 234 (See FIG. 35). The first opening 232 receives the first lift cord 200 and guides it into the cavity 226, and the lift cord 200 is then secured to the spool 218 of the lift station 114'. The second opening 234 extends through an open channel 235 (See FIG. 39) in the end of the base 222 and also connects to the cavity 226.

The cover 224 defines first and second through openings 236, 238 (See FIGS. 34 and 35) which lead from the cavity 226 to the outside of the lift station 114'. At least one of the openings 236, 238 lines up vertically with the corresponding opening 234 on the base 222, depending on the configuration of the lift station 114'. That is, the cover 224 is a universal cover to be used regardless of whether the lift station 114' is a right hand station (as shown in FIG. 34, wherein the inlet nozzle 206 is offset to the right of the hollow shaft 228 of the spool 218 and wherein the opening 236 on the cover 224 lines up with the opening 234 on the base 222) or a left hand station (as shown in FIG. 33, wherein the inlet nozzle 206 is offset to the left of the hollow shaft 228 of the spool 218 and wherein the opening 238 on the cover 224 lines up with the opening 234 on the base 222). In either case, the lift cord 202 extends straight through the lift station 114' without affecting the functionality of the lift station 114' and with no frictional penalty on the lift cord 202, as best appreciated in FIG. 36.

This same bypass arrangement can be achieved using the lift cord routing cap 26 of FIGS. 3-5.

Figure 37:
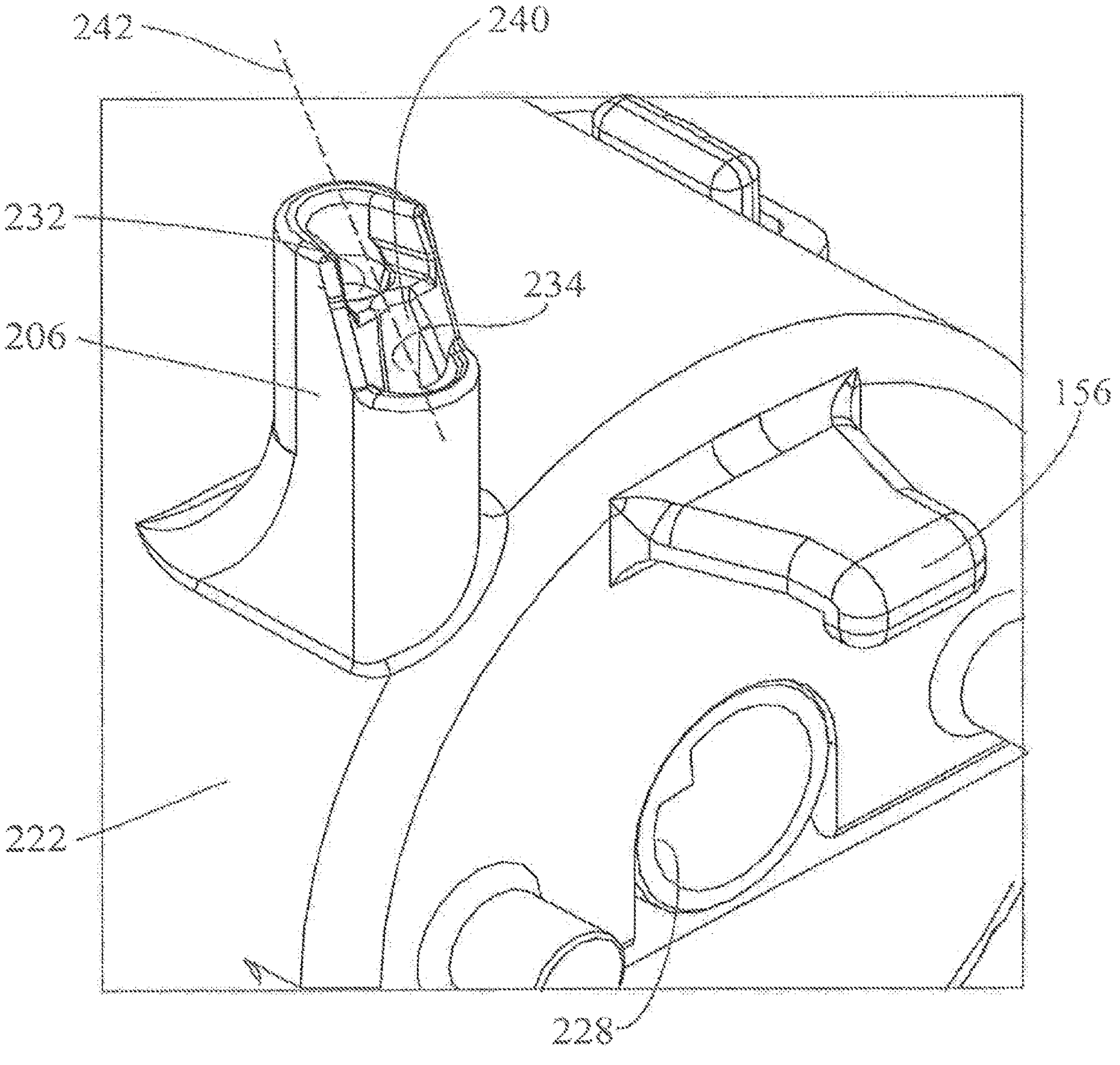
FIG. 37 is an enlarged perspective view of the inlet nozzle portion of the bypass lift station of FIG. 33.

Referring now to FIG. 37, the inlet nozzle 206 defines a tapered, "U"-shaped collection trough 240 which lies at an angle defined by the imaginary line 242. The trough 234 is narrower at the top than at the bottom. The imaginary line 242 defining the slope of the wall of the trough at the midpoint of the trough 240 intersects the vertical axes of both openings 232, 234. Of course, those points of intersection are at different heights due to the skewed nature of the axis 242. The walls of the trough 240 are radiused inwardly to help collect and consolidate any loose ends of the lift cord, as described below.

To feed the lift cord 200 through the opening 232, the end of the lift cord 200 is pressed into the trough 240. The act of pressing the end of the lift cord 200 into the trough 240 forces any loose ends/frayed ends to come together in the trough 240. Also, as the cord is pulled upwardly, the ends of the cord are squeezed together by the narrowing wall of the trough. The lift cord 200 also may be rotated (or twirled) so all sides of the cord come into contact with the trough 240 in order to press together the frayed ends on all sides of the cord 200.

It is then a simple matter of lowering the consolidated end of the lift cord 200 into the opening 232. The same procedure is followed to feed the lift cord 202 through the opening 234.

This trough and feeding arrangement also may be provided on the lift cord routing cap 26 of FIGS. 3-5.

To assemble the lift station 114' the end of the first lift cord 200 is inserted into the upper portion of the trough 240, as discussed above, and the end is pushed into the opening 232 of the base 222 of the lift station 114'. Once the end of the lift cord 200 enters into the cavity 226 (before the cover 224 is assembled to the base 222) the lift cord 200 is secured to the spool 218. Next, the second lift cord 202 is likewise threaded through the second opening 234 of the inlet nozzle 206, with the aid of the trough 240, as discussed above. Once the second lift cord 202 enters into the cavity 226, it is threaded through the outlet opening (236 or 238) in the cover 224 until the end of the cord 202 exits the cover 224. The spool 218 is then mounted for rotation inside the cavity 226, and the cover 224 is snapped onto the base 222. The assembled lift station 114' may now be installed onto a lift rod 230 inside the intermediate rail 214.

Of course, the second lift cord 202 then extends downwardly through the covering 212 (see FIG. 31) and is secured to its respective spool in the bottom rail 220.

Alternate Embodiments of the Skew Adjustment Mechanism Including an Auto-Lock for the Opposite End of the Skew Adjustment Mechanism Referring back to FIG. 2, it may be appreciated that the lift stations 14, 16 are both powered by a common spring motor 76. As has been described above with respect to that embodiment, the skew adjustment mechanism disengages the rightmost lift station 14 from the lift rod 18 (and from the rest of the drive including the motor 76 and the leftmost lift station 16).

If the lock mechanism 20 on the rail 12 is not a two-way lock as described above but rather is a one-way lock, which allows the user to raise the movable rail 12 without disengaging the lock 20, then it would be possible during the skew adjustment process, while the rightmost lift station 14 is disconnected from the drive train, for the motor 76 to overcome the weight of the rail and the inertia in the system and begin to wind up the spool on the lift station 16, causing an unintended rise of the left end of the bottom rail 12 of the shade 10 while the user is adjusting the skew on the rightmost lift station 14.

FIGS. 40-53 show an alternate embodiment of a skew adjustment arrangement 300 with an auto-lock feature to ensure that the lift rod 18 is locked against rotation to prevent the unintended rise of the shade 10 while the skew is being adjusted.

Figures 40, 41:
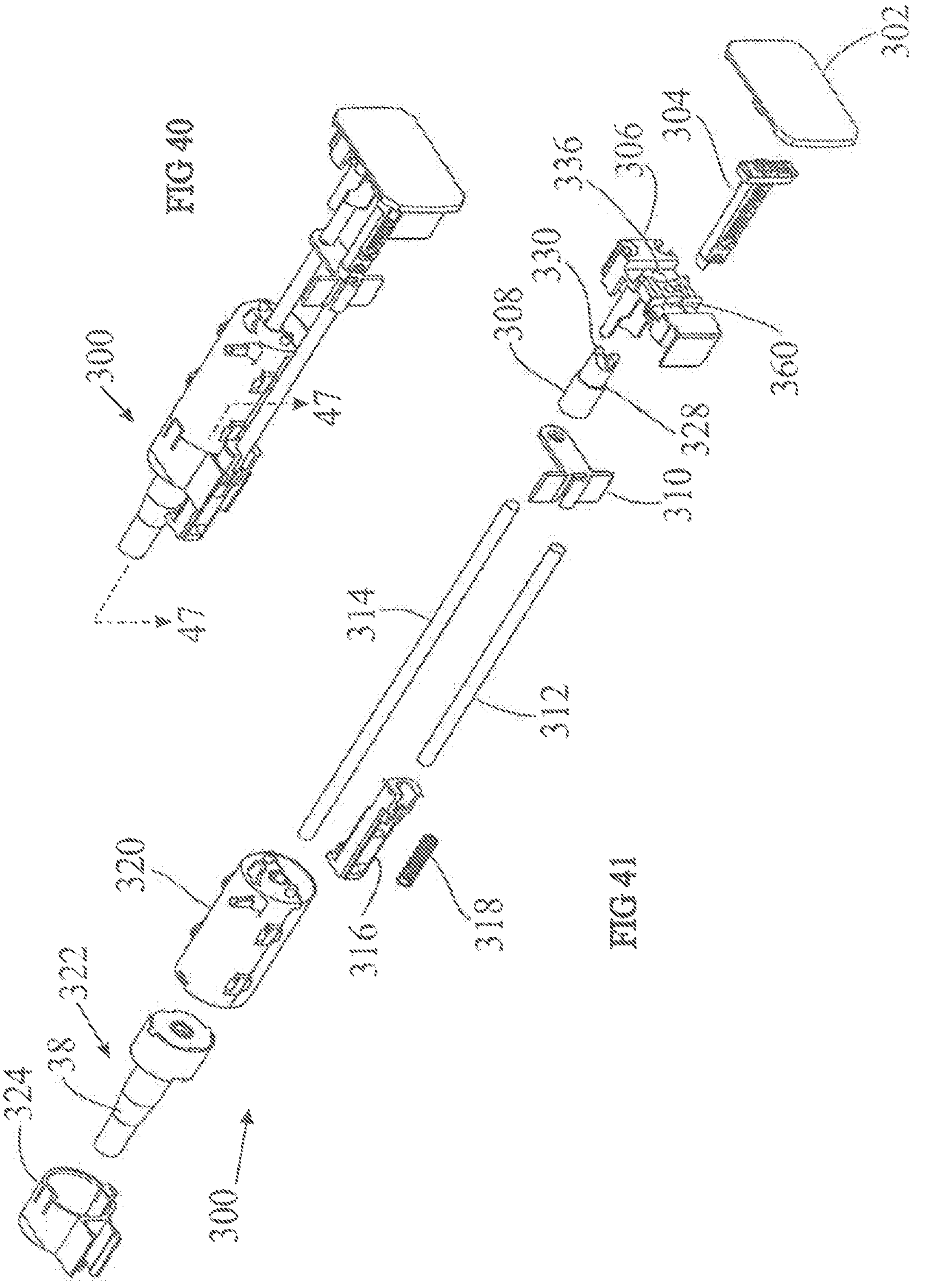
FIG. 40 is a perspective view, similar to FIG. 12, but showing another embodiment of a skew adjustment mechanism which would replace the skew adjustment mechanism in the blind of FIGS. 11 and 12.
FIG. 41 is an exploded, perspective view of the skew adjustment mechanism of FIG. 40.
Figure 42B:
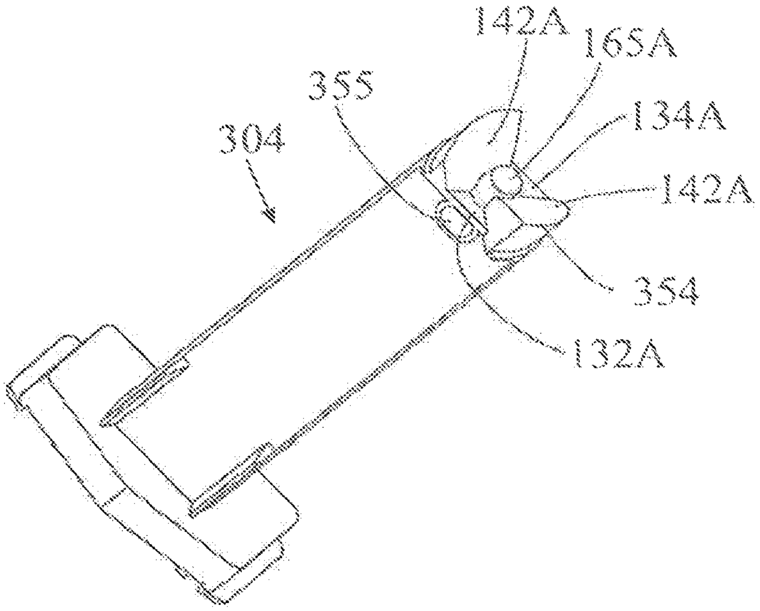
FIGS. 42, 42A, and 42B are perspective views of the skew adjustment tool of FIG. 41.
Figure 42A:
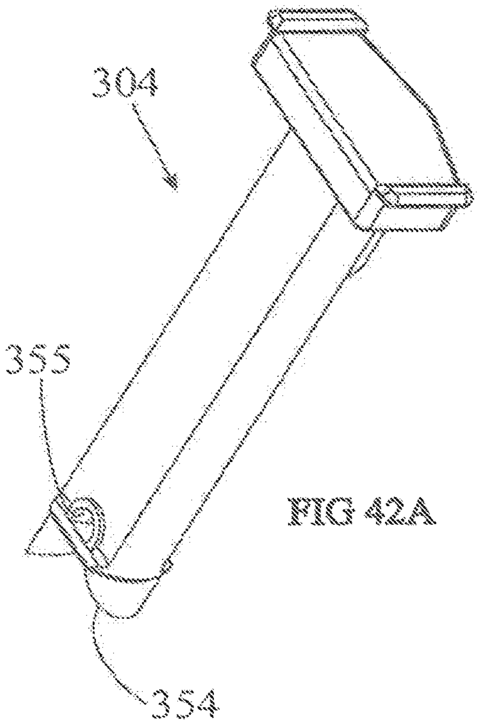
Figure 42C:
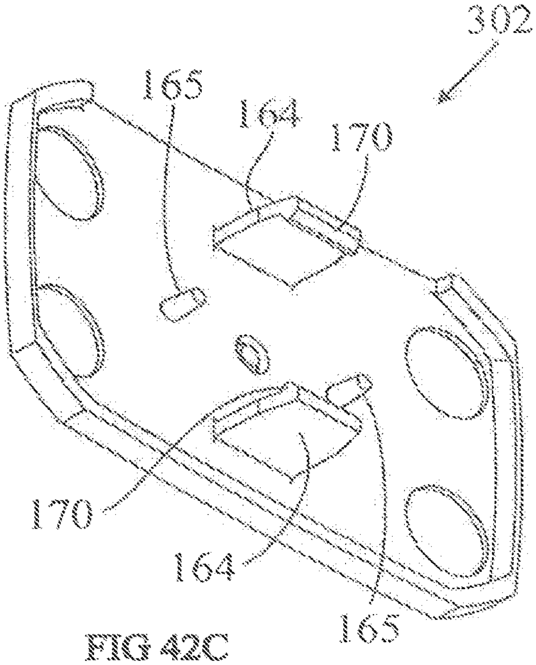
FIG. 42C is a view of the inside of the end cap 302.
Figure 42:
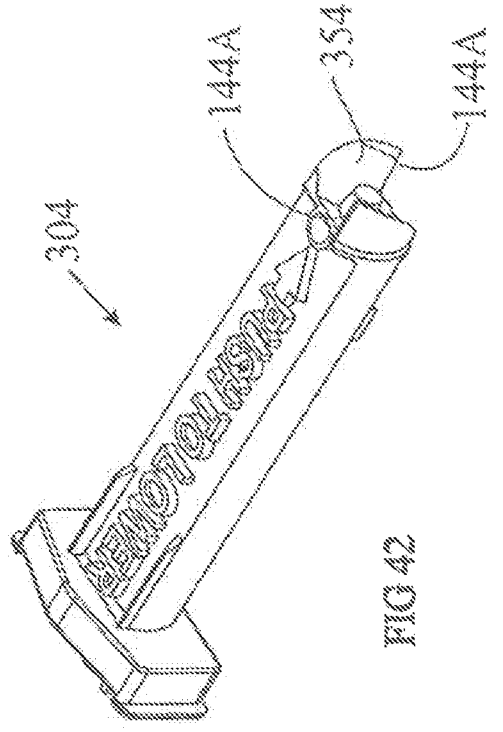

Referring to FIGS. 40 and 41, the skew adjustment arrangement 300 (shown with the rail omitted for clarity) includes a removable end cap 302, which is nearly identical to the end cap 102 of FIG. 13, except that it has two inwardly projecting posts 165 (see FIG. 42C) having a circular cross-section, which are tapered to have a smaller diameter at the end and a larger diameter where they connect to the flat portion of the end cap 302. The post 165 that is aligned with the skew adjustment shaft 308 is received in a complementary recess in the center of the head 330 of the skew adjustment shaft 308 and abuts the end of the skew adjustment shaft 308 with a small diameter to support thrust loads and minimize thrust friction.

The skew adjustment arrangement 300 also includes a skew adjustment tool 304, which is functionally identical to the skew adjustment tool 120 of FIG. 13, but it has a head 354 that is shaped a little differently from the head 130 of the skew adjustment tool 120 of FIG. 13. The head 354 of this tool 304 has curved surfaces 142A and flat walls 144A, which correspond to the curved surfaces 142 and flat walls 144 of the tool 120, but it also has a central post 165A, which has the same shape as the posts 165 of the end cap 302. This makes the head 354 of this tool 304 have a complementary shape to the head 330 of the skew adjustment shaft 308 so it can depress the skew adjustment shaft 308 and drive the skew adjustment shaft 308 in just one direction, as with the previous embodiment. The skew adjustment tool 304 also defines a hole 355, which receives a string that ties the tool 304 to the end lock 306.

The skew adjustment assembly 300 also includes an end lock 306 (functionally identical to the end lock 118 of FIG. 13), a slider lock guide 310, a connector rod 312, a lift rod extension 314, a slider lock 316, a biasing spring 318, a lift station 320 (identical to the lift station 114 of FIG. 13), a skew adjustment mechanism 322 (similar to the skew adjustment mechanism 112 of FIGS. 10 and 13), and a coupler 324 (functionally similar to the coupler 40 of the skew adjustment mechanism 112 shown in FIG. 10).

This skew adjustment assembly 300 operates in substantially the same way as the skew adjustment assembly shown in FIGS. 10 and 13. Referring to the assembly of FIGS. 10 and 13, as the user pushes in on the skew adjustment shaft 116 (which slides through the hollow shaft of the spool of the lift station 114 while rotationally engaging the spool) the skew adjustment shaft 116 pushes in on the plunger 34A to disengage it from the wrap spring 80. The spool can now be rotated by rotating the skew adjustment shaft 116 in order to raise this end of the movable rail without driving the opposite end lift station.

Once the user releases the skew adjustment shaft 116 (by removing the tool 120 he used to press in on and rotate the head 128 of the skew adjustment shaft 116), the compression spring 36 pushes the plunger 34A to re-engage the plunger 34A with the wrap spring 80. Now, when the lift rod adapter 38A rotates (driven by the lift rod 18 of FIG. 2), it drives the wrap spring 80, which drives the plunger 34A, which drives the skew adjustment shaft 116, which in turn drives the spool 28 of the lift station 114. Note that the coupler 40 snaps onto the lift station 114, both of which are fixed against rotation relative to the movable rail 106.

There are only a few differences between this arrangement of FIGS. 40-41 and the arrangement of FIGS. 10 and 13.

Figure 44:
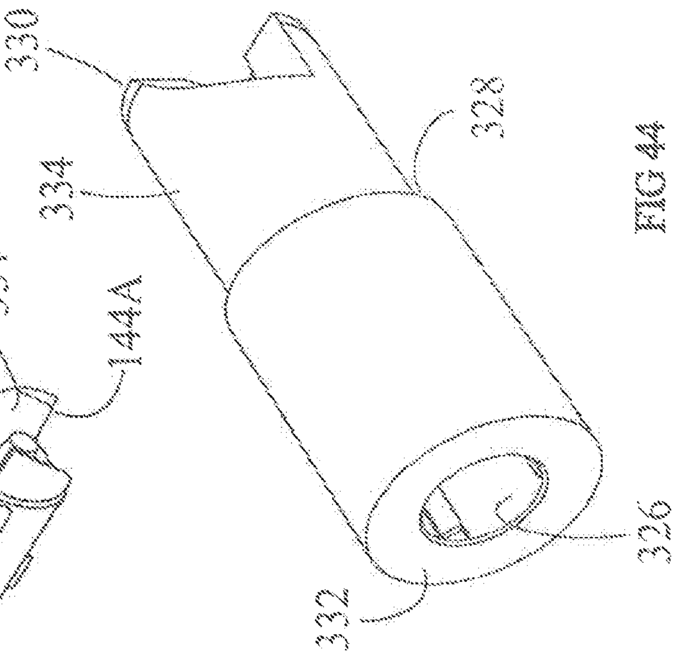
FIG. 44 is an opposite-end, perspective view of the skew adjustment shaft of FIG. 43.
Figure 43:
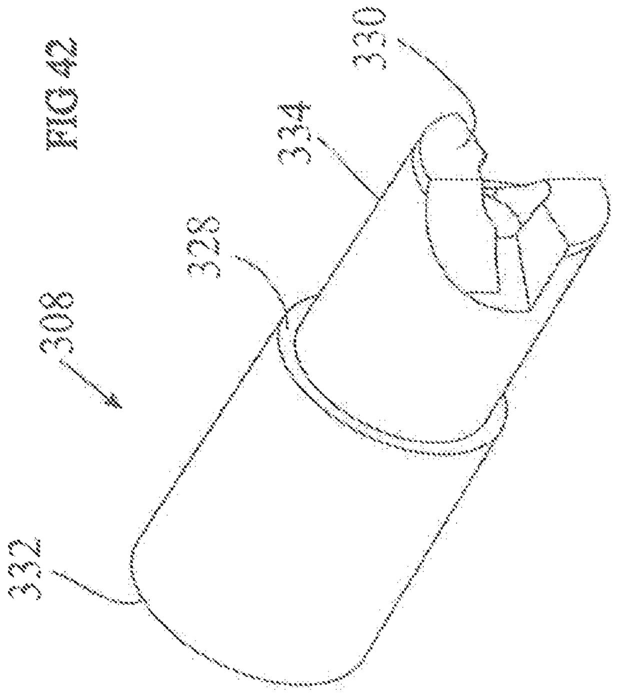
FIG. 43 is a perspective view of the skew adjustment shaft of FIG. 41.

In this embodiment, the skew adjustment shaft 308 and lift rod extension 314 replace the skew adjustment shaft 116 of the earlier embodiment. The skew adjustment tool 304 is very similar to the tool 120 of FIG. 13. The skew adjustment tool 304 is used to push in on and rotate the skew adjustment shaft 308, which in turn pushes in on and rotates the lift rod extension 314. As best shown in FIG. 44, the skew adjustment shaft 308 defines a non-circular-profiled hollow shaft 326, which receives the end of the lift rod extension 314 so the shaft 308 and lift rod extension 314 rotate together.

The skew adjustment shaft 308 also defines an axial shoulder 328 (best shown in FIG. 43) approximately midway between its first end 330 (which defines the head on the skew adjustment shaft 308) and its second end 332 (which defines the opening to the hollow shaft 326), and a smaller diameter portion 334 is defined forward of the shoulder 328. The smaller diameter portion 334 is received in an opening 336 (See FIG. 41) in the end lock 306. This supports the skew adjustment shaft 308 for rotation and allows it to slide axially so as to push against the compression spring 36 (See FIG. 10) to disengage the lift station 320 from the rest of the drive when pressed in by the tool 304. When the tool 304 is removed, the compression spring 36 pushes the skew adjustment shaft 308 back out. However, the shoulder 328 prevents the skew adjustment shaft 308 from shooting out through the opening 336 in the end lock 306 (the opening through which the tool 304 gains access to the head 330 of the skew adjustment shaft 308).

Figure 46:
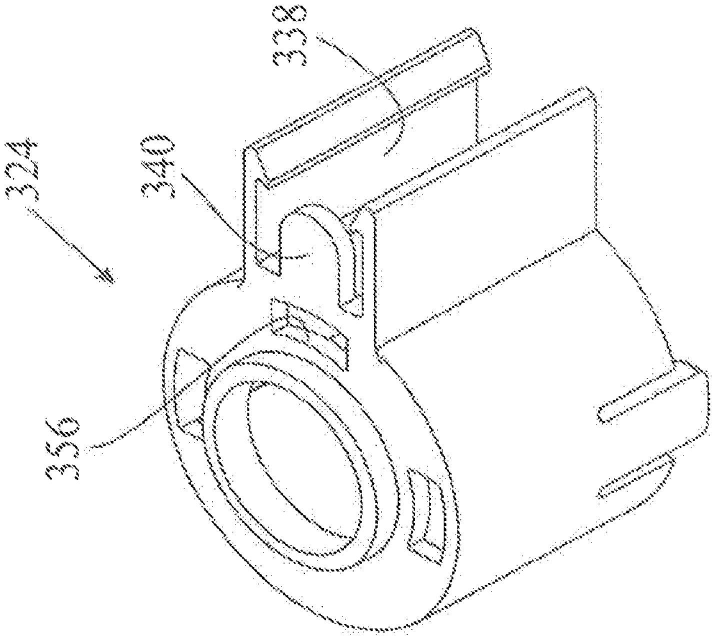
FIG. 46 is a perspective view of the coupler of FIG. 41.
Figure 45:
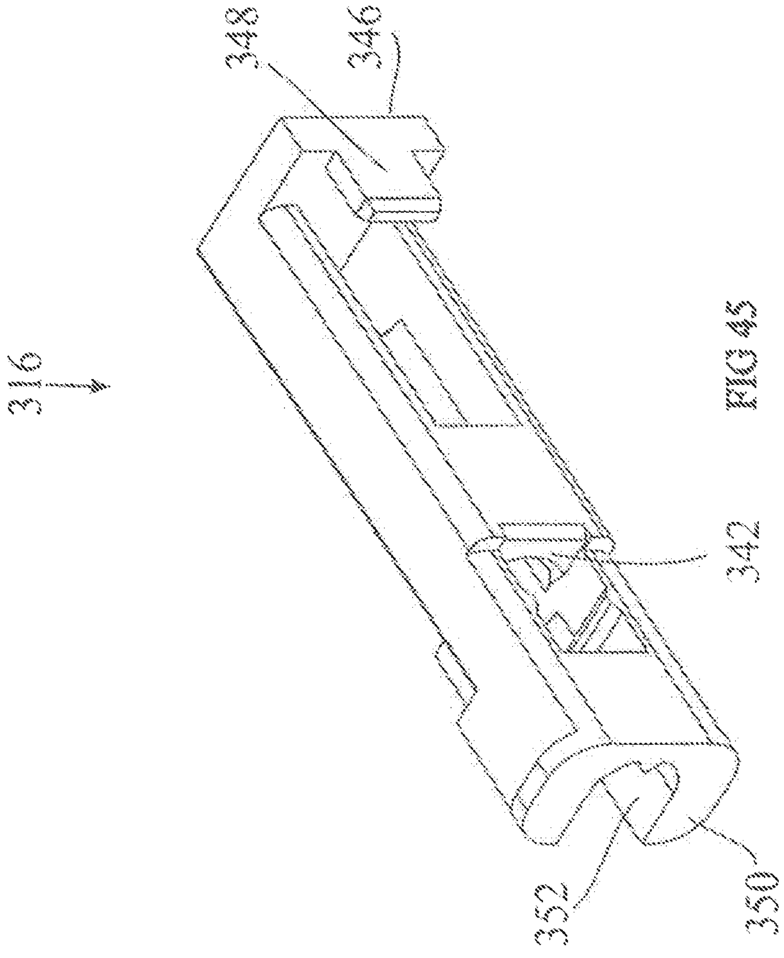
FIG. 45 is a perspective view of the locking slider of FIG. 41.
Figure 47:
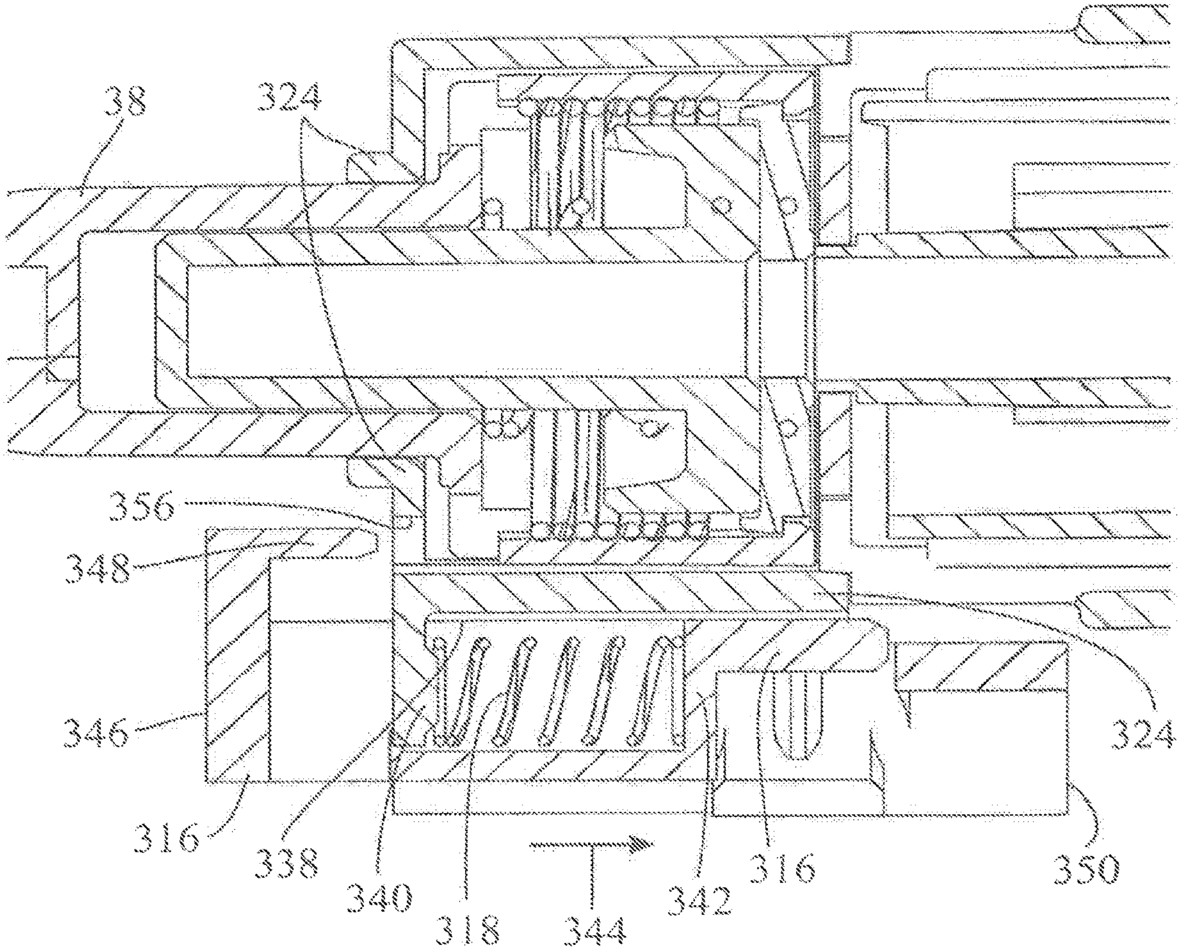
FIG. 47 is a section view along line 47-47 of FIG. 40.

The coupler 324 snaps onto the housing of the lift station 320, both of which are fixed against rotation relative to the rail which houses them (such as the bottom rail 106 of FIG. 13). As shown in FIG. 46, the coupler 324 defines a "U"-shaped channel 338, which slidably receives the slider lock 316, which is shown in FIGS. 41 and 45. One end of the "U"-shaped channel 338 is blocked off by a tab 340 (See also FIG. 47). The biasing spring 318 is received in the slider lock 316, with one end of the biasing spring 318 pushing against the tab 340 of the coupler 324 and the other end of the biasing spring 318 pushing against an inner wall 342 of the slider lock 316, as best shown in FIG. 47. The spring 318 biases the slider lock 316 in the direction of the arrow 344.

One end 346 of the slider lock 316 defines a finger 348 (See FIGS. 45 and 47) which is also biased in the direction of the arrow 344 by the same spring 318. The opposite end 350 of the slider lock 316 defines an opening 352 with a non-circular cross-section, which receives one end of the connector rod 312, as shown in FIG. 40. The other end of the connector rod 312 is received in the slider lock guide 310, shown in FIG. 41. As explained in more detail below, the slider lock guide 310 is moved axially by the insertion or removal of the skew adjustment tool 304 from the end lock 306.

When the slider lock 316 is biased outwardly by the spring 318, the finger 348 is received in the opening 356 in the coupler 324. Also, as soon as one of the two openings 358 in the lift rod adapter 38 (See FIGS. 4 and 6) lines up with the opening 356 in the coupler 324, the finger 348 of the slider lock 316 moves to the right (urged in that direction by the biasing spring 318), entering into the opening 358 in the lift rod adapter 38 to lock the lift rod adapter 38 against further rotation, which locks the lift rod 18 against rotation and thereby prevents the spring motor 76, shown in FIG. 2, from driving the lift station 16 on the left (or any other lift stations that may be operably connected to the lift rod 18).

Figure 48:
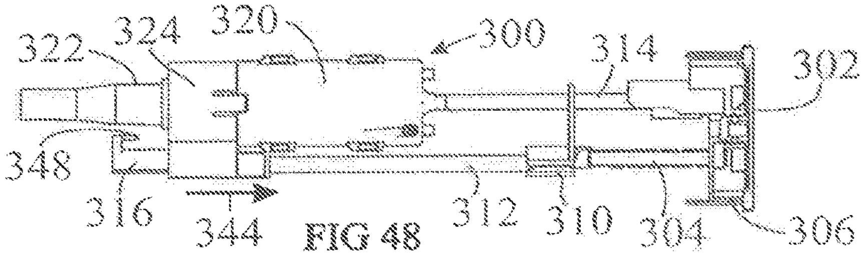
FIG. 48 is a plan view of the skew adjustment mechanism of FIG. 40.

We now refer to FIGS. 48-53 to explain the sequence of events involved in adjusting the skew of the movable or bottom rail 106 (See FIG. 11) when this embodiment of the skew adjustment mechanism is used. In FIG. 48, the skew adjustment assembly 300 is shown with the skew adjustment tool 304 in its stowed condition. The end cap 302 is attached to the end lock 306, and the post 165 of the end cap 302 which is aligned with the end of the skew adjustment tool 304 pushes the skew adjustment tool 304 against the slider lock guide 310. This, in turn, pushes the slider lock 316, via the connector rod 312, in the direction opposite the arrow 344. This compresses the biasing spring 318 and moves the finger 348 of the slider lock 316 out of the coupler 324. So, when the skew adjustment tool 304 is in its stowed position and the end cap 302 is mounted on the end lock 306, the finger 348 of the slider lock 316 is out of the coupler 324 and out of the opening 358 in the lift rod adapter, which allows the lift rod 18 to rotate.

Figure 49:
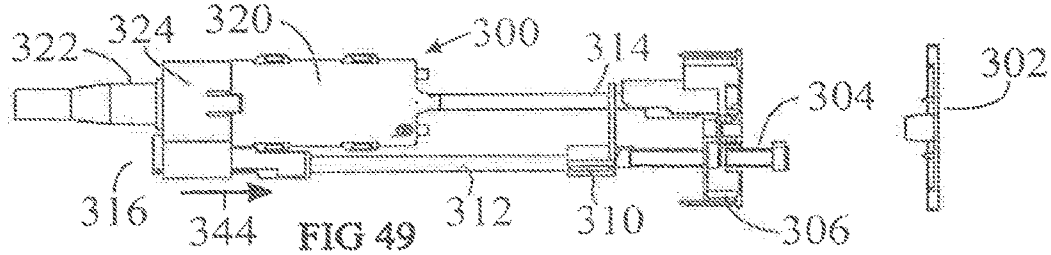
FIG. 49 is the same as FIG. 48 but with the end cap removed.

To adjust the skew of the rail 106, the end cap 302 is removed, as shown in FIG. 49. This allows the biasing spring 318 to push the slider lock 316 toward the right, in the direction of the arrow 344, which pushes on the connector rod 312 and the slider lock guide 310, which forces the skew adjustment tool 304 to "pop" out of the end lock 306. The biasing spring 318 continues pushing the slider lock guide 310 to the right (in the direction of the arrow 344) until the finger 348 extends through the opening 356 in the coupler 324.

Figure 53:
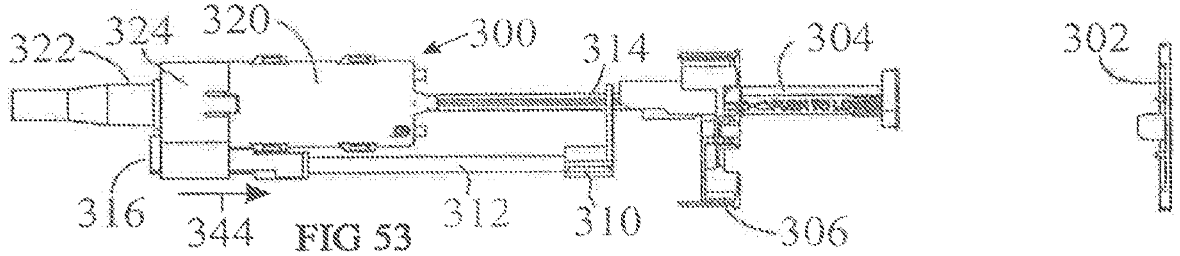
FIG. 53 is the same as FIG. 52, but with the skew adjustment tool rotated to adjust the skew.
Figure 52:
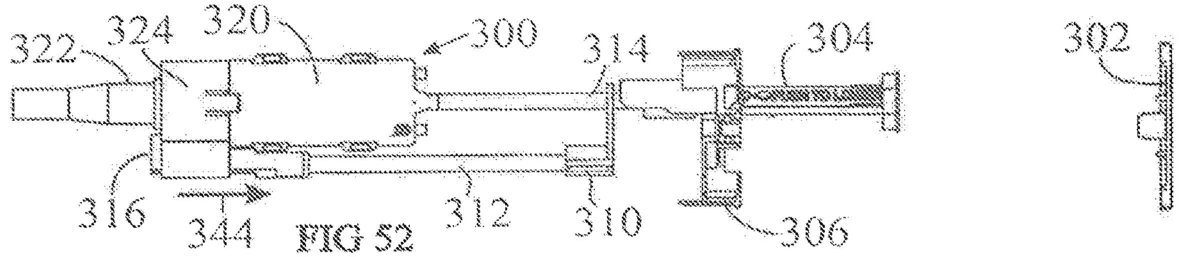
FIG. 52 is the same as FIG. 51, but with the skew adjustment tool mated up against the skew adjustment shaft.
Figure 51:
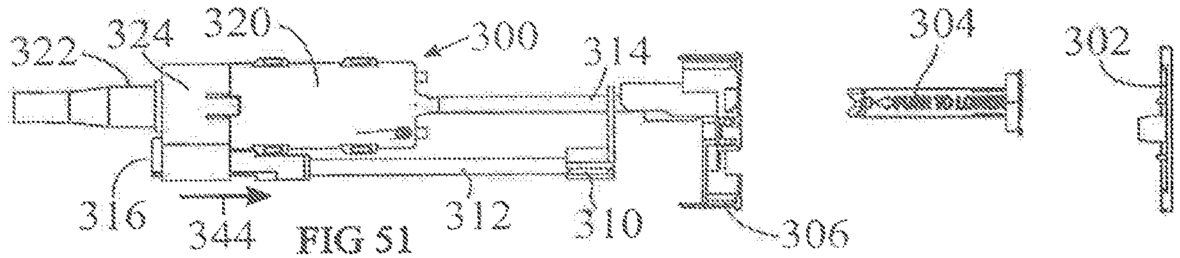
FIG. 51 is the same as FIG. 50, but with the skew adjustment tool ready to be inserted into the end lock to adjust the skew.
Figure 50:
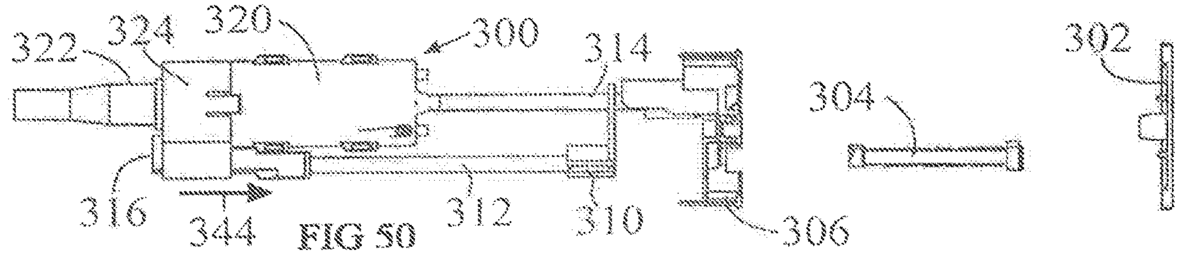
FIG. 50 is the same as FIG. 49, but with the skew adjustment tool removed.

The user removes the skew adjustment tool 304 from the end lock 306, as shown in FIG. 50, aligns the skew adjustment tool 304 with the opening 336 in the end lock 306, as shown in FIG. 51, and inserts the skew adjustment tool 304 in through the opening 336 in the end lock 306 as shown in FIG. 52. Finally, the user pushes in on the skew adjustment tool 304 against the skew adjustment shaft 308 and rotates the skew adjustment tool 304 to adjust the skew of the rail, as shown in FIG. 53.

As the user pushes the skew adjustment tool 304 in against the skew adjustment shaft 308 and some of the weight is taken off of the rail, the lift rod adapter 38 (See FIGS. 4 and 6) may rotate, as it is driven by the torque of the spring motor 76 (See FIG. 2). However, the biasing spring 318 pushes the finger 348 of the slider lock 316 to the right, so the finger 348 extends into the opening 358 in the lift rod adapter 38 to lock the lift rod adapter 38 against rotation, thereby preventing the spring motor 20, shown in FIG. 2, from driving the lift station 16 on the left (or any other lift stations that may be operably connected to the lift rod 18).

With the lift rod adapter 38 locked to the coupler 324 via the finger 348 in the slider lock 316 (and keeping in mind that the coupler 324 snaps onto the housing of the rightmost lift station 320, both of which are mounted against rotation relative to the rail), the entire drive mechanism to the left of the rightmost lift station 320 (or, if referring to FIG. 2, the entire drive mechanism to the left of the rightmost lift station 14, including the lift rod 18, the spring motor 76, and the leftmost lift station 16) is locked against rotation, and thus locked against unintended raising of the rail 12 while adjusting the skew at the rightmost lift station 14.

Once the skew adjustment procedure is completed, the user removes the skew adjustment tool 304 from the head 330 of the skew adjustment shaft 308 and stows it back through the opening 360 in the end lock 306 (See FIG. 41), pushing the slider lock guide 310, the connector rod 312, and the slider lock 316 to the left, in the direction opposite the arrow 344. This extracts the finger 348 of the slider lock 316 out of the opening 358 in the lift rod adapter 38, which unlocks the lift rod adapter 38 such that the entire drive mechanism can once again rotate in unison to raise or lower the shade 10.

Another Alternative Skew Adjustment Mechanism with a Locking Feature

FIGS. 54-61 show an alternate embodiment of a skew adjustment mechanism 400 with an auto-lock feature to ensure that the lift rod and the drive mechanism to the left of the rightmost lift station 14 (the lift station where the skew adjustment is taking place) are locked against rotation to prevent the unintended rise of the shade 10 while the skew is being adjusted. Again, as with the other alternative skew adjustment mechanisms, this skew adjustment mechanism 400 could be inserted to replace the skew adjustment mechanism on a rail of the covering, such as replacing the skew adjustment mechanism on the rail 12 of FIG. 2 or replacing the skew adjustment mechanism on the rail 14 of FIG. 9.

Figure 55:
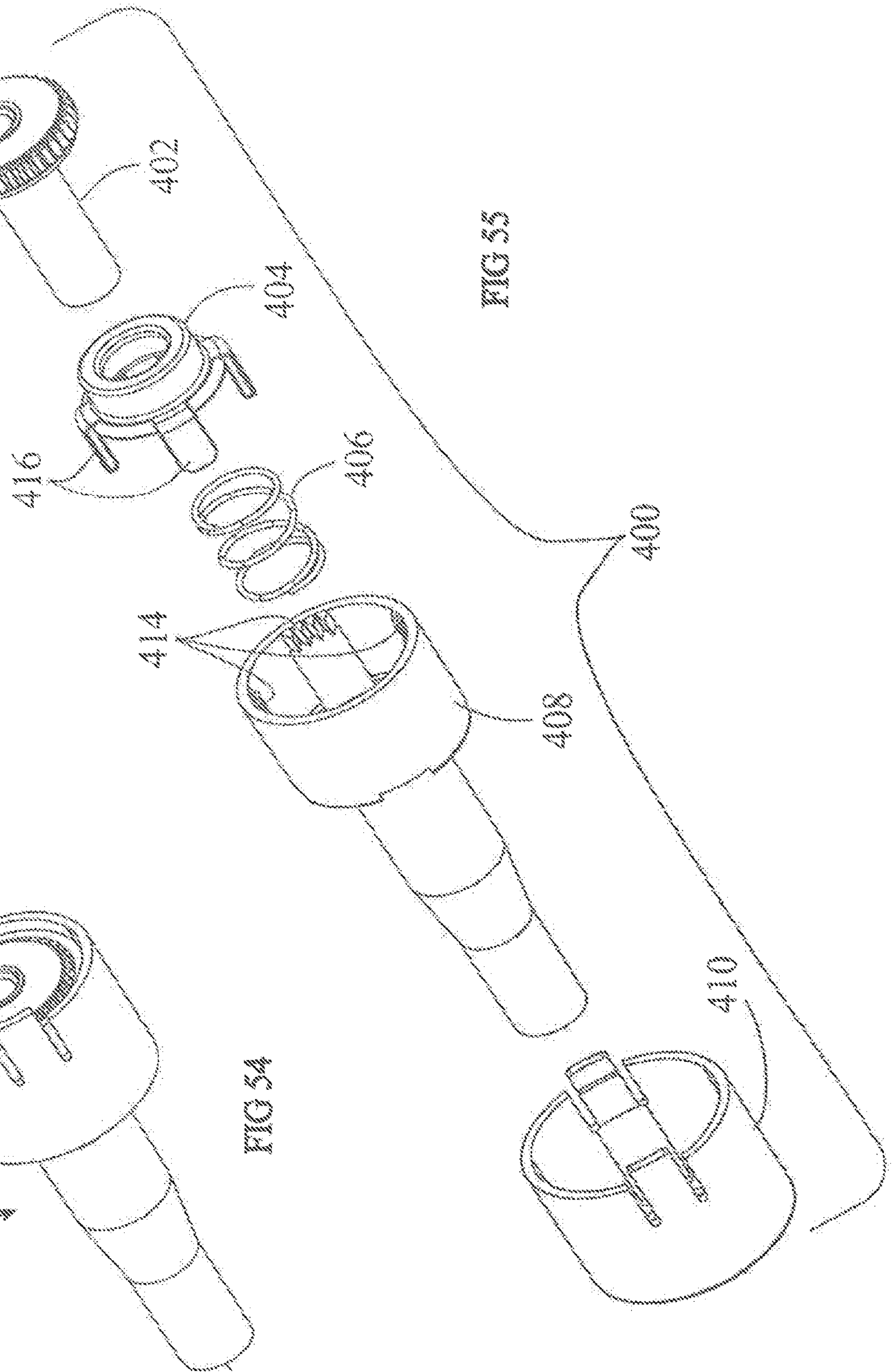
FIG. 55 is an exploded, perspective view of the skew adjustment mechanism of FIG. 54.
Figure 54:
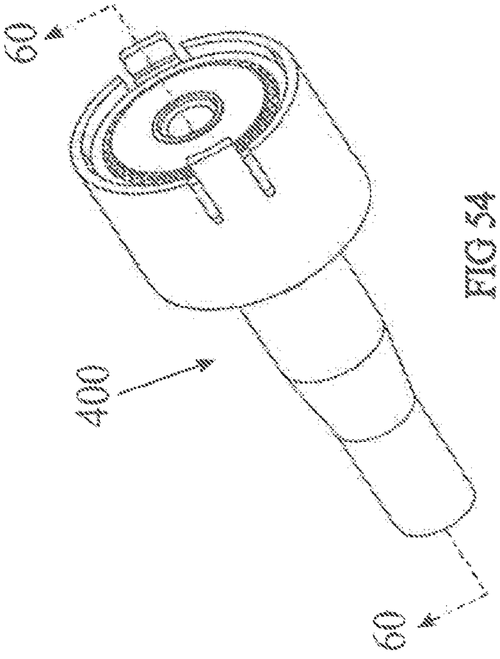
FIG. 54 is a perspective view of another alternative embodiment of a skew adjustment mechanism, similar to item 44 of FIGS. 3 and 4.

Referring to FIGS. 54 and 55, the skew adjustment mechanism 400 (shown only with the items corresponding to the skew adjustment mechanism in the lift station 14 of FIGS. 3 and 4, all other items omitted for clarity) includes a plunger 402, a lock plate 404, a biasing spring 406, a lift rod adapter 408, and a coupler 410.

This skew adjustment assembly 400 operates in a similar, but not identical, manner as the skew adjustment assembly shown in FIG. 4. The main difference is that the teeth 412 on the plunger 402 are located on the outer perimeter of the plunger 402 rather than on its front face, and they mesh with teeth 414 on the inner surface of the lift rod adapter 408 instead of meshing with teeth 58 on the face of the plunger housing cap 32.

Figure 61:
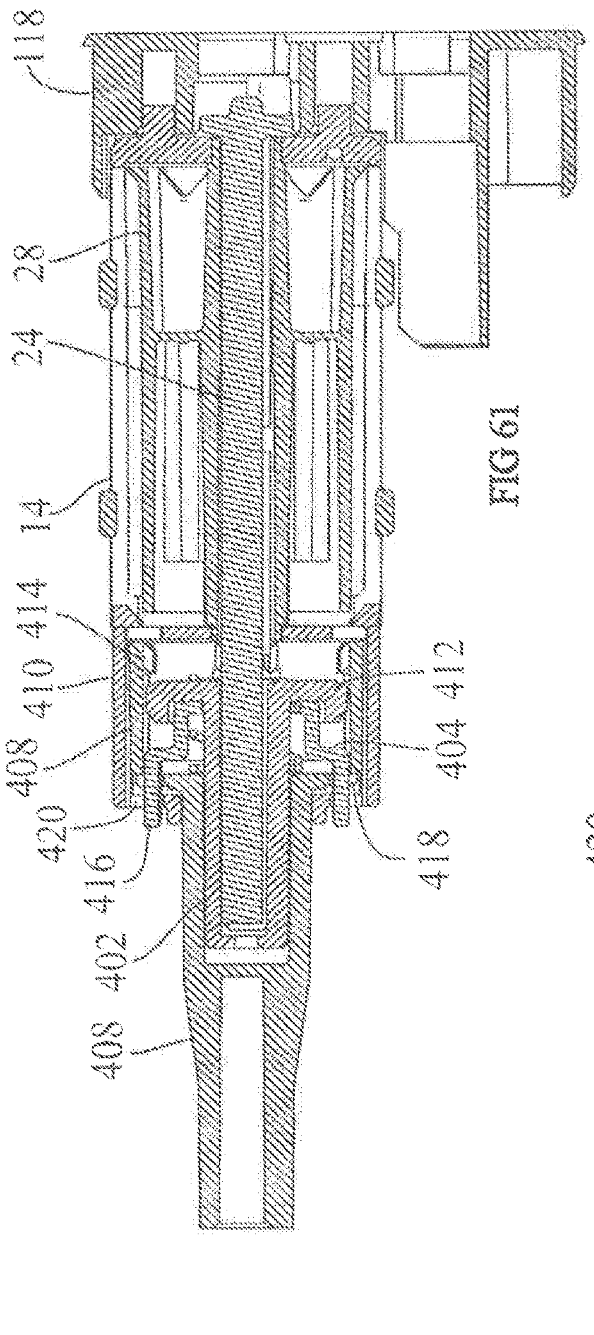
FIG. 61 is a section view similar to FIG. 60 but with the skew adjustment shaft pushed in to adjust the skew.

In this new embodiment of a skew adjustment mechanism 400, pushing in on the skew adjustment shaft 24 (See FIGS. 60 and 61) pushes in on the plunger 402, which disengages the circumferential teeth 412 of the plunger 402 from the four sets of circumferentially-spaced-apart teeth 414 (See FIG. 55) on the inner surface of the lift rod adapter 408, as best appreciated in FIG. 61.

In the present embodiment 400, the biasing spring 406 urges the lock plate 404 against the plunger 402 and biases both of these components 402, 404 to the right (as seen from the frame of reference of FIG. 55) to force the circumferential teeth 412 of the plunger 402 to engage the teeth 414 of the lift rod adapter 408 such that both components 402, 404 rotate as one. When the teeth 412 and 414 are engaged, the plunger 402, the lock plate 404, the lift rod adapter 408, the skew adjustment shaft 24, and the spool 28 all rotate together.

Figure 57:
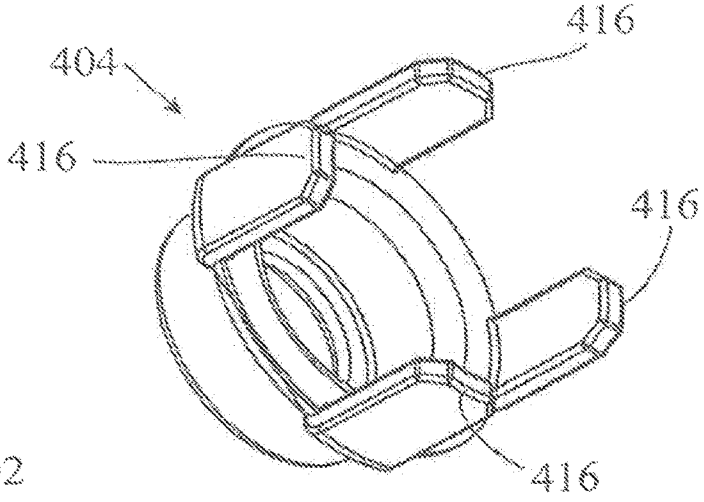
FIG. 57 is a perspective view of the lock plate of FIG. 55.
Figure 56:
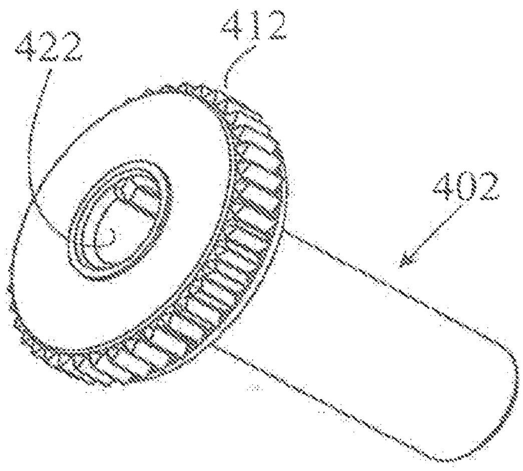
FIG. 56 is a perspective view of the drive wheel of FIG. 55.
Figure 59:
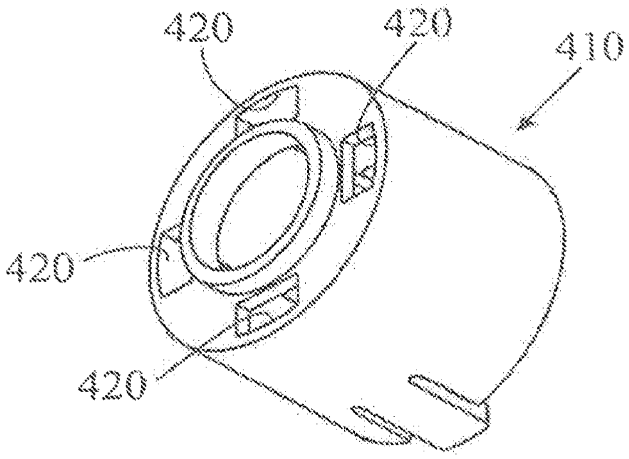
FIG. 59 is a perspective view of the coupler of FIG. 55.
Figure 58:
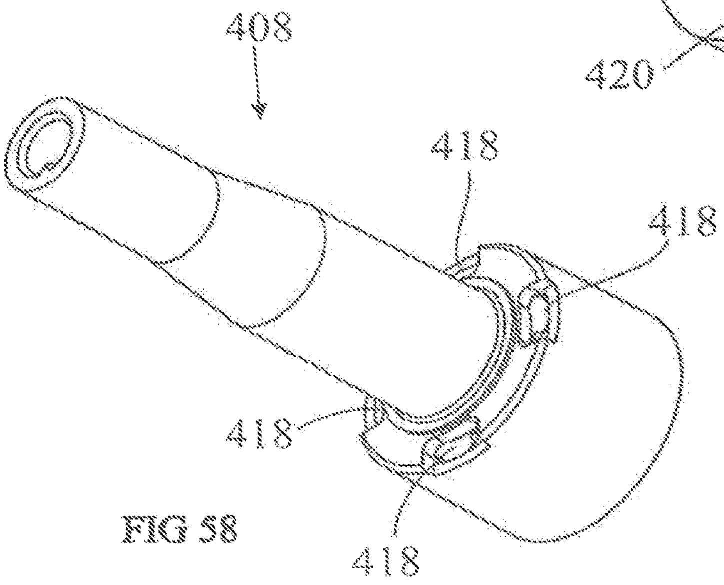
FIG. 58 is a perspective view of the skew adjustment housing of FIG. 55.
Figure 60:
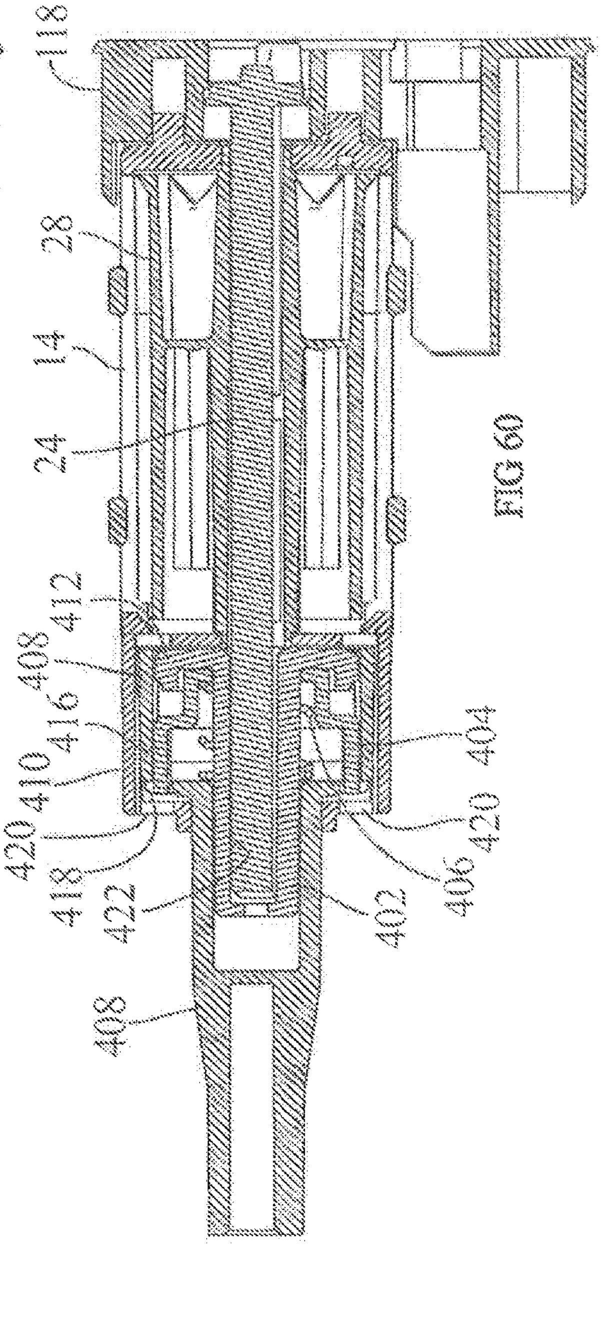
FIG. 60 is a section view along line 60-60 of FIG. 54, but showing also the skew adjustment shaft 24 of FIG. 4.

Referring to FIGS. 55 and 57, the lock plate 404 defines four circumferentially-mounted and axially-projecting fingers 416 which project through corresponding through-openings 418 (See FIG. 58) in the lift rod adapter 408, as shown in FIG. 60. As the user pushes in on the skew adjustment shaft 24 (See FIGS. 60 and 61) using a skew adjustment tool (not shown in these views, but similar to the skew adjustment tool 304 of FIG. 41), he not only pushes the plunger 402 toward the left, to disengage the teeth 412 of the plunger 402 from the teeth 414 of the lift rod adapter 408, but the plunger 402 in turn pushes the lock plate 404 to the left so that the fingers 416 of the lock plate 404 project not only through the openings 418 of the lift rod adapter 408 but also through the through-openings 420 (See FIGS. 59-61) of the coupler 410, which locks the lift rod adapter 408 and the lift rod 18 against rotation.

As best appreciated in FIG. 61, the fingers 416 of the lock plate 404 extend through the openings 418 in the lift rod adapter 408 and through the openings 420 in the coupler 410, thus preventing relative rotation between these two components 408, 410. That is, the lift rod adapter 408 is now locked against rotation relative to the coupler 410, which, in turn, is locked onto the housing of the lift station 14.

The housing of the lift station 14 is mounted for non-rotation relative to the rail (either by mounting the lift station 14 directly onto the rail or via the end lock 118 as shown in FIGS. 60 and 61). In any event, once the skew adjustment shaft 24 is pushed in by the user and the fingers 416 on the lock plate 404 project through the openings in both the lift rod adapter 408 and the coupler 410, the lift rod adapter 408 is immobilized, locking the entire drive to the left of the lift rod adapter 408 against rotation. The skew on the movable rail of the covering now may be corrected by rotating the skew adjustment shaft 24 which also rotates the spool 28 of the rightmost lift station 14, while the drive 16 to the left of the rightmost lift station 14 remains locked against rotation. If desired, in this embodiment, the head of the skew adjustment shaft 24 and the head of the skew adjustment tool may be modified to be a more traditional drive, such as a Phillips head or a square or hex head to permit the tool to drive the skew adjustment shaft 24 in either direction.

Referring to FIG. 60, when the skew adjustment shaft 24 has not been pushed in by the user, and the shade is being raised or lowered, the lift rod adapter 408 is rotating. The teeth 412 of the plunger 402 are engaging the teeth 414 of the lift rod adapter 408, so the plunger 402 is also rotating. The skew adjustment shaft 24 rotationally engages the non-circular profiled hollow shaft 422 (See FIG. 56) of the plunger 402 so the skew adjustment shaft 24 is also rotating. Finally, the skew adjustment shaft 24 (See also FIG. 4) engages the spool 28 of the rightmost lift station 14 to raise or lower the shade.

Referring to FIG. 61, when the skew adjustment shaft 24 is pushed in by the user, the plunger 402 disengages from the lift rod adapter 408 so that the spool 24 of the lift station 14 may be rotated to adjust the skew on the movable rail without driving the lift station on the opposite end of the movable rail.

It should be noted that the parts are shaped and sized so that the fingers 416 are always engaging the holes 418, and the teeth 412, 414 do not disengage from each other until the fingers 416 enter into the holes 420.

While the terms "clockwise" and "left" and "right" have been used here, they have been used to describe the operation of specific embodiments and are not intended to be limiting. It is understood that the mechanisms could be reversed so that what is performed in a clockwise direction in one embodiment could be performed in a counterclockwise direction in another embodiment, and what is on the left side in one embodiment could be on the right side in another embodiment.

Skew Adjustments for Multiple Configurations of Window Coverings

Thus far several embodiments of skew adjustment mechanisms have been described to adjust the skew of a movable rail having two lift cords. A skew adjustment may also be used where there is more than one movable rail and where there are more than just two lift cords. For example, when the window covering is wider than usual or when the rail is heavier than usual, it may be desirable to have more than just two lift cords per movable rail. FIGS. 62-72 are schematics showing different window covering configurations and how the skew may be adjusted for these arrangements.

Figure 62:
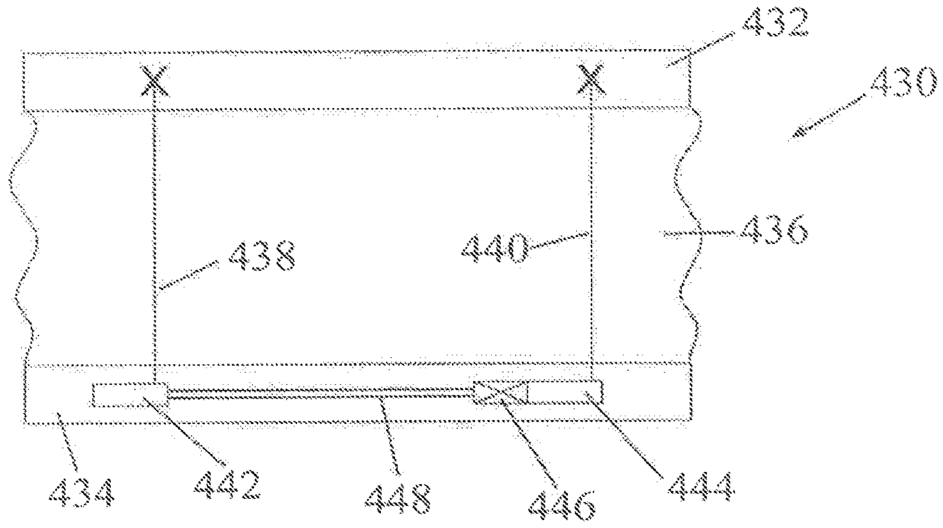
FIG. 62 is a schematic of a standard blind or shade, such as the shade of FIG. 1, with a single skew adjustment mechanism at the right end of the movable rail.

FIG. 62 represents a shade 430 (it could also be a blind but for simplicity we shall refer to it as a shade) with a top rail 432, a bottom (first movable) rail 434 and fabric 436 extending from the top rail 432 to the bottom rail 434. The bottom rail 434 is suspended from the top rail 432 via first and second lift cords 438, 440, each of which is operatively connected to its corresponding lift station 442, 444. The lift stations 442, 444 are interconnected by a lift rod 448 such that both lift stations 442, 444 rotate in unison unless the skew adjustment mechanism 446 temporarily disengages the rightmost lift station 444 from the rest of the drive train, as has been described above.

This shade 430 of FIG. 62 has been described at length above and is essentially the shade 100 of FIG. 11 with, for example, the skew adjustment mechanism 400 of FIGS. 54 and 55. To adjust the skew of the shade 430 of FIG. 62, the skew adjustment mechanism 446 is actuated (as described above) to temporarily disengage the lift station 444 from the lift rod 448, and the lift cord 440 is shortened (or lengthened) as required by manually winding up (or unwinding) the lift cord 440 from the lift station 444 until the skew condition has been corrected. The bottom rail 434 pivots up or down about the point where the left lift cord 438 meets the left lift station 442. It should be noted that in this sketch, as well in the sketches that follow, the location of the drive mechanism (the lift stations 442, 444, the lift rod 448, and the skew adjustment mechanism 446) may just as readily be in the top rail 432 instead of the bottom rail 434 as shown, and that, while the upper rail 432 usually is fixed relative to the architectural opening, it also may be a movable rail. So, in fact, both rails 432, 434 may be movable rails.

Figure 63:
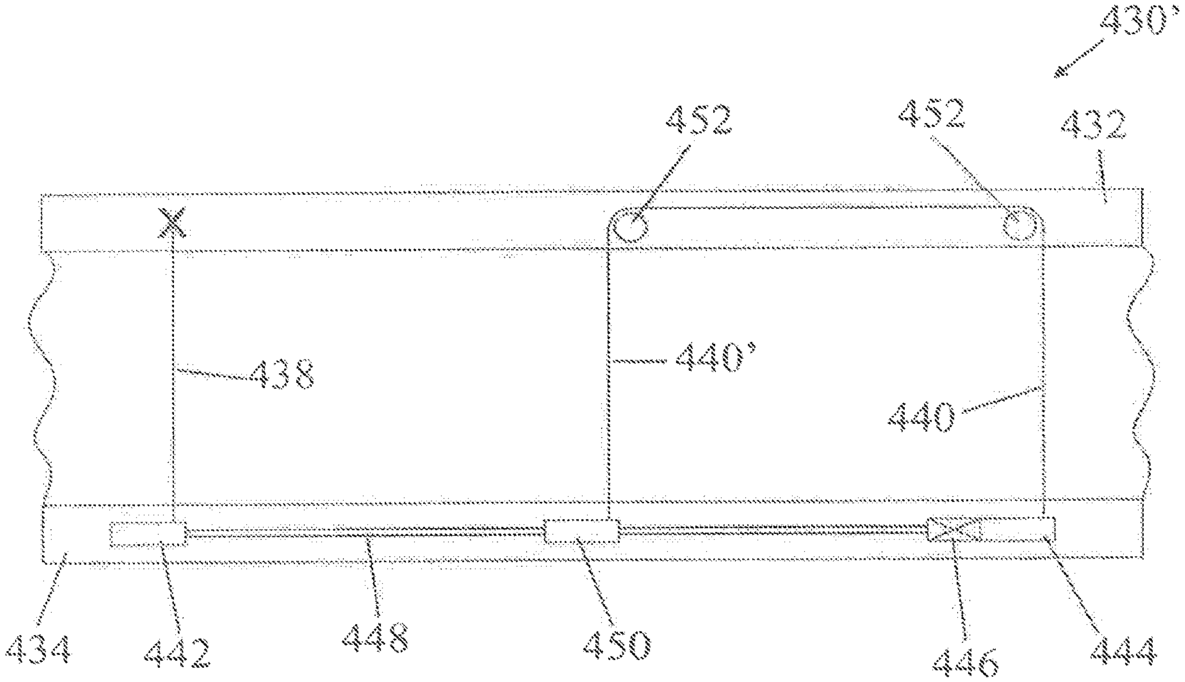
FIG. 63 is a schematic of a standard blind or shade, similar to FIG. 61, but for a wider shade having three lift cords and a single skew adjustment mechanism at the right end of the movable rail.

FIG. 63 is a sketch of a shade 430', similar to the shade 430 of FIG. 62, except that it has three lift cords 438, 440, 440' operatively connected to corresponding lift stations. The left lift cord 438 is operatively connected to the left lift station 442, the right lift cord 440 is operatively connected to the right lift station 444, and the intermediate lift cord 440', which is actually an extension of the right lift cord 440, is operatively connected to an intermediate lift station 450. The lift stations 442, 444, 450 are interconnected by a lift rod 448 such that the lift stations 442, 444, 450 rotate in unison unless the skew adjustment mechanism 446 temporarily disengages the rightmost lift station 444 from the drive train, as has been described above. As mentioned earlier, the two lift cords 440, 440' are actually a single lift cord which extends from the right lift station 444 up to the top rail 432, over pulleys 452 in the top rail 432, and then back down to the intermediate lift station 450 in the bottom rail 434.

It should be noted that, while pulleys 452 are used in these embodiments, any turning point would work instead of a pulley. For example, the pulleys 452 could be replaced by projections that are made of a material (or are coated with a material) that provides a good wear surface.

To adjust the skew of the shade 430' of FIG. 63, the skew adjustment mechanism 446 is actuated to temporarily disengage the lift station 444 from the lift rod 448, and the lift cord 440 is shortened (or lengthened) as required by manually winding up (or unwinding) the lift cord 440 from the lift station 444 until the skew condition has been corrected. As the length of the lift cord 440 is being adjusted, the bottom rail 434 pivots up or down about the point where the lift cord 438 meets the lift station 442. As the lift cord 440 is shortened, it shifts relative to the pulleys 452, thereby also shortening the intermediate lift cord 440', so that, once the skew has been adjusted, the intermediate lift cord 440' is also the correct length.

Figure 64:
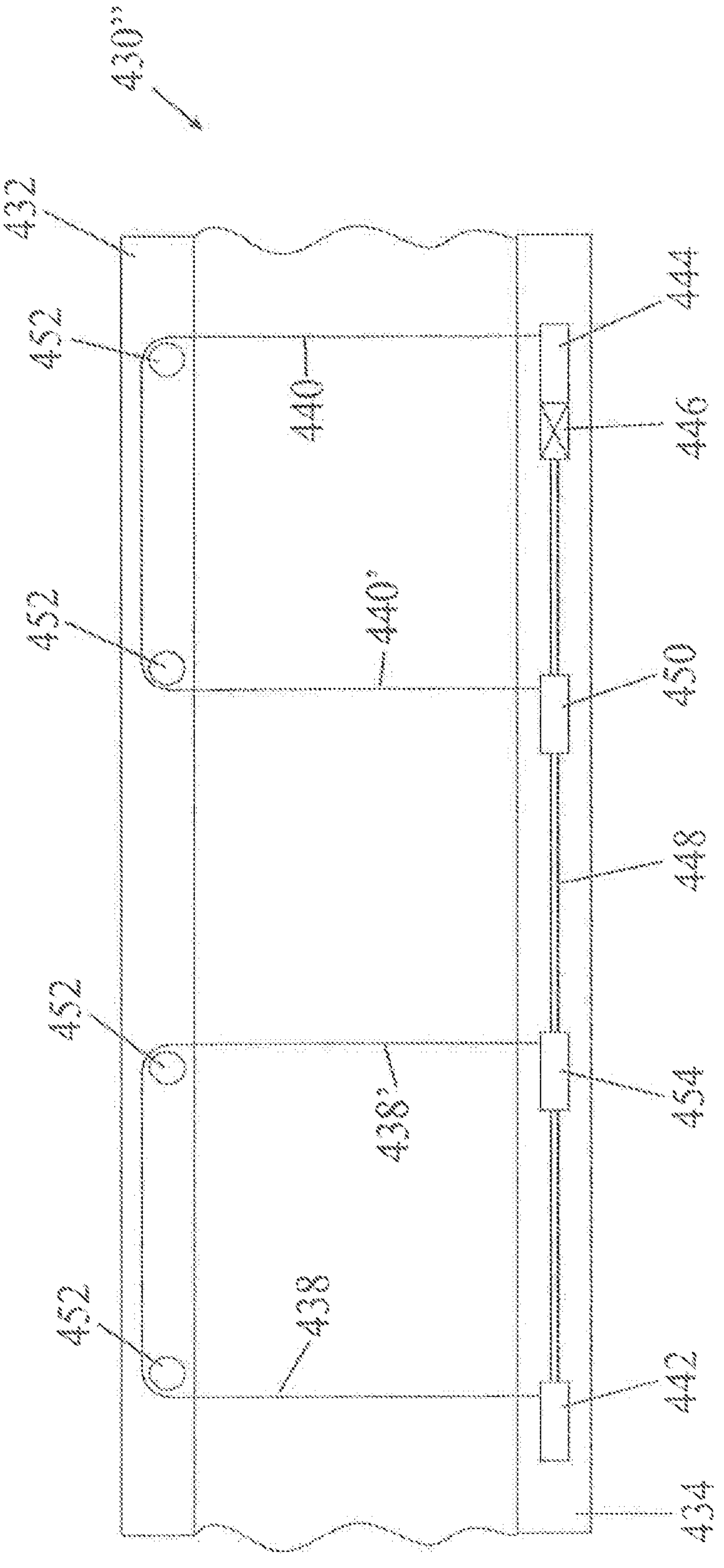
FIG. 64 is a schematic of a standard blind or shade, similar to FIG. 63, but for a wider product having four lift cords and a single skew adjustment mechanism at the right end of the movable rail.

FIG. 64 is a sketch of a shade 430", similar to the shade 430' of FIG. 63, except that it has four lift cords 438, 438', 440', 440 operatively connected to their corresponding lift stations 442, 454, 450, 444. The left lift cord 438 and left intermediate lift cord 438' are actually a single lift cord, which extends from the lift station 442 up to the top rail 432, over pulleys 452 in the top rail 432 and back down to the lift station 454 in the bottom rail 434. Similarly, the right lift cord 440 and right intermediate lift cord 440' are actually the same cord, which extends from the lift station 444 up to the top rail 432, over pulleys 452 in the top rail 432 and back down to the lift station 450 in the bottom rail 434.

The lift stations 442, 454, 450, 444 are interconnected by a lift rod 448 such that they rotate in unison unless the skew adjustment mechanism 446 temporarily disengages the rightmost lift station 444, as has been described above.

To adjust the skew of the shade 430" of FIG. 64, the skew adjustment mechanism 446 is actuated to temporarily disengage the lift station 444 from the lift rod 448, and the lift cord 440 is shortened (or lengthened) as required by manually winding up (or unwinding) the lift cord 440 from the lift station 444 until the skew condition has been corrected. As was the case with the shade 430' of FIG. 63, as the lift cord 440 is shortened, it shifts relative to the pulleys 452, so the lift cord 440' also is shortened so it will be the correct length when the skew adjustment is completed.

As the length of the right lift cord 440 is being adjusted to change the skew or angle of the bottom rail, the bottom rail 434 pivots up or down about a point intermediate the left lift station 442 and the left intermediate lift station 454. That is, if the rightmost end of the bottom rail 434 is being raised, the left lift station 442 actually drops a little bit while the left intermediate lift station 454 is raised a little bit so that the overall length of the lift cord 438, 438' remains unchanged. The left/left intermediate lift cord 438, 438' just slides over the pulleys 452 in the top rail 432 to automatically adjust the relative lengths of the left lift cord segment 438 and left intermediate lift cord segment 438' as the angle of the bottom rail 434 is being adjusted. This ensures that none of the lift cords will become slack, and all the lift cords will remain taut throughout the adjustment process.

Figure 65:
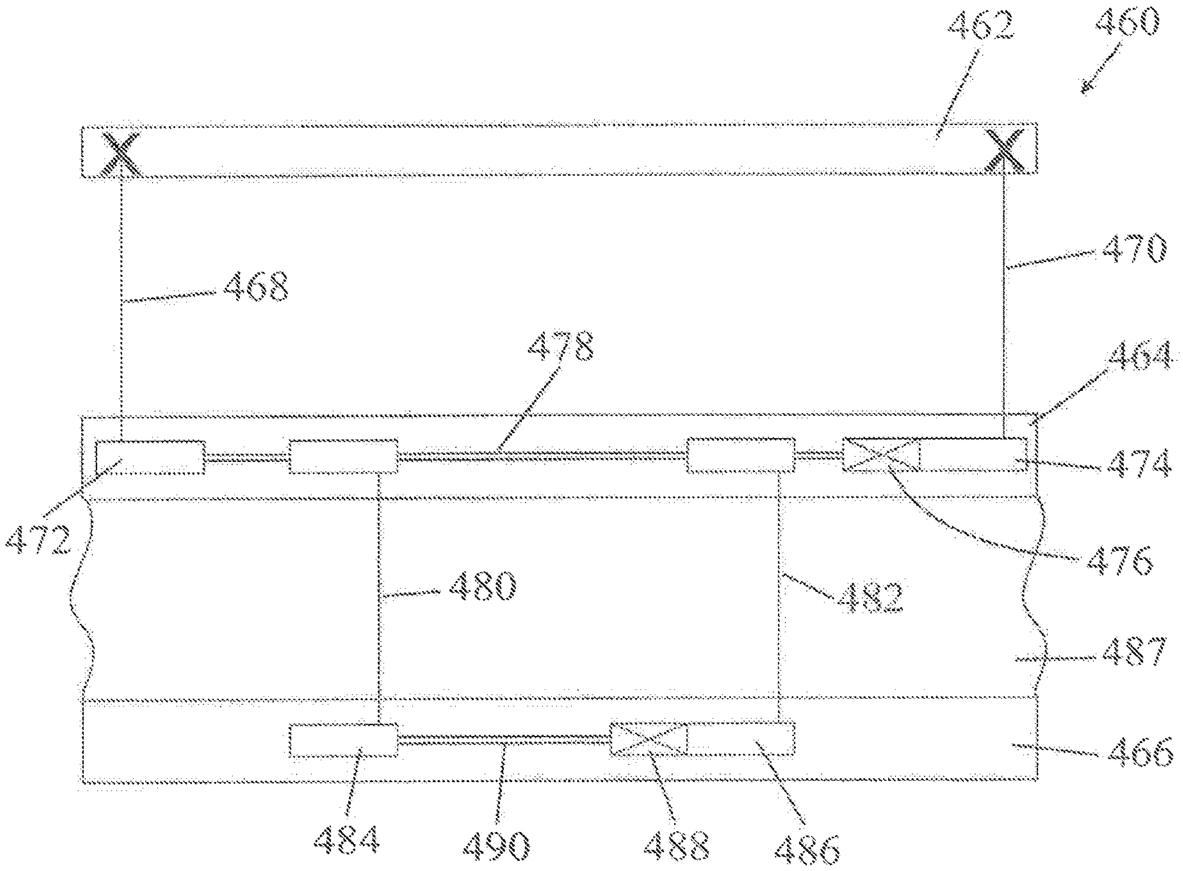
FIG. 65 is a schematic of a top down/bottom up shade with a single skew adjustment mechanism at the right end of each of the movable rails.

FIG. 65 is a schematic of a top down/bottom up shade 460 including a top rail 462, a first (intermediate) movable rail 464 suspended from the top rail 462 via first and second lift cords 468, 470 each of which is operatively connected to its corresponding lift station 472, 474. The lift stations 472, 474 are interconnected by a lift rod 478 such that both lift stations 472, 474 rotate in unison unless the skew adjustment mechanism 476 temporarily disengages the rightmost lift station 474.

A second (bottom) movable rail 466 suspended from the intermediate movable rail 464 via third and fourth lift cords 480, 482, each of which is operatively connected to its corresponding lift station 484, 486. The lift stations 484, 486 are interconnected by a lift rod 490 such that both lift stations 484, 486 rotate in unison unless the skew adjustment mechanism 488 temporarily disengages the rightmost lift station 486. Fabric 487 extends from the intermediate rail 464 to the bottom rail 466. In this particular embodiment, there is no fabric or other covering between the top rail 462 and the intermediate movable rail 464, but there could be a fabric between those two rails 462, 464 as well.

To adjust the skew of the bottom rail 466 of the shade 460 of FIG. 65, the skew adjustment mechanism 488 is actuated to temporarily disengage the lift station 486 from the lift rod 490, and the lift cord 482 is shortened (or lengthened) as required by manually winding up (or unwinding) the lift cord 482 from the lift station 486 until the skew condition has been corrected. The bottom rail 466 pivots up or down about the point where the lift cord 480 meets the lift station 484.

To adjust the skew of the intermediate rail 464 of the shade 460 of FIG. 65, the skew adjustment mechanism 476 is actuated to temporarily disengage the lift station 474 from the lift rod 478, and the lift cord 470 is shortened (or lengthened) as required by manually winding up (or unwinding) the lift cord 470 from the lift station 474 until the skew condition has been corrected. The intermediate rail 464 pivots up or down about the point where the lift cord 468 meets the lift station 472. Of course, it may be necessary to readjust the skew of the bottom rail 466 after adjusting the skew of the intermediate rail 464. Preferably, the skew of the intermediate rail 464 is adjusted first, and then the skew of the bottom rail 466 is adjusted.

Figure 66:
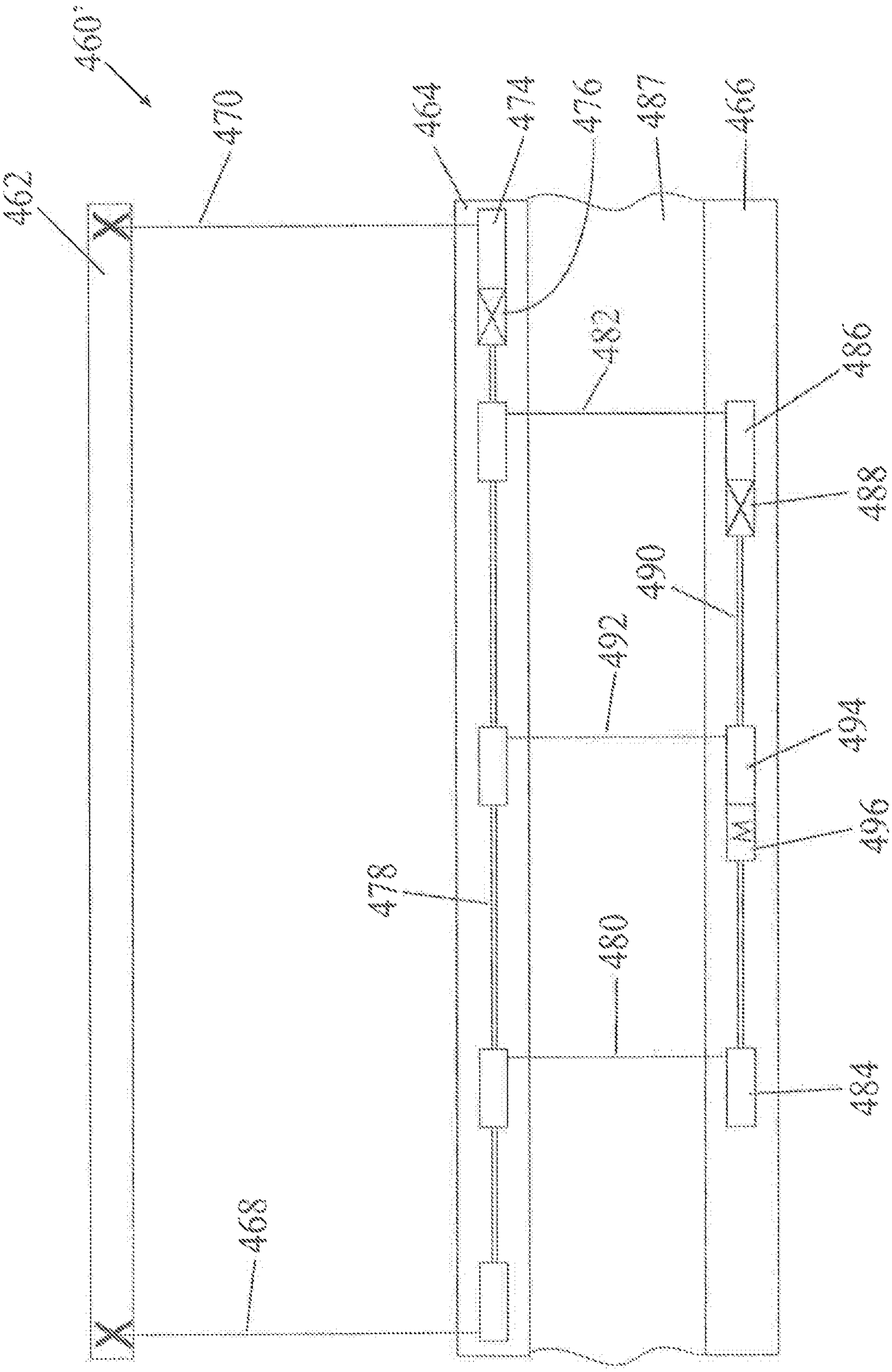
FIG. 66 is a schematic of a top down/bottom up shade, similar to FIG. 65, but for a wider design having three lift cords, with a single skew adjustment mechanism at the right end of each of the movable rails and with one cord take-up station.

FIG. 66 is a schematic of a shade 460', similar to the shade 460 of FIG. 65, except that it has three lift cords 480, 492, 482 extending between the intermediate rail 464 and the bottom rail 466. The lift cords 480, 492, 482 are operatively connected to corresponding lift stations 484, 494, 486 on the bottom movable rail 466. The left and right lift stations 484, 486 are interconnected by a lift rod 490 such that the left and right lift stations 484, 486 rotate in unison unless the skew adjustment mechanism 446 temporarily disengages the rightmost lift station 444, as has been described above. The intermediate lift station 494 is not operatively connected to the lift rod 490 and has its own spring motor which is used just to keep the cord 492 taut in order to prevent slack in that cord 492. The intermediate lift station 494 thus is really just a cord take-up station. In this embodiment, the intermediate lift station 494 includes a wind-up spool (similar to the lift station 114' of FIG. 35), but it also includes a close-coupled coiled spring motor 496 which is wound up onto itself when the bottom rail 466 is pulled down by the user, unwinding the lift cord 492 from the cord take-up station 494 and charging (coiling up) the spring motor 496. When the bottom rail 466 is raised, the spring motor 496 automatically rotates the spool of the cord take-up station 494 to collect the lift cord 492 so as to remove any slack from the lift cord 492, keeping the lift cord 492 taut. In this embodiment the cord take-up station 494 and its corresponding spring motor 496 are mounted in the bottom rail 466 and the bottom lift rod 490 extends through, but does not engage, the wind-up spool of the cord take-up station 494 and its corresponding spring motor 496. Of course, this is only for convenience; the cord take-up station 494 and its corresponding spring motor 496 may be mounted in the bottom rail 466 (or in the intermediate movable rail 464) in a location where they have no interaction with the corresponding lift rod 490, 478.

Since the cord take-up station 494 is independent of the lift rod 490, the spool that winds up the cord 492 may be oriented as desired. For example, it may be coaxial with the lift rod 490 or transaxial to the lift rod 490. Similarly, the spring motor 496 may be oriented as desired. For example, it may be coaxial with the lift rod 490 or transaxial to the lift rod 490, and it may be coaxial with the spool or transaxial to the spool.

To adjust the skew of the bottom rail 466 of the shade 460' of FIG. 66, the skew adjustment mechanism 488 is actuated to temporarily disengage the right lift station 486 from the lift rod 490, and the lift cord 482 is shortened (or lengthened) as required by manually winding up (or unwinding) the lift cord 482 from the lift station 486 until the skew condition has been corrected. The bottom rail 466 pivots up or down about the point where the left lift cord 480 meets the left lift station 484. The cord take-up station 494 automatically winds up to take up any slack generated in the intermediate lift cord 492 by the raising of the bottom rail 446 (or unwinds to mete out some lift cord 492 if the bottom rail 466 is being lowered instead of being raised).

The skew of the intermediate rail 464 of the shade 460' is adjusted in the same manner as it is adjusted for the shade 460 of FIG. 5 as discussed above.

Figure 67:
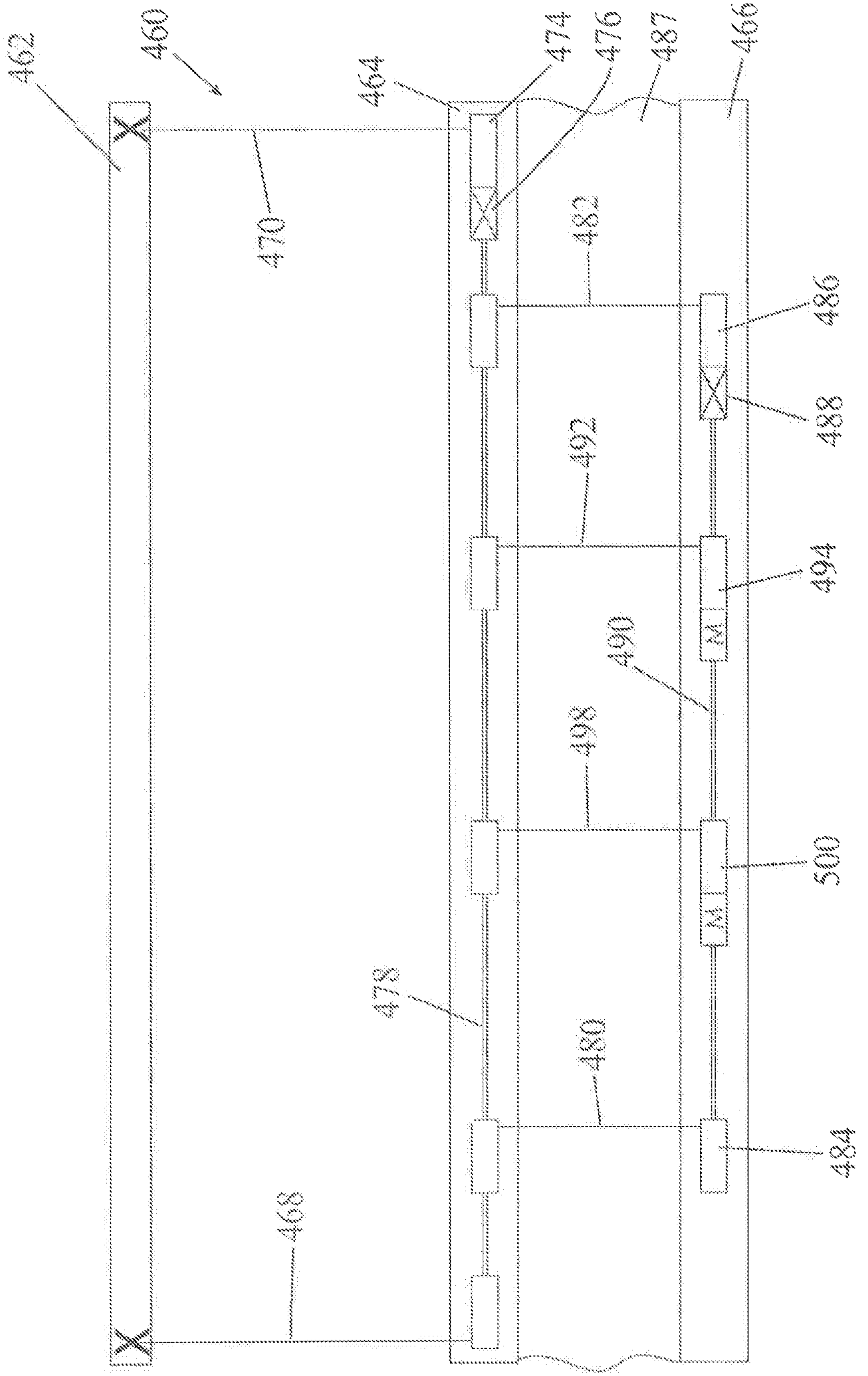
FIG. 67 is a schematic of a top down/bottom up shade, similar to FIG. 66, but for a wider design having four lift cords, with a single skew adjustment mechanism at the right end of each of the movable rails and with two cord take-up stations.

FIG. 67 is a schematic of a shade 460", similar to the shade 460' of FIG. 66, except that it has four lift cords 480, 498, 492, 482 operatively connected to their corresponding lift stations 484, 500, 494, 486. The left and right lift stations 484, 486 are interconnected by a lift rod 490 such that both lift stations 484, 486 rotate in unison unless the skew adjustment mechanism 488 temporarily disengages the rightmost lift station 486, as has been described above. However, as in the earlier case shown in FIG. 66, the intermediate lift stations 500, 494 are not connected to the lift rod 490 and have their own spring motors that only serve to keep the intermediate cords 498, 492 taut.

To adjust the skew of the bottom rail 466 of the shade 460" of FIG. 67, the skew adjustment mechanism 488 is actuated to temporarily disengage the right lift station 486 from the lift rod 490, and the lift cord 482 is shortened (or lengthened) as required by manually winding up (or unwinding) the lift cord 482 from the lift station 486 until the skew condition has been corrected. The bottom rail 466 pivots up or down about the point where the left lift cord 480 meets the left lift station 484. The cord take-up stations 500, 494 automatically take up any slack or mete out cord as needed in the lift cords 498, 492, respectively, as the skew of the bottom rail 466 is being adjusted.

The skew of the intermediate rail 464 of the shade 460" is adjusted in the same manner as it is adjusted for the shade 460 of FIG. 5 as discussed above.

Figure 68:
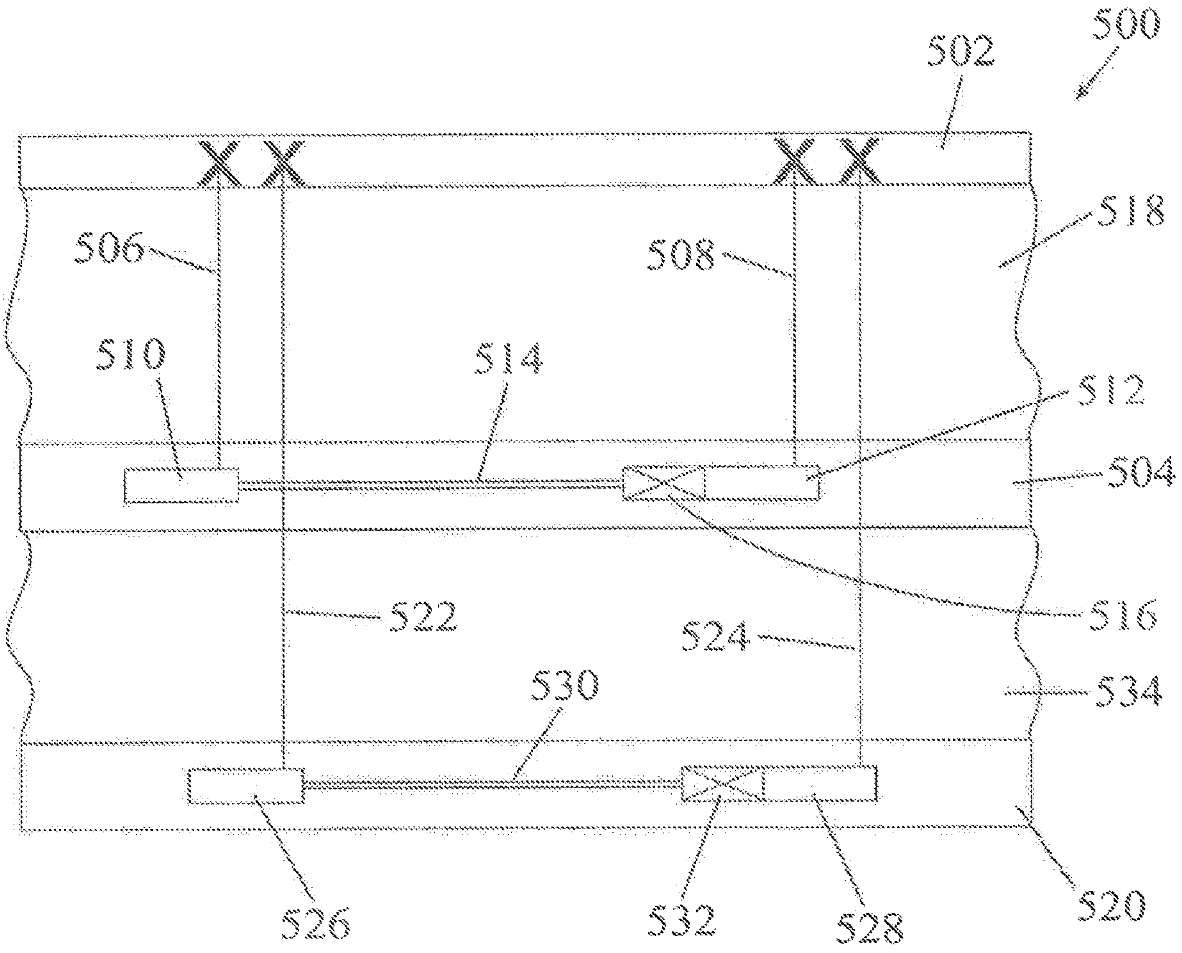
FIG. 68 is a schematic of a dual fabric shade with a single skew adjustment mechanism at the right end of each of the movable rails.

FIG. 68 is a sketch of a dual fabric shade 500 including a top rail 502, a first (intermediate) movable rail 504 suspended from the top rail 502 via first and second lift cords 506, 508 each of which are operatively connected to their corresponding lift stations 510, 512. The lift stations 510, 512 are interconnected by a lift rod 514 such that both lift stations 510, 512 rotate in unison unless the skew adjustment mechanism 516 temporarily disengages the rightmost lift station 512. Fabric 518 extends from the top rail 502 to the intermediate rail 504.

A second (bottom) movable rail 520 also is suspended from the top rail 502 via third and fourth lift cords 522, 524 each of which is operatively connected to its corresponding lift station 526, 528. The lift stations 526, 528 are interconnected by a lift rod 530 such that both lift stations 526, 528 rotate in unison unless the skew adjustment mechanism 532 temporarily disengages the rightmost lift station 528. Fabric 534 extends from the intermediate rail 504 to the bottom rail 520.

To adjust the skew of the bottom rail 520 of the shade 500 of FIG. 68, the skew adjustment mechanism 532 is actuated to temporarily disengage the lift station 528 from the lift rod 530, and the lift cord 524 is shortened (or lengthened) as required by manually winding up (or unwinding) the lift cord 524 from the lift station 528 until the skew condition has been corrected. The bottom rail 520 pivots up or down about the point where the lift cord 522 meets the lift station 526.

To adjust the skew of the intermediate rail 504 of the shade 500 of FIG. 68, the skew adjustment mechanism 516 is actuated to temporarily disengage the lift station 512 from the lift rod 514, and the lift cord 508 is shortened (or lengthened) as required by manually winding up (or unwinding) the lift cord 508 from the lift station 512 until the skew condition has been corrected. The intermediate rail 504 pivots up or down about the point where the lift cord 506 meets the lift station 510. In this case, adjusting the skew of the intermediate rail 504 does not affect the skew of the bottom rail 520.

Figure 69:
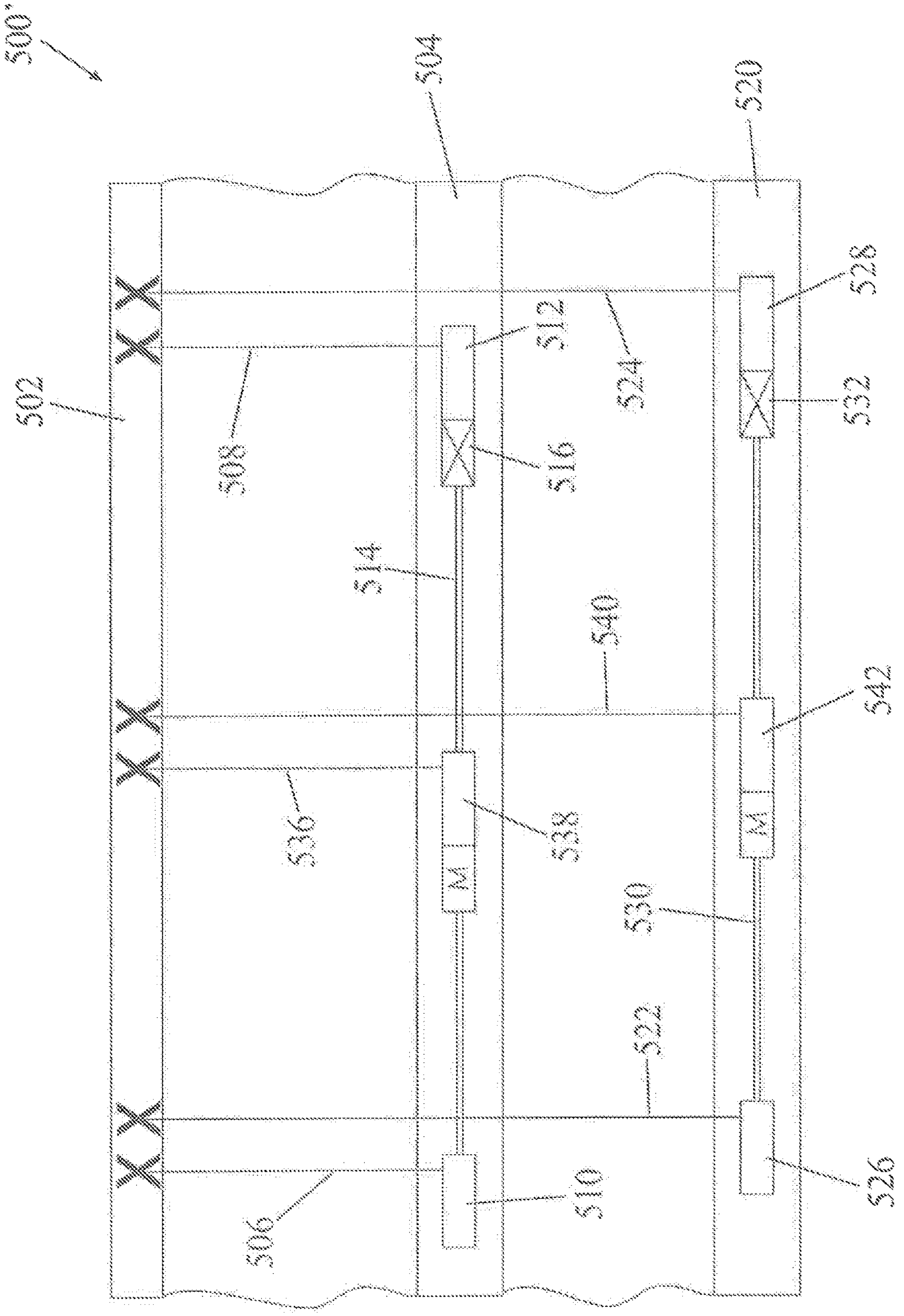
FIG. 69 is a schematic of a dual fabric shade, similar to FIG. 68, but for a wider design having six lift cords, with a single skew adjustment mechanism at the right end of each of the movable rails and with two cord take-up stations.

FIG. 69 is a sketch of a shade 500', similar to the shade 500 of FIG. 68, except that it has three lift cords 506, 536, 508 extending from the top rail 502 and operatively connected to their corresponding lift stations 510, 538, 512 for the intermediate rail 504 and three lift cords 522, 540, 524 extending from the top rail 502 and operatively connected to their corresponding lift stations 526, 542, 532 for the bottom rail 520. The lift stations 510, 512 are interconnected by a lift rod 514 such that both lift stations 510, 512 rotate in unison unless the skew adjustment mechanism 516 temporarily disengages the rightmost lift station 512. Fabric 518 extends from the top rail 502 to the intermediate rail 504. The lift stations 526, 528 are interconnected by a lift rod 530 such that both lift stations 526, 528 rotate in unison unless the skew adjustment mechanism 532 temporarily disengages the rightmost lift station 528. Fabric 534 extends from the intermediate rail 504 to the bottom rail 520. The intermediate lift stations 538, 542 are not driven by the lift rods 514, 530 and are only cord take-up stations 538, 542, having spring motors that keep the cord taut. These cord take-up stations 538, 542 are identical to the cord take-up station 494 discussed earlier with respect to the shade 460' of FIG. 66.

To adjust the skew of the bottom rail 520 of the shade 500' of FIG. 69, the skew adjustment mechanism 532 is actuated to temporarily disengage the lift station 528 from the lift rod 530, and the lift cord 524 is shortened (or lengthened) as required by manually winding up (or unwinding) the lift cord 524 from the lift station 528 until the skew condition has been corrected. The bottom rail 520 pivots up or down about the point where the lift cord 522 meets the lift station 526. The cord take-up station 542 automatically takes up any slack generated in the lift cord 540 by the raising of the bottom rail 520 (or metes out some lift cord 540 if the bottom rail 520 is being lowered instead of being raised).

To adjust the skew of the intermediate rail 504 of the shade 500' of FIG. 69, the skew adjustment mechanism 516 is actuated to temporarily disengage the lift station 512 from the lift rod 514, and the lift cord 508 is shortened (or lengthened) as required by manually winding up (or unwinding) the lift cord 508 from the lift station 512 until the skew condition has been corrected The intermediate rail 504 pivots up or down about the point where the lift cord 506 meets the lift station 510. The cord take-up station 538 automatically takes up any slack generated in the lift cord 536 by the raising of the intermediate rail 504 (or metes out some lift cord 536 if the intermediate rail 504 is being lowered instead of being raised).

Figure 70:
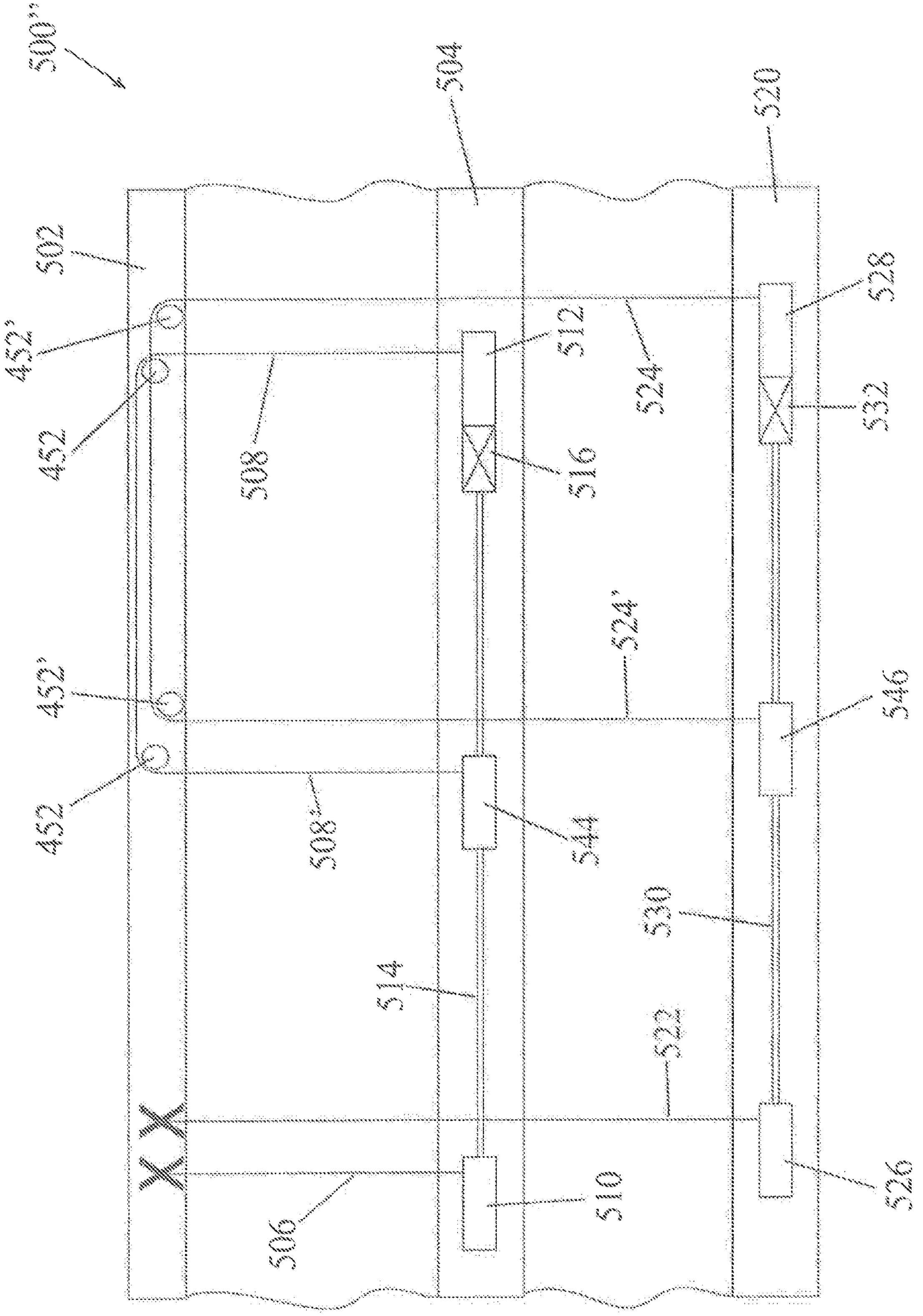
FIG. 70 is a schematic of an alternate configuration for a dual fabric shade, similar to FIG. 69, but having only four lift cords and with a single skew adjustment mechanism at the right end of each of the movable rails.

FIG. 70 is a schematic of a shade 500", similar to the shade 500' of FIG. 69, except that it has a different arrangement for adjusting the skew without using cord take-up stations. The shade 500" has three lift cords 506, 508', 508 operatively connected to their corresponding lift stations 510, 544, 512 for the intermediate rail 504; and three lift cords 522, 524', 524 operatively connected to their corresponding lift stations 526, 546, 528 in the bottom rail 520. The lift stations 510, 544, 516 are interconnected by a lift rod 514 such that they rotate in unison unless the skew adjustment mechanism 516 temporarily disengages the rightmost lift station 512. The lift stations 526, 546, 528 are interconnected by a lift rod 530 such that they rotate in unison unless the skew adjustment mechanism 532 temporarily disengages the rightmost lift station 528.

Similar to the embodiment of FIG. 63, the two lift cords 508, 508' are effectively a single lift cord which extends from the lift station 512 up to the substantially parallel top rail 502, over pulleys 452 in the top rail 502 and back down to the lift station 544 in the intermediate rail 504. Also, the two lift cords 524, 524' are effectively a single lift cord which extends from the lift station 528 in the bottom rail 520, up to the top rail 502, which is substantially parallel to the bottom rail 520, over pulleys 452' in the top rail 502 and back down to the lift station 546 in the bottom rail 520.

To adjust the skew of the bottom rail 520 of the shade 500" of FIG. 70, the skew adjustment mechanism 532 is actuated to temporarily disengage the lift station 528 from the lift rod 530, and the lift cord 524 is shortened (or lengthened) as required by manually winding up (or unwinding) the lift cord 524 from the lift station 528 until the skew condition has been corrected. The bottom rail 520 pivots up or down about the point where the lift cord 522 meets the lift station 526. The lift cord 524, 524' just slides over the pulleys 452' in the top rail 502 to automatically keep both cords 524, 524' taut as the angle or skew of the bottom rail 520 is adjusted.

The skew of the intermediate rail 504 of the shade 500" of FIG. 70 is adjusted in the same manner, as the bottom rail 520. The skew adjustment mechanism 516 is actuated to temporarily disengage the lift station 512 from the lift rod 514 and the lift cord 508 is shortened (or lengthened) as required by manually winding up (or unwinding) the lift cord 508 from the lift station 512 until the skew condition has been corrected. The intermediate rail 504 pivots up or down about the point where the lift cord 506 meets the lift station 510. The lift cord 508, 508' just slides over the pulleys 452 in the top rail 502 to keep the cords 508, 508' taut as the angle of the rail 504 is adjusted.

Figure 71:
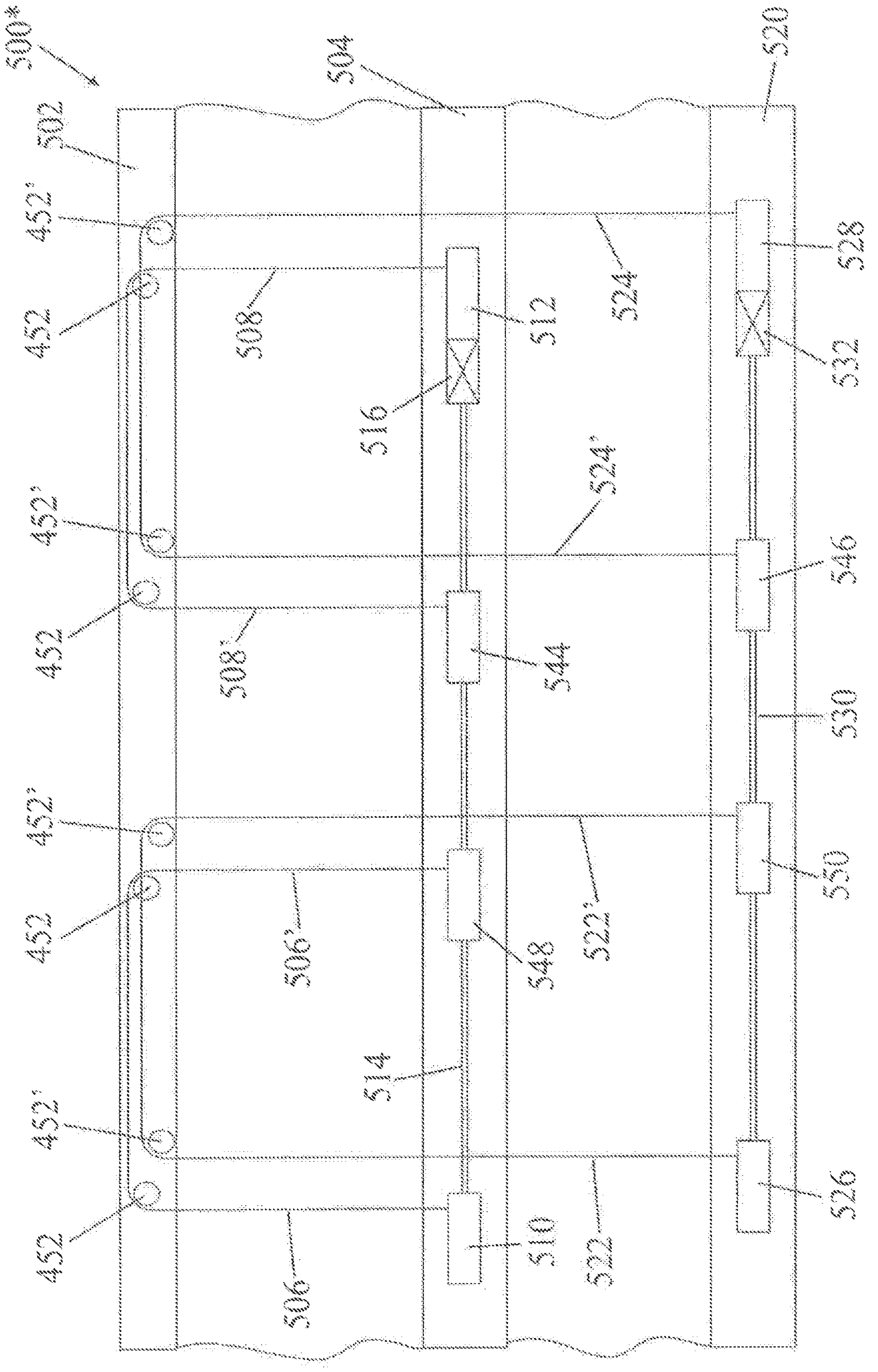
FIG. 71 is a schematic of a dual fabric shade, similar to FIG. 70, but for a wider design having four lift cords and a single skew adjustment mechanism at the right end of each of the movable rails.

FIG. 71 is a schematic of a shade 500*, similar to the shade 430" of FIG. 64, except that it has two movable rails 504, 520 suspended from the top rail 502 instead of just one movable rail. Four lift cords 506, 506', 508', 508 operatively connect to corresponding lift stations 510, 548, 544, 512 for the intermediate rail 504; and four lift cords 522, 522', 524', 524 operatively connect to corresponding lift stations 526, 550, 546, 528 for the bottom rail 520. The lift stations 526, 550, 546, 528 are interconnected by a lift rod 530 such that they rotate in unison unless the skew adjustment mechanism 532 temporarily disengages the rightmost lift station 528. The lift stations 510, 548, 544, 512 are interconnected by a lift rod 514 such that they rotate in unison unless the skew adjustment mechanism 532 temporarily disengages the rightmost lift station 528.

The lift cords 506, 506' are effectively a single lift cord which extends from the lift station 510 in the intermediate rail 504, up to the substantially parallel top rail 502, over pulleys 452 in the top rail 502 and back down to the lift station 548 in the intermediate rail 504.

The lift cords 508, 508' also are effectively a single lift cord which extends from the lift station 512 in the intermediate rail 504, up to the substantially parallel top rail 502, over pulleys 452 in the top rail 502 and back down to the lift station 544 in the intermediate rail 504.

The two lift cords 522, 522' are effectively a single lift cord which extends from the lift station 526 in the bottom rail 520, up to the substantially parallel top rail 502, over pulleys 452' in the top rail 502 and back down to the lift station 550 in the bottom rail 520.

The two lift cords 524, 524' are effectively a single lift cord which extends from the lift station 528 in the bottom rail 520, up to the substantially parallel top rail 502, over pulleys 452' in the top rail 502 and back down to the lift station 546 in the bottom rail 520.

To adjust the skew of the bottom rail 520 of the shade 500* of FIG. 71, the skew adjustment mechanism 532 is actuated to temporarily disengage the lift station 528 from the lift rod 530, and the lift cord 524 is shortened (or lengthened) as required by manually winding up (or unwinding) the lift cord 524 from the lift station 528 until the skew condition has been corrected. The bottom rail 520 pivots up or down about a point intermediate the lift stations 526, 550. The lift cords 524, 524' and 522, 522' just slide over the pulleys 452' in the top rail 502 to automatically adjust to the new position of the bottom rail 520.

To adjust the skew of the intermediate rail 504 of the shade 500* of FIG. 71, the skew adjustment mechanism 516 is actuated to temporarily disengage the lift station 512 from the lift rod 514 and the lift cord 508 is shortened (or lengthened) as required by manually winding up (or unwinding) the lift cord 508 from the lift station 512 until the skew condition has been corrected. The intermediate rail 504 pivots up or down about a point intermediate the lift stations 510, 548. The lift cords 506, 506' and 508, 508' just slide over the pulleys 452 in the top rail 502 to automatically adjust to the new position of the intermediate rail 504.

Figure 72:
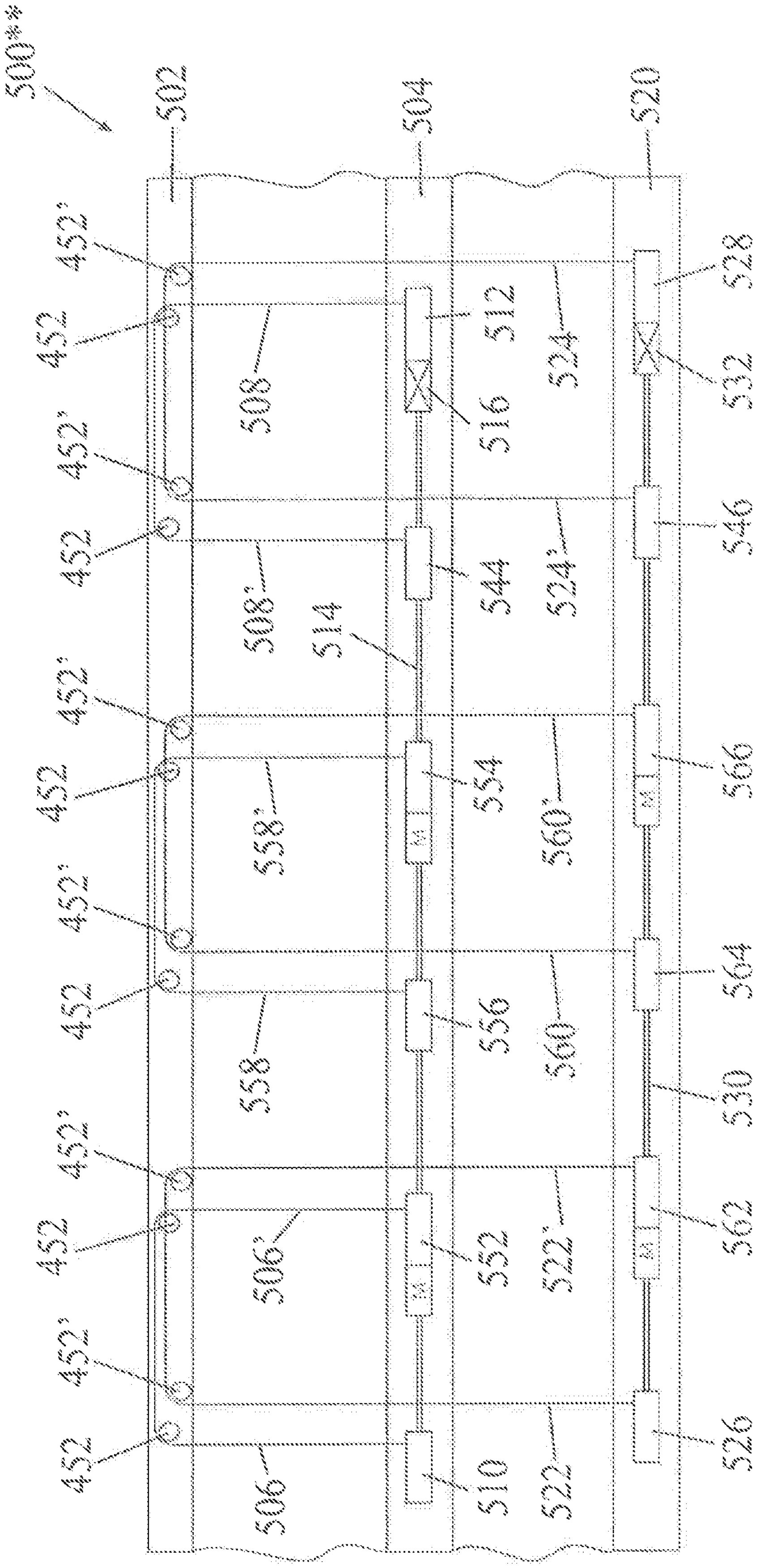
FIG. 72 is a sketch of a dual fabric shade, similar to FIG. 71, but for a wider design having six lift cords, a single skew adjustment mechanism at the right end of each of the movable rails, and four cord take-up stations.

FIG. 72 is a schematic of a shade 500, similar to the shade 500* of FIG. 71, except that it has six lift cords 506, 506', 558, 558', 508, 508' operatively connected to their corresponding lift stations 510, 552, 556, 554, 512, 544 for the intermediate rail 504; and six lift cords 522, 522', 560, 560', 524, 524' operatively connected to their corresponding lift stations 526, 562, 564, 566, 528, 546 for the bottom rail 520. The lift stations 510, 556, 512, 544 are interconnected by a lift rod 514 such that they rotate in unison unless the skew adjustment mechanism 532 temporarily disengages the rightmost lift station 528. The lift stations 526, 564, 528, 546 are interconnected by a lift rod 530 such that they rotate in unison unless the skew adjustment mechanism 532 temporarily disengages the rightmost lift station 528**.

The intermediate lift stations 552, 554, 562, and 566 are not operatively connected to the respective lift rods and operate as cord take-up stations instead of lift stations, just keeping the cord taut, as described earlier with respect to other embodiments.

The lift cords 506, 506' are effectively a single lift cord which extends from the lift station 510 in the intermediate rail 504, up to the substantially parallel top rail 502, over pulleys 452 in the top rail 502 and back down to the take-up station 552 in the intermediate rail 504.

The lift cords 558, 558' are effectively a single lift cord which extends from the lift station 556 in the intermediate rail 504, up to the substantially parallel top rail 502, over pulleys 452 in the top rail 502 and back down to the take-up station 554 in the intermediate rail 504.

The lift cords 508, 508' also are effectively a single lift cord which extends from the lift station 512 in the intermediate rail 504, up to the substantially parallel top rail 502, over pulleys 452 in the top rail 502 and back down to the lift station 544 in the intermediate rail 504.

The two lift cords 522, 522' are effectively a single lift cord which extends from the lift station 526 in the bottom rail 520, up to the parallel top rail 502, over pulleys 452' in the top rail 502 and back down to the take-up station 562 in the bottom rail 520.

The two lift cords 560, 560' are effectively a single lift cord which extends from the lift station 564 up to the parallel top rail 502, over pulleys 452' in the top rail 502 and back down to the take-up station 566 in the bottom rail 520.

The two lift cords 524, 524' are effectively a single lift cord which extends from the lift station 528 up to the substantially parallel top rail 502, over pulleys 452' in the top rail 502 and back down to the lift station 546 in the bottom rail 520.

To adjust the skew of the bottom rail 520 of the shade 500 of FIG. 72, the skew adjustment mechanism 532 is actuated to temporarily disengage the lift station 528 from the lift rod 530, and the lift cord 524 is shortened (or lengthened) as required by manually winding up (or unwinding) the lift cord 524 from the lift station 528 until the skew condition has been corrected. The lift cords 524, 524, 560, 560',' and 522, 522' just slide over the pulleys 452' in the top rail 502 to automatically adjust to the new height of the bottom rail 520**.

To adjust the skew of the intermediate rail 504 of the shade 500 of FIG. 72, the skew adjustment mechanism 516 is actuated to temporarily disengage the lift station 512 from the lift rod 514 and the lift cord 508 is shortened (or lengthened) as required by manually winding up (or unwinding) the lift cord 508 from the lift station 512 until the skew condition has been corrected. The lift cords 506, 506', 558, 558', and 508, 508' just slide over the pulleys 452 in the top rail 502 to automatically adjust to the new height of the intermediate rail 504**.

It will be obvious to those skilled in the art that modifications may be made to the embodiments described above without departing from the scope of the present invention as claimed.

What is claimed is:

1. A system for adjusting a skewed rail in a window covering, the system comprising:

a first spool rotatable to allow a first lift cord to be wound around and unwound from the first spool;

a second spool rotatable to allow a second lift cord to be wound around and unwound from the second spool;

a lift rod coupled between the first and second spools; and a skew adjustment assembly configured to adjust the first spool between an engaged state, in which the first spool is rotationally engaged with the lift rod such that the first and second spools rotate together, and a disengaged state, in which the first spool is rotationally disengaged from the lift rod to allow the first spool to be rotated relative to the second spool;

wherein, when in the disengaged state, rotation of the first spool relative to the second spool adjusts an effective length of the first lift cord relative to the second lift cord.

2. The system of claim 1, wherein:

the skew adjustment assembly further comprises a lift rod adapter coupled to the lift rod for rotation with the lift rod, and a plunger coupled to the first spool for rotation with the first spool; and the plunger is configured to be selectively rotationally engaged with the lift rod adapter such that the first spool is in the engaged state when the plunger is rotationally engaged with the lift rod adapter and the first spool is in the disengaged state when the plunger is rotationally disengaged from the lift rod.

3. The system of claim 2, wherein the plunger is movable in an axial direction relative to the lift rod adapter between a first axial position, at which the plunger is rotationally engaged with the lift rod adapter, and a second axial position, at which the plunger is rotationally disengaged from the lift rod adapter.

4. The system of claim 3, wherein the plunger is configured to be selectively rotationally engaged with the lift rod adapter via a one-way brake of the skew adjustment assembly.

5. The system of claim 4, wherein the one-way brake comprises a ratchet mechanism.

6. The system of claim 4, wherein the one-way brake comprises a wrap spring.

7. The system of claim 4, wherein movement of the plunger from the first axial position to the second axial position disengages the plunger from the one-way brake.

8. The system of claim 3, wherein:

the plunger is biased in a first axial direction towards the first axial position; and the plunger is movable in a second axial direction opposite the first axial direction against the bias to move the plunger to the second axial position.

9. The system of claim 8, wherein the plunger is spring-biased towards the first axial position.

10. The system of claim 3, wherein the skew adjustment assembly further comprises a skew adjustment shaft rotationally coupling the plunger to the first spool such that the skew adjustment shaft, the plunger, and the first spool rotate together.

11. The system of claim 10, wherein:

the plunger is biased in a first axial direction towards the first axial position; and the skew adjustment shaft is movable in a second axial direction opposite the first axial direction to actuate the plunger against the bias towards the second axial position.

12. The system of claim 11, further comprising a tool configured to actuate the skew adjustment mechanism in the second axial direction.

13. The system of claim 10, wherein the skew adjustment shaft is configured to be rotated to cause rotation of the first spool in the disengaged state such that the effective length of the first lift cord is adjusted relative to the second lift cord.

14. The system of claim 3, wherein:

the lift rod adapter includes a set of teeth that engage a corresponding set of teeth of the plunger when the plunger is at the first axial position such that the plunger and the lift rod adapter are configured to rotate together; and the teeth of the plunger clear the teeth of the lift rod adapter when the plunger is at the second axial position such that the plunger is configured to rotate relative to the lift rod adapter.

15. The system of claim 2, wherein the skew adjustment assembly further comprises a lock component operable to selectively lock the lift rod adapter and the lift rod against rotation.

16. The system of claim 15, wherein:

the plunger is movable in an axial direction relative to the lift rod adapter between a first axial position, at which the plunger is rotationally engaged with the lift rod adapter, and a second axial position, at which the plunger is rotationally disengaged from the lift rod adapter; and the lock component is operable to lock the lift rod adapter and the lift rod against rotation when the plunger is moved to the second axial position; and the lock component is operable to allow the lift rod adapter and the lift rod to rotate when the plunger is moved to the first axial position.

17. The system of claim 2, wherein the plunger is configured to be selectively rotationally engaged with the lift rod adapter via a separate component of the skew adjustment assembly.

18. The system of claim 17, wherein the separate component is configured such that plunger is rotationally disengaged from the lift rod adapter with rotation of the plunger in a first rotational direction and the plunger remains rotationally engaged with the lift rod adapter with rotation of the plunger in a second rotational direction opposite the first rotational direction.

19. The system of claim 18, wherein the separate component comprises a ratchet mechanism or a wrap spring.

* * * * *